(12) United States Patent
Adams et al.

(10) Patent No.: US 8,832,013 B1
(45) Date of Patent: Sep. 9, 2014

(54) METHOD AND SYSTEM FOR ANALYTIC NETWORK PROCESS (ANP) TOTAL INFLUENCE ANALYSIS

(75) Inventors: William James Louis Adams, DeLand, FL (US); Daniel Lowell Saaty, Falls Church, VA (US)

(73) Assignee: Decision Lens, Inc., Arlington, VA (US)

( * ) Notice: Subject to any disclaimer, the term of this patent is extended or adjusted under 35 U.S.C. 154(b) by 371 days.

(21) Appl. No.: 13/294,369

(22) Filed: Nov. 11, 2011

Related U.S. Application Data

(63) Continuation-in-part of application No. 12/508,703, filed on Jul. 24, 2009, now Pat. No. 8,341,103, and a continuation-in-part of application No. 12/646,289, filed on Dec. 23, 2009, now Pat. No. 8,423,500, and a continuation-in-part of application No. 12/646,418, filed on Dec. 23, 2009, now Pat. No. 8,315,971, and a continuation-in-part of application No. 12/646,099, filed on Dec. 23, 2009, now Pat. No. 8,239,338, and a continuation-in-part of application No. 12/646,312, filed on Dec. 23, 2009, now Pat. No. 8,429,115.

(60) Provisional application No. 61/413,041, filed on Nov. 12, 2010, provisional application No. 61/413,182, filed on Nov. 12, 2010, provisional application No. 61/413,090, filed on Nov. 12, 2010, provisional application No. 61/412,996, filed on Nov. 12, 2010.

(51) Int. Cl.
*G06F 17/00* (2006.01)
*G06N 5/02* (2006.01)
*G06Q 10/10* (2012.01)
*G06N 99/00* (2010.01)
*G06N 5/04* (2006.01)

(52) U.S. Cl.
CPC ............... *G06F 17/00* (2013.01); *G06Q 10/10* (2013.01); *G06N 5/02* (2013.01); *G06N 99/005* (2013.01); *G06N 5/04* (2013.01)
USPC .......................................................... 706/46

(58) Field of Classification Search
CPC ......... G06N 5/04; G06N 99/005; G06N 5/02; G06Q 10/10; G06F 17/00
USPC ................................................. 706/46, 45, 62
See application file for complete search history.

(56) References Cited

U.S. PATENT DOCUMENTS 5,844,817 A  12/1998 Lobley et al.
6,151,565 A  11/2000 Lobley et al.

(Continued)

FOREIGN PATENT DOCUMENTS

WO           01/08070 A1    2/2001
WO    WO 01/20530 A1    3/2001

(Continued)

OTHER PUBLICATIONS

Agarwal et al, "Modeling the metrics of lean, agile and leagile supply chain: An ANP-based approach", European Journal of Operational Research 173 (2006) 211-225.*

(Continued)

*Primary Examiner* — Jeffrey A Gaffin
*Assistant Examiner* — Ilya Traktovenko
(74) *Attorney, Agent, or Firm* — Posz Law Group, PLC

(57) ABSTRACT

An apparatus includes an analytic network process (ANP) storage memory that stores an ANP model populated with data, the ANP model having feedback connections in place among nodes within the ANP model, and a processor in communication with the ANP storage memory. The processor is configured to facilitate selecting one or more metrics to use to determine influence of criteria within the ANP model. Also, the processor determines a combined influence score, the combined influence score being a single score for each of the criteria in the ANP model. Also, the processor determines which of the criteria in the ANP model is most influential among the criteria in the ANP model, for the one or more metric which is selected to use to determine the influence of the nodes in the ANP model.

21 Claims, 9 Drawing Sheets

(56) References Cited

U.S. PATENT DOCUMENTS

| | | | |
|---|---|---|---|
| 6,502,126 B1 | 12/2002 | Pendakur | |
| 6,643,645 B1 | 11/2003 | Fayyad et al. | |
| 6,785,709 B1 | 8/2004 | Pendakur | |
| 6,850,891 B1 * | 2/2005 | Forman | 705/7.11 |
| 6,882,989 B2 | 4/2005 | Stevens | |
| 6,907,566 B1 | 6/2005 | McElfresh et al. | |
| 6,963,901 B1 | 11/2005 | Bates et al. | |
| 7,080,071 B2 | 7/2006 | Henrion et al. | |
| 7,203,755 B2 | 4/2007 | Zhu et al. | |
| 7,257,566 B2 | 8/2007 | Danielson et al. | |
| 7,353,253 B1 | 4/2008 | Zhao | |
| 7,398,257 B2 | 7/2008 | Kaji | |
| 7,542,952 B2 | 6/2009 | Yang et al. | |
| 7,552,104 B2 | 6/2009 | Hansen et al. | |
| 7,624,069 B2 | 11/2009 | Padgette | |
| 7,689,592 B2 | 3/2010 | Denton et al. | |
| 7,716,360 B2 | 5/2010 | Angelov | |
| 7,827,239 B2 | 11/2010 | Bodin et al. | |
| 7,844,670 B2 | 11/2010 | Roskowski et al. | |
| 7,996,344 B1 | 8/2011 | Goel | |
| 8,239,338 B1 | 8/2012 | Adams et al. | |
| 8,250,007 B2 | 8/2012 | Abido et al. | |
| 8,315,971 B1 | 11/2012 | Adams et al. | |
| 8,341,103 B2 | 12/2012 | Adams et al. | |
| 8,423,500 B1 | 4/2013 | Adams et al. | |
| 8,429,115 B1 | 4/2013 | Adams et al. | |
| 8,447,820 B1 | 5/2013 | Gay | |
| 8,554,713 B2 | 10/2013 | Adams et al. | |
| 8,595,169 B1 | 11/2013 | Adams et al. | |
| 2001/0027455 A1 | 10/2001 | Abulleil et al. | |
| 2003/0069868 A1 | 4/2003 | Vos | |
| 2003/0191726 A1 | 10/2003 | Kirshenbaum | |
| 2003/0208514 A1 | 11/2003 | Yang et al. | |
| 2004/0103058 A1 * | 5/2004 | Hamilton | 705/38 |
| 2006/0195441 A1 | 8/2006 | Julia et al. | |
| 2006/0224530 A1 | 10/2006 | Riggs et al. | |
| 2006/0241950 A1 | 10/2006 | Hansen et al. | |
| 2007/0226295 A1 | 9/2007 | Haruna et al. | |
| 2008/0103880 A1 * | 5/2008 | Saaty | 705/12 |
| 2008/0104058 A1 | 5/2008 | Billmaier et al. | |
| 2008/0250110 A1 | 10/2008 | Zhao | |
| 2008/0256054 A1 * | 10/2008 | Saaty | 707/5 |
| 2010/0153920 A1 | 6/2010 | Bonnet | |
| 2010/0318606 A1 | 12/2010 | Sethi et al. | |
| 2011/0022556 A1 | 1/2011 | Adams | |
| 2012/0053973 A1 | 3/2012 | Elazouni et al. | |
| 2012/0133727 A1 | 5/2012 | Bolduc et al. | |
| 2013/0046718 A1 | 2/2013 | Saaty et al. | |

FOREIGN PATENT DOCUMENTS

| | | | |
|---|---|---|---|
| WO | WO 2008/057178 A2 | 5/2008 | |
| WO | 2009/026589 A3 | 2/2009 | |

OTHER PUBLICATIONS

Zhang et al, "A software architecture and framework for Web-based distributed Decision Support Systems", Available online Aug. 11, 2005.*

Adams et al, "Super Decisions Software Guide", Copyright c 1999/2003 Thomas L. Saaty (The software for the Analytic Network Process for decision making with dependence and feedback was developed by William Adams in 1999-2003).*

Choo et al, "Interpretation of criteria weights in multicriteria decision making", Computers & Industrial Engineering 37 (1999) 527-541.*

Demirtas et al, "An integrated multiobjective decision making process for supplier selection and order allocation", Received Mar. 30, 2004; accepted Nov. 17, 2005, Available online Feb. 28, 2006.*

Lopez, "Multicriteria Decision Aid Application to a Student Selection Problem", Recieved Jan. 2004; accepted Dec. 2004 after one revision, Pesquisa Operacional, v.25, n.1, p. 45-68, Janiero a Abril 2005.*

Meade, "R&D Project Selection Using the Analytic Network Process", IEEE Transactions on Engineering Management, vol. 49, No. 1, Feb. 2002.*

Neaupane et al, "Analytic network process model for landslide hazard zonation", Civil Engineering Program, Sirindhorn Int. Ins. of Technology, Thammasat University, Thailand, Available online May 2, 2006.*

T.L.Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.*

R.W. Saaty, "Validation Examples for the Analytic Hierarchy Process and Network Process", MCDM 2004, Whistler, B. C. Canada Aug. 6-11, 2004.*

Thomas L. Saaty, "Time dependent decision-making; dynamic priorities in the AHP/ANP: Generalizing from points to functions and from real to complex variables", Mathematical and Computer Modelling 46 (2007) 860-891.*

Tuzkaya et al, "An analytic network process approach for locating undesirable facilities: An example from Istanbul, Turkey", Journal of Environmental Management 88 (2008) 970-983.*

U.S. Appl. No. 12/646,099, filed Dec. 23, 2009, Adams.

U.S. Appl. No. 12/646,289, filed Dec. 23, 2009, Adams.

U.S. Appl. No. 12/646,312, filed Dec. 23, 2009, Adams.

U.S. Appl. No. 12/646,418, filed Dec. 23, 2009, Adams.

U.S. Appl. No. 13/015,754, filed Jan. 28, 2011, Ryan Patrick Gay.

U.S. Appl. No. 13/290,423, filed Nov. 7, 2011, Adams.

Super Decisions Software for Decision Making, Super Decisions Website, (http://web.archive.org/web/20041202040911/http://www.superdecisions.com/ and http://www.superdecisions.com/~saaty/), 2004.

The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.

The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.

Decision Lens Inc., Decision Lens's Decision Lens Suite™ Product, (http://web.archive.org/web/20050204181100/www.decisionlens.com/index.php), 2004-2005.

Caterinicchia, Dan, "A problem-solving machine," *Federal Computer Week,* (Sep. 4, 2000), 14, 31, p. 48-49.

The Super Decisions Software, The Analytic Network Process, Decision Making with Dependence and Feedback, (http://www.superdecisions.com/~saaty/Fall2005DecisionClass/PowerpointSlides/), Sep. 2005.

Mikhailov et al., "Fuzzy Analytic Network Process and its Application to the Development of Decision Support Systems," IEEE Transactions on Systems, Man, and Cybernetics —Part C: Applications and Reviews, (Feb. 2003), vol. 33, No. 1, p. 33-41.

Decision Lens, Inc., Tutorial on Hierarchical Decision Models (AHP), 2002.

Decision Lens, Inc., Tutorial on Complex Decision Models (ANP), 2002.

Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.

Rozann W. Saaty., Decision Making in Complex Environments: The Analytic Network Process (ANP) for Dependence and Feedback Including a Tutorial for the SuperDecisions Software and Portions of the Encyclicon of Application, 2005.

Decision Lens, Inc., *MS_Help_Decision_Lens.* "Welcome to Decision Lens Software™," Jun. 6, 2005.

Team Acuity, SAGD ANP Enhancement Functional Requirements Document, (Dec. 15, 2007), p. 1-68.

Decision Lens, Inc., *DLW_Help File,* Dec. 2007.

Decision Lens, Inc., *DLS_Help File,* Dec. 2007.

H. Sun., "AHP in China," International Symposium on the Analytic Hierarchy Process, (Jul. 8-10, 2003), p. 1-21.

(56) References Cited

OTHER PUBLICATIONS

Thomas L. Saaty., "Decision-Making with the AHP: Why is the Principal Eigenvector Necessary," International Symposium on the Analytic Hierarchy Process, (Aug. 2-4, 2001), p. 1-14.
Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.
Davolt, Steve, "The man who knew too much," *Washington Business Journal*, (Aug. 7, 2007), (http://www.bizjournals.com/washington/stories/2000/08/07/smallb1.html?t=printable).
Roxann Saaty et al., "Decision Making in complex environments," Super Decisions, 2003.
Feglar et al., "Dynamic Analytic Network Process: Improving Decision Support for Information and Communication Technology," ISAHP, Honolulu, Hawaii, (Jul. 8-10, 2003).
Borenstein et al., "A Multi-Criteria Model for the Justification of IT Investments," (Feb. 2005), INFOR v3nl, Canadian Operational Research Society, p. 1-21.
Condon et al., "Visualizing group decisions in the analytic hierarchy process," *Computers & Operation Research*, (2003), 30, p. 1435-1445.
D. Saaty et al., "The Future of the University of Pittsburgh Medical Center: Strategic Planning with the Analytic Network Process," Proceedings of the Fourth International Symposium on the Analytic Hierarchy Process, (Jul. 12-15, 1996), p. 107-121.
Liming Zhu, et al., "Tradeoff and Sensitivity Analysis in Software Architecture Evaluation Using Analytic Hierarchy Process," *Software Quality Journal*, (2005), vol. 13, pp. 357-375.
Notification of Transmittal of the International Search Report and the Written Opinion of the International Searching Authority mailed Aug. 25, 2008 in corresponding PCT application No. PCT/US2007/022184 in connection with related U.S. Appl. No. 11/586,557.
Notification of Transmittal of the International Preliminary Report on Patentability mailed May 7, 2009 in corresponding PCT application No. PCT/US2007/022184 in connection with related U.S. Appl. No. 11/586,557.
Office Action issued by the U.S. Patent Office on Aug. 5, 2008 in connection with related U.S. Appl. No. 11/586,557.
Office Action issued by the U.S. Patent Office on Apr. 14, 2009 in connection with related U.S. Appl. No. 11/586,557.
Office Action issued by the U.S. Patent Office on Apr. 13, 2009 in connection with related U.S. Appl. No. 11/783,436.
Office Action issued by the U.S. Patent Office on Oct. 21, 2009 in connection with related U.S. Appl. No. 11/783,436.
Office Action issued by the U.S. Patent Office on Mar. 15, 2012 in connection with related U.S. Appl. No. 12/646,099.
Notice of Allowance issued by the U.S. Patent Office on Apr. 17, 2012 in connection with related U.S. Appl. No. 12/646,099.
Demirtas et al., "An integrated multiobjective decision making process for supplier selection and order allocation", Department of Industrial Engineering, Osmangazi University, 26030 Eskisehir, Turkey, Available online Feb. 28, 2006.
Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.
Adams et al., "Super Decisions Software Guide", Copyright c 1999/2003 Thomas L. Saaty (The software for the Analytic Network Process for decision making with dependence and feedback was developed by William Adams in 1999-2003).
Neaupane et al., "Analytic network process model for landslide hazard zonation", Civil Engineering Program, Sirindhorn Int. Ins. Of Technology, Thammasat University, Thailand, Available online May 2, 2008.
T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.
R.W. Saaty, "Validation Examples for the Analytic Hierarchy Process and Analytic Network Process", MCDM 2004, Whistler, B. C. Canada Aug. 6-11, 2004.
Office Action issued by the U.S. Patent Office on May 29, 2012 in connection with related U.S. Appl. No. 12/646,418.
Office Action issued by the U.S. Patent Office on Jul. 18, 2012 in connection with related U.S. Appl. No. 12/508,703.
Notice of Allowance issued by the U.S. Patent Office on Aug. 1, 2012 in connection with related U.S. Appl. No. 12/646,418.
Office Action issued by the U.S. Patent Office on Aug. 6, 2012 in connection with related U.S. Appl. No. 12/646,289.
Office Action issued by the U.S. Patent Office on Aug. 10, 2012 in connection with related U.S. Appl. No. 12/646,312.
Buyukyazici et al. "The Analytic Hierarchy and Analytic Network Processes", Hacettepe Journal of Mathematics and Statistics, vol. 32, 2003, pp. 65-73.
Notice of Allowance issued by the U.S. Patent Office on Jun. 18, 2013 in connection with related U.S. Appl. No. 13/657,926.
Notice of Allowance issued by the U.S. Patent Office on Aug. 2, 2013 in related U.S. Appl. No. 13/290,423.
Office Action dated Aug. 1, 2013 in related U.S. Appl. No. 13/764,010.
Rafiei, et al., Project Selection Using Fuzzy Group Analytic Network Process, World Academy of Science, Engineering and Technology 34 2009, pp. 457-461.
Wolfslehner, Bernhard, Vacik, Harald, Lexer, Manfred; "Application of the analytic network process in multi-criteria analysis of sustainable forest management", Forest Ecology And Management, Mar. 2005, pp. 157-170.
Notice of Allowance issued by the U.S. Patent Office on Aug. 31, 2012 in connection with related U.S. Appl. No. 12/508,703.
Office Action issued by the U.S. Patent Office on Nov. 6, 2012 in connection with related U.S. Appl. No. 13/015,754.
Notice of Allowance issued by the U.S. Patent Office on Dec. 26, 2012 in connection with related U.S. Appl. No. 12/646,289.
Notice of Allowance issued by the U.S. Patent Office on Jan. 3, 2013 in connection with related U.S. Appl. No. 12/646,312.
Notice of Allowance issued by the U.S. Patent Office on Jan. 29, 2013 in connection with related U.S. Appl. No. 13/015,754.
Office Action issued by the U.S. Patent Office on May 29, 2013 in connection with related U.S. Appl. No. 13/611,544.
U.S. Appl. No. 13/764,010, filed Feb. 11, 2013, Adams et al.
U.S. Appl. No. 13/764,810, filed Feb. 12, 2013, Adams et al.
U.S. Appl. No. 13/799,077, filed Mar. 13, 2013, Adams.
U.S. Appl. No. 13/834,461, filed Mar. 15, 2013, Saaty et al.
Notice of Allowance issued by the U.S. Patent Office on Oct. 18, 2013 in related U.S. Appl. No. 13/611,544.
Notice of Allowance issued by the U.S. Patent Office on Dec. 17, 2013 in connection with related U.S. Appl. No. 13/467,657.
Saaty, "Relative Measurement and Its Generalization in Decision Making Why Pairwise Comparisons are Central in Mathematics for the Measurement of Intangible Factors The Analytic Hierarchy/Network Process", Rev. R. Acad. Cien. Serie A. Mat., vol. 102 (2), 2008, pp. 251-318.
Notice of Allowance issued by the U.S. Patent Office on Feb. 3, 2014 in related U.S. Appl. No. 13/764,010.

\* cited by examiner

FIG. 4

* Rank Change
    - Rank Influence
        *Upper
        * Lower
    - Influence
        * Upper
        * Lower
    - Perspective
* Percent Change
    - Influence
        *Upper
        *Lower
    - Perspective
* Raw Change
    - Influence
        * Upper
        * Lower
    - Perspective
    - Marginal
        * Upper
        * Lower

FIG. 5

* Influence
    - Upper
        * Rank Change
        * Percent Change
        * Raw Change
    - Lower
        * Rank Change
        * Percent Change
        * Raw Change
* Marginal Influence
    -- Upper
    -- Lower
* Rank Influence
* Perspective
    -- Rank Change
    -- Percent Change
    -- Raw Change

INCREASE SIZE OF PIPES IN PROPORTION:
N1 TO N2, N2 TO N2, N3 TO N2

DECREASE SIZE OF OTHER PIPES IN PROPORTION

MEASURE HOW IMPORTANT ALT1 AND ALT2 ARE FROM THE PERSPECTIVE OF C1, WHILE TAKING INTO CONSIDERATION THE ENTIRETY OF THE NETWORK

METHOD AND SYSTEM FOR ANALYTIC NETWORK PROCESS (ANP) TOTAL INFLUENCE ANALYSIS

CROSS-REFERENCE TO RELATED APPLICATIONS

This application is a continuation-in-part of the following U.S. patent application Ser. No. 12/508,703 filed Aug. 20, 2009; Ser. No. 12/646,289 filed Dec. 23, 2009; Ser. No. 12/646,418 filed Dec. 23, 2009; Ser. No. 12/646,099, filed Dec. 23, 2009; Ser. No. 12/646,312 filed Dec. 23, 2009; and claims the benefit of the following U.S. provisional patent applications: 61/413,041 filed Nov. 12, 2010; 61/413,182 filed Nov. 12, 2010; 61/413,090, filed Nov. 12, 2010; and 61/412,996, filed Nov. 12, 2010, all of which are expressly incorporated herein by reference.

TECHNICAL FIELD

The present invention relates in general to analysis of factors in a decision, and more specifically to analysis of total influence in an analytic network process (ANP) model.

BACKGROUND

The factors in a decision can be represented and quantified in an analytic hierarchy process (AHP) model. The AHP model can be used to relate the factors to overall goals, and to evaluate alternative solutions. Measuring sensitivity of factors in AHP trees is generally known. As a result of the measurements of sensitivity of nodes in the tree context, a user can see how influential individual nodes are, such as how sensitive the decision model's alternative scores are to a change in weight of various nodes in the AHP tree. Measuring sensitivity of the factors in a decision can be straightforward in the AHP tree because the AHP model uses a tree structure.

The factors in a decision also can be represented and quantified in an analytic network process (ANP) model. A process of decision making using an ANP model serves to break down large decisions into smaller, manageable decisions. When a decision is represented as a typical ANP model, nodes in the ANP model can be connected to each other without regard for hierarchy level so as to represent the interrelationship between the smaller decisions. The connections that represent the effect of smaller decisions can be synthesized to arrive at the ultimate decision. Measuring sensitivity of a factor in a decision quantified in the ANP model is consequently difficult since the ANP is not a simple tree structure and a change in one factor affects interrelated decisions and may (or may not) affect the ultimate decision. Determining which criteria in a decision model is the most influential for one or more metrics selected by a user is even more difficult.

SUMMARY

Accordingly, one or more embodiments provide an apparatus, method, and/or computer-readable medium for analyzing ANP total influence.

Still another embodiment can be a computer readable storage medium comprising instructions for the described method.

An analytic network process (ANP) storage memory stores an ANP model populated with data, the ANP model having feedback connections in place among nodes within the ANP model. A processor is in communication with the ANP storage memory. The processor being configured to facilitate selecting one or more metrics to use to determine influence of criteria within the ANP model. Also, the processor determines a combined influence score, the combined influence score being a single score for each of the criteria in the ANP model. Also, the processor determines which of the criteria in the ANP model is most influential among the criteria in the ANP model, for the one or more metric which is selected to use to determine the influence of the nodes in the ANP model.

According to another embodiment, the apparatus, method and/or computer-readable medium isolates at least one of the metrics and to work on the isolated metrics alone.

According to yet another embodiment, the metrics are one or more of rank change, percent change, and raw change.

In still another embodiment, the ANP model is structured into a metric first approach, to arrive at the combined influence score based on individual influence scores for the nodes of the ANP model.

In another embodiment, the ANP model is structured into an influence-type first approach, to arrive at the combined influence score based on individual influence scores for the nodes in the ANP model In still another embodiment, overarching criteria is used in a calculation for providing a combined influence score.

Another embodiment provides an input unit configured to input, from an input device, pairwise comparisons, ANP ratings, or ANP client data, which are stored into the ANP model, the pairwise comparisons representing a judgment of priority between ANP alternatives in the pair, the ANP ratings representing a rating of a choice, and the ANP client data representing real world values.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 4 is a first representation of a tree with metric as top level criteria and influence type below;

FIG. 5 is second representation of a tree with influence type as top level criteria and metrics below;

DETAILED DESCRIPTION

Figure 1:
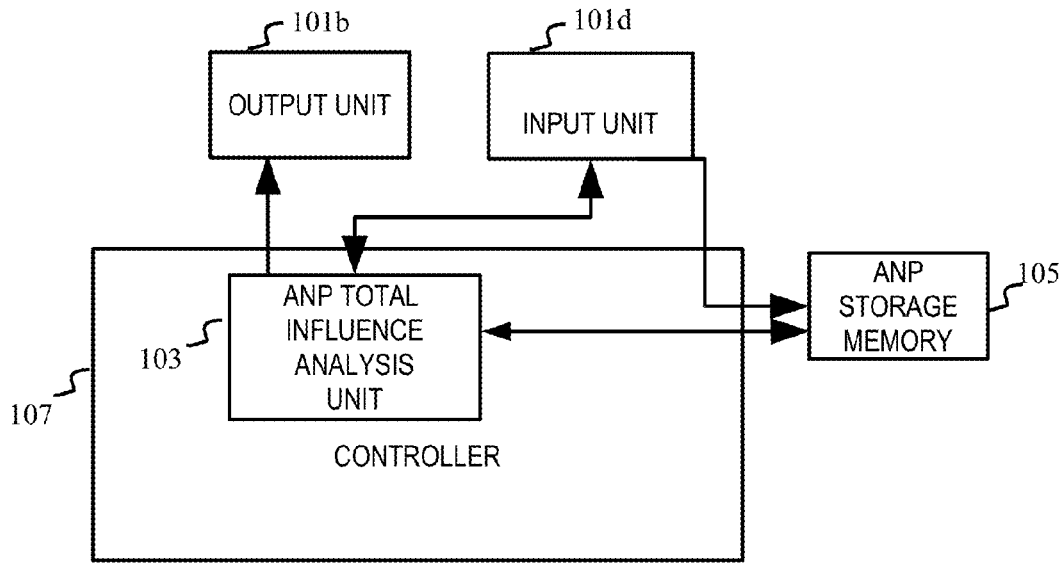
FIG. 1 is a block diagram illustrating a system for ANP total influence analysis.

In overview, the present disclosure concerns computers, computer networks and computer systems, such as an intranet, local area network, distributed network, or the like having a capability of analyzing properties of decision models. Such computer networks and computer systems may further provide services such as interacting with users, and/or evaluating modifications to a decision model. More particularly, various inventive concepts and principles are embodied in systems, devices, and methods therein related to analyzing properties of an analytic network process model. It should be noted that the term device may be used interchangeably herein with computer, wireless communication unit, or the like. Examples of such devices include personal computers, general purpose computers, personal digital assistants, cellular handsets, and equivalents thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to determine which criteria in a decision model is the most influential for one or more metrics selected by a user.

Further in accordance with exemplary embodiments, a system and method can provide a total influence score for a decision model, taking into account one or more of the influence calculations to provide a combined influence score. The total influence score will depend on which of the influence calculations is used.

The system or method can determine the "total influence" (sometimes referred to herein as a "combined influence") after the ANP client data has been input into the model. For example, a user may want to know which of the factors are the most important with respect to the model populated with the ANP client data. The total influence system or method can determine which criteria in the model has the most influence on the alternatives, e.g., on budgets, etc. In the influence on the whole decision, many different things have importance. The users want to see what is driving the model. Every criteria in the model has one of these metric calculations. One overall score can be developed for each node in the model. The system also can provide an ability to modify the importance of various factors, thus can determine, "which node is the most sensitive?," "which criteria most affects the ranking"?etc.

DEFINITIONS

The following definition section includes some of the terms which are used herein as having the definitions set out herein, since sometimes it is helpful to have a definition section. However, this definitions section does not exhaustively list all of the terms defined herein. The remainder of the specification may include definitions for additional terms.

The designations in the following list are defined and expressly used herein as would be understood to one of skill in the ANP art, and not according to a general dictionary, whether singular or plural: "priority," "node", "importance" (or "important"), "sensitivity," "pairwise comparison", "ANP ratings" (or "ratings"), "ANP client data", "priority vectors". "judgment of priority," "ANP alternatives" (or "alternatives"), "criteria", "weight," "cluster," "local," "global," "synthesize." The list in this paragraph is not exhaustive and does not imply that a term not on this list can be interpreted according to a general dictionary instead of according to an understood ANP meaning. Some of these are further explained below for the reader's convenience.

"Pairwise comparison." The point of a pairwise comparison set is to arrive at the priorities of a group of things. These things may be criteria (so-called "alternatives" in the traditional ANP sense), or ratings scales. In a classic example of doing pairwise comparisons, one can answer the question, "how many times better is X than Y" for all X and Y being compared.

"ANP Ratings." If one thinks of a single column of the conventional ANP's rating system as conventionally represented in a matrix, its point is to assign ideal priorities to the alternatives (with respect to a criteria). The ratings prioritize alternatives in a set of alternatives. In a classic example of doing ANP ratings, one first sets up ratings words like "High", "Medium" and "Low", and gives scores to those words; then each of the things being rated is assigned a "High", "Medium" or "Low."

"ANP client data." ANP client data are data that represent real world values. For example, in a decision about an automobile purchase, ANP client data could be miles per gallon, number of passengers, headroom, cubic size of storage, etc.

The term "analytic network process" ("ANP") model, sometimes referred to as an ANP network model, an ANP network or similar, is defined herein to refer to a form of an analytic hierarchy process (AHP) in which values for higher level elements are affected by lower level elements and take the dependency of the lower level elements into account; further in the ANP model, the importance of the criteria determines the importance of the alternatives (as in an AHP); the importance of the alternatives themselves determines the importance of the criteria; further, the ANP model additionally has influence flowing between non-downward elements (in comparison to a conventional AHP model, in which influence flows only downwards); further the ANP model is a network, that is not a top-down-tree, of priorities and alternative choices. The terms "criteria" and "alternatives" are understood to those of skill in the AHP art. An ANP is further discussed in, e.g., Saaty, T. L. (2001) *Decision Making with Dependence and Feedback: the Analytic Network Process*, $2^{nd}$ edition.

The term "ANP weighted supermatrix" is defined as the supermatrix which is created from the ANP model, and which has been weighted, in accordance with ANP theory, and variations, extensions, and/or evolutions of such ANP theory. The ANP supermatrix is understood to be represented in rows and columns.

END OF DEFINITIONS

Part I: ANP Total Influence Analysis

In Part III, Part IV, Part V, and Part VI different influence analysis scores are constructed (using ANP row sensitivity as developed in Part II), each measuring influence from a different view point. However, it is desirable to have a single influence score which gives us an overall idea of the influence of the nodes in a network. In this paper we provide the framework for calculating such a total influence score using AHP/ANP techniques to aggregate the different influence scores.

1. Introduction

In Part III, Part IV, Part V, and Part VI we utilized ANP row sensitivity (see Part II) to calculate influence scores which gives information about how nodes influence the scores of the alternatives (each different influence score gives information about influence from a different view point). For instance ANP perspective analysis can be thought of as giving "long term influence", ANP influence as "medium term influence", ANP marginal analysis as "short term influence", and ANP rank influence tells just that, information about influence on rankings. To add more complexity to the situation, several of these have different ways of actually scoring the influence. For instance ANP influence can be measured by percent change, raw change, or rank change. Furthermore several of these breakdown further into an upper and lower score.

What is needed is a way to combine these scores into a single coherent Total ANP influence score. However, not only are there many scores, but their ranges are different. For instance ANP rank influence (See Part VI) is between 0 and 1, whereas the rank change metric (used in ANP influence and ANP perspective analysis) has output values of 0, 2, 3, 4, . . . . Thus before we can combine these scores we need a way to make them commensurate.

Both problems can be solved using ANP techniques themselves. That is we have various criteria (the different influence scores using the various metrics) and alternatives we score against some of those criteria (the alternatives are simply the nodes in the original ANP model we are doing Total ANP influence analysis upon). The problem of commensuration is simply a problem of taking in the raw influence scores and interpreting them to get idealized scores (a standard process of ratings in an ANP model).

In addition we can simplify the process by presenting the user with a few simple questions that can be used to fill in priority information for the criteria (allowing us to bypass the tedious process of directly pairwise comparing all of the criteria). We can use, for example, overarching criteria to accomplish this (see Part VII).

By using ANP to solve the total influence problem, we can provide a standardized result (using our predetermined priorities for the criteria), as well as a process for users to adjust it based on their needs. For instance, in a model where only rank information is important, the user may wish to de-emphasize (or even eliminate) non-rank related scores. Likewise, in a model where only score is important (for instance if money allocation is being done using linear programming techniques) they may wish to de-emphasize the rank scores.

2 AHP Models for Computing Total Influence

There are several ways we can structure an AHP/ANP model to arrive at a total influence score based on the individual influence scores. In the following sections we present two such structures as well as a method to fill in the priority information using a more limited set of pairwise data information.

2.1 Metric First Approach

The metrics used in all of the influence scores illustrated here can be broken down into the categories of "Rank Change", "Percent Change", and "Raw Change", which are representative of various metrics that can be used to measure an effect of a node in a decision model. Here, the influence types are "Rank Influence," "Influence", "Perspective", and "Marginal"; "Rank Influence", "Influence", and "Marginal" all have sub-influence-types of "Upper" and "Lower." We can construct a tree with the metrics as the top level criteria and the influence information below it. It looks like the tree illustrated in FIG. 4. FIG. 5 is the inversion of the tree illustrated in FIG. 4.

Referring now to FIG. 4, a first representation of a tree with metric as top level criteria and influence type below will be discussed and described. Rank change, percent change, and raw change are shown with just one copy each since they are at the top level of this metric-first tree representation.

There are multiple copies of rank influence, influence, and perspective in the representation of FIG. 4. Influence and perspective each appear in three locations; marginal and rank influence each show up once. What a user wants to have is an overarching criteria that has nodes in it called rank influence, influence, perspective, and marginal, and to figure out how important those four things are, and then back-fill the numbers.

The problem is, if a tree is used, aside from the top level, things can be listed redundantly, as in this example. Overarching criteria are criteria that sit over the tree and are identified together.

The "marginal influence" influence type (illustrated in FIG. 5) is an instantaneous influence. If a node is changed a very small amount, the change in the resulting alternative score, divided by the amount of change put it, provides the rate of change. This is much like calculating a velocity at a particular moment. The higher the marginal influence for a node is, the more sensitive the node is to a small change. The user will want to be extremely careful with priorities for a node with a high marginal influence since a small change in the priority for that node will have a large impact on the alternative scores.

The "rank change" metric involves changing a priority for the node up or down a fixed amount, and then determining how much the ranking is changed. As an example calculation, consider the simplistic situation there are two alternatives, when the change in node criteria happens, it causes a change in ranking from 1 to 2, and 2 goes to 1. Take the absolute value of the differences:

$|1-2|=1;$ $|2-1|=1.$

Then, add the absolute value of the differences:

$1+1=2.$

Thus the rank change can be calculated as 2. There are numerous other known ways to calculate how much a rank has changed, which can also be used.

The "percent change" metric involves changing the priority of the node using sensitivity analysis by a fixed amount. There is a before score (with the original weight) and the new score. Then a standard percent change calculation is performed:

(end value−start value)/start value, where start-value is not equal to 0.

The "raw change" metric is end value minus start value. This is the most simple-minded of the calculations.

In FIG. 4, under rank change, there is no "marginal influence" (also referred to as "Marginal") influence type. "Marginal influence" influence type calculation makes a very small change to the priority of a criteria, and then seeing how much of a tiny change that has on the alternatives. (The idea is similar to determining instantaneous velocity or performing a derivative calculation.) The tiny change caused by "marginal influence" influence type should not cause any rank changes at all. This should be a negligible change and hence is omitted.

In FIG. 4, under percent change, there is no "rank influence" or "marginal" influence type. Marginal is omitted because it is instantaneous and already involves a division calculation. Rank influence is omitted because it reflects a change in the ranks, so there is no percent change to consider.

In FIG. 4, under raw change, there is no "rank influence" influence type. "Rank influence" is omitted because it would be exactly the same rank influence as in "rank change". I.e., this would duplicate.

In a "perspective" influence type analysis, a value of a pre-selected node of the ANP model is pushed to be or approach 1, thus causing the other criteria for that node to approach 0 (since they must add up to 1 total); the scores of the other nodes are calculated in the usual way, which provides a perspective from the one pre-selected node and takes into account the feedback which is involved in an ANP model.

2.2 Influence Type First Approach

We can flip the previous structure over and instead place the influence type as top level criteria with the metrics underneath. In this case our tree would look like the tree illustrated in FIG. 5.

Referring now to FIG. 5, a second representation of a tree with influence type as top level criteria and metrics below will be discussed and described. This is the same data as in FIG. 4 but flipped around. Theoretically, there should be no difference in the outcomes whether the tree is top-down, or bottom up.

Without overarching criteria, referring to FIG. 4, the only group of influencers that can be worked on as a group together are the top level. With overarching criteria, there is no difference top-down or bottom-up.

2.3 Overarching Criteria

In both trees (FIG. 4, FIG. 5) we notice there are lots of subcriteria with the same name, signifying roughly the same idea. In Part VII such criteria are called conceptually identical criteria, and as such can have an overarching criteria which represents them. For instance the criteria "Rank Change", "Percent Change", and "Raw Change" all occur at various points in the tree (all together at one level) and thus form a cluster of overarching criteria. We can compare these overarching criteria and then have the results filter down through the tree. In fact we have three clusters of overarching criteria in this example of FIG. 4 and FIG. 5. They are the following.

Metrics: These are the following overarching criteria:
Rank Change
Percent Change
Raw Change Influence Type: These are the influence type overarching criteria:
Influence
Marginal Influence
Rank Influence
Perspective Upper vs. lower. As the name suggests, these are the criteria by those names. To be complete they are the following:
Upper
Lower Regardless of which tree approach we use, if we simply compare these overarching criteria, the results are the same. As an added bonus we can do sensitivity analysis based on these overarching criteria (e.g., to see what happens as we bump up the importance of "Upper" versus the node "Lower").

3. Default Weights and Ratings

Using the overarching criteria we can construct default starting weights for the importance of "Upper" versus "Lower", the metrics and the influence types. These serve as a starting point for analysis, representing the most commonly used weights. However some models may need different weights (as mentioned earlier, we might wish to put most weight on "Rank Change" if our model is only interested in ranking and not worried with relative sizes). In those cases we could use either sensitivity analysis on the overarching criteria, or simply adjust the information that went into getting the default starting weights (pairwise comparisons for instance).

Likewise if we wish to emphasize a particular part of the tree, we can do traditional sensitivity analysis (bypassing the overarching criteria). We could also do standard pairwise comparisons in places in the tree, again bypassing the overarching criteria.

There is another piece to this AHP model, and that is the various pieces of ratings information. As mentioned earlier, these individual influence scores do not generally lie between 0 and 1. Thus we need a ratings system setup for each of these criteria that takes in a raw score (i.e. the rank change metric might be 2, indicating two neighboring alternatives switched) and returning an idealized score.

Referring now to FIG. 1, a block diagram illustrating a system for ANP total influence analysis will be discussed and described. In the illustrated embodiment, there is provided a controller 107, with an ANP total influence analysis unit 103. The ANP total influence analysis unit 103 can access an ANP storage memory 105, in order analyze the ANP model in the ANP storage memory 105. Users can interact via an output unit 101b and/or an input unit 101d with the ANP total influence analysis unit 103. Also, users can interact via an input unit 101d with the ANP model stored in the ANP storage memory 105, for example where votes for the ANP model are input via the input unit 101d. The output unit 101b and/or input unit 101d can be remote or local.

Figure 2:
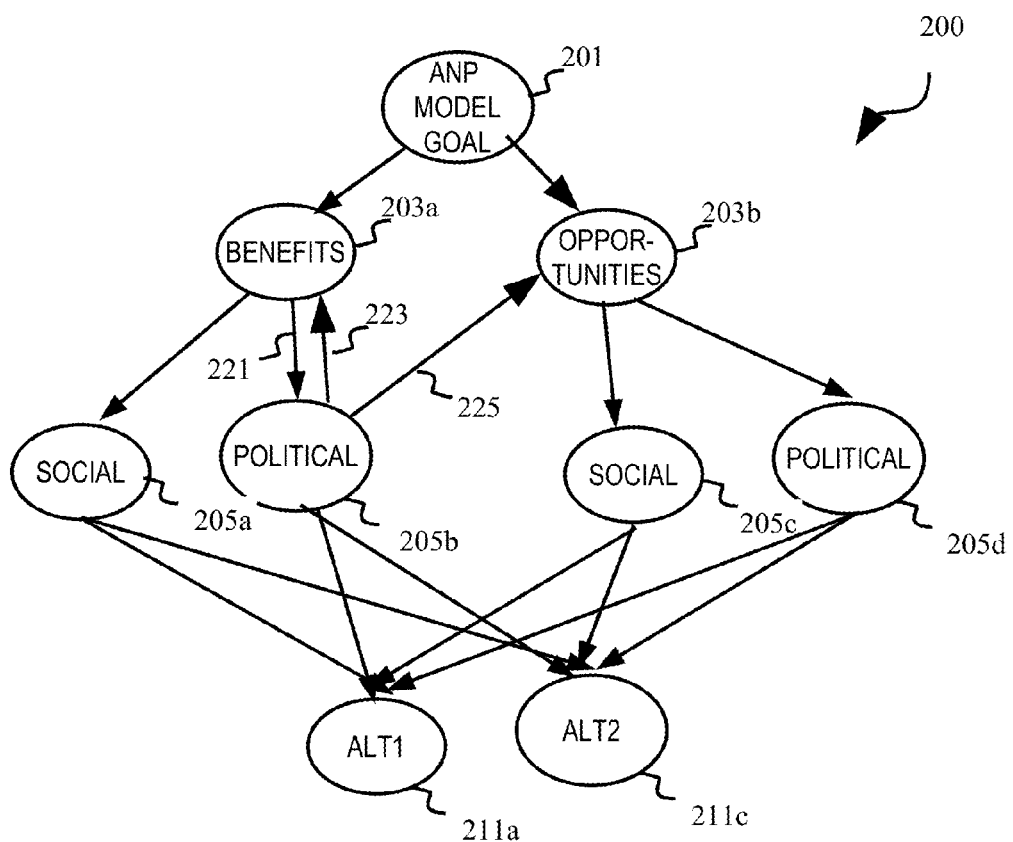
FIG. 2 is a diagram illustrating a simplified representation of an ANP model.

Referring now to FIG. 2, a diagram illustrating a simplified representation of an ANP model will be discussed and described. The illustration is simplified for ease of discussion. In the ANP model, there are conventionally provided control criteria that are benefits, costs, opportunities, and risks (commonly abbreviated BOCR). At the top of the ANP model 200, there is provided an ANP model goal 201, benefits 203a and opportunities 203b. (The usual costs and risks are not shown.) The benefits 203a is a node that includes a one way directional link from the benefits 203a node to the social benefits node 205a and the political benefits node 205b. The opportunities 203b is a node that includes a one way directional link from the opportunities 203b node to the social opportunities node 205c and the political opportunities node 205d. The political benefits node 205b includes a one way directional connection to the benefits node 203a and the opportunities node 203b. Each of the social benefits node 205a, the political benefits node 205b, the social opportunities node 205c and the political opportunities node 205d includes a separate one-way directional connection to alternative 1 211a and alternative 2 211c.

In a conventional ANP model, the connection defines how important the destination node is to the source node. Hence, a connection is directional, that is, it has a from direction and a to direction. For example, a connection from the conventional ANP model goal 201 to the benefits node 203a means that the user can define how important benefits are to the goal.

One of skill in this art will know that the ANP model can be represented as a matrix (or series of matrices), where a node is represented as a row in the matrix.

Figure 3:
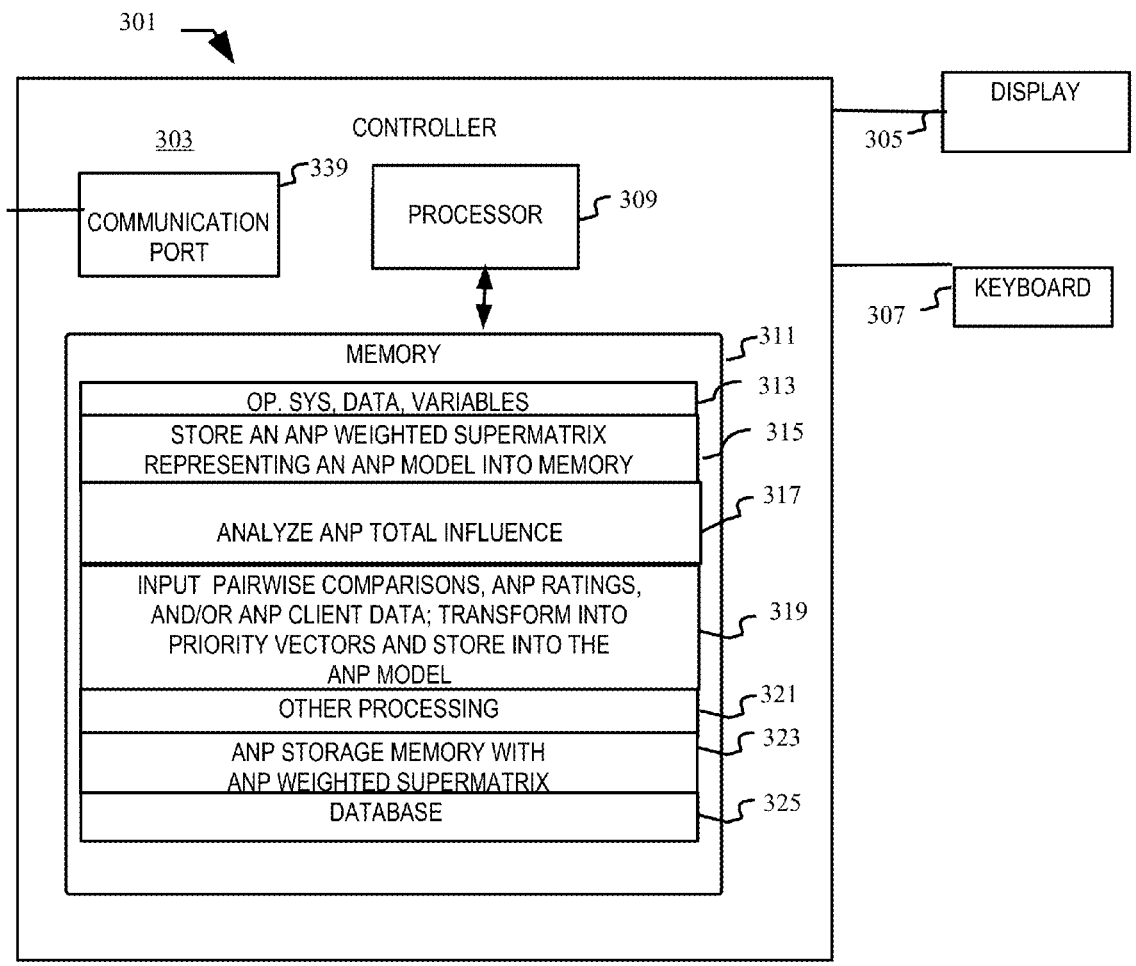
FIG. 3 is a block diagram illustrating portions of an exemplary computer.

Referring now to FIG. 3, a block diagram illustrating portions of an exemplary computer will be discussed and described. The computer 301 may include one or more controllers 303 having an optional communication port 339 for communication with an external device (not illustrated), a processor 309, and a memory 311; a display 305, and/or a user input device 307, e.g., a keyboard (as illustrated), trackball, mouse, or known voting device. Many of the other elements of a computer are omitted but will be well understood to one of skill in the art.

The processor 309 may comprise one or more microprocessors and/or one or more digital signal processors. The memory 311 may be coupled to the processor 309 and may comprise a read-only memory (ROM), a random-access memory (RAM), a programmable ROM (PROM), and/or an electrically erasable read-only memory (EEPROM). The memory 311 may include multiple memory locations for storing, among other things, an operating system, data and variables 313 for programs executed by the processor 309; computer programs for causing the processor to operate in connection with various functions such as to store 315 an ANP weighted supermatrix representing an ANP model into memory, to analyze 317 ANP total influence, to input 319 various data into the ANP model, and/or other processing 321; the ANP storage memory 323 in which the ANP weighted supermatrix is stored; and a database 325 for other information used by the processor 309. The computer programs may be stored, for example, in ROM or PROM and may direct the processor 309 in controlling the operation of the computer 301.

The user may invoke functions accessible through the user input device 307. The user input device 307 may comprise one or more of various known input devices, such as a keypad, a computer mouse, a touchpad, a touch screen, a trackball, a keyboard and/or a button device configured to register votes. Responsive to signaling received from the user input device 307, in accordance with instructions stored in memory 311, or automatically upon receipt of certain information via the communication port 339, the processor 309 may direct information in storage or information received by the user input device to be processed by the instructions stored in memory 311.

The display 305 may present information to the user by way of a text and/or image display 305 upon which information may be displayed. The display 305 may present information to the user by way of an available liquid crystal display (LCD), plasma display, video projector, light emitting diode (LED) or organic LED display, cathode ray tube, or other visual display; and/or by way of a conventional audible device (such as a speaker, not illustrated) for playing out audible messages.

The processor 309 can be programmed to store 315 an ANP weighted supermatrix representing an ANP model into memory. Before storing the ANP weighted supermatrix, values in the ANP weighted supermatrix can be obtained from an ANP model, for example, by inputting pairwise comparisons and creating an ANP weighted supermatrix therefrom, through various known techniques. An ANP weighted supermatrix representing the ANP model which is created can be generated, and the ANP supermatrix and/or the ANP model can be stored in memory. The memory can be local as illustrated (e.g., ANP storage memory with ANP weighted supermatrix), or can be remote if preferred.

The processor 309 can be programmed to analyze 317 ANP total influence. This is discussed elsewhere in this application in detail, and will not be repeated here.

The processor 309 can be programmed to interact with the user so as to input 319 new or modified pairwise comparisons, ANP ratings, and/or ANP client data, and transform the data into priority vectors and store into the ANP model. As with traditional ANP, alternatives can be pairwise compared. The data which is input can be transformed into priority vectors, as with traditional ANP, and matrix transformations can be prepared. The result can be stored into the ANP, such as the ANP storage memory 323 with ANP weighted supermatrix in the memory 311.

Optionally, other components may be incorporated in the computer 301 to produce other actions. For example, a user can interface with the computer 301, via a known user interface such as OUTLOOK software, WINDOWS software, and/or other commercially available interfaces. Further, the computer 301 can send and receive transmissions via known networking applications operating with the communication port 339 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the synthesizer can be omitted. In addition, some of these functions may be performed predominantly or entirely on one or more remote computers (not illustrated); and therefore such functions can be reduced or omitted from the processor 309 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The ANP storage memory 323 is illustrated as being part of memory 311 stored locally on the controller 303. It will be appreciated that the ANP storage memory 323 can be stored remotely, for example, accessed via the communication port 339 or similar.

The computer 301 can include one or more of the following, not illustrated: a floppy disk drive, an optical drive, a hard disk drive, a removable USB drive, and/or a CD ROM or digital video/versatile disk, which can be internal or external. The number and type of drives can vary, as is typical with different configurations, and may be omitted. Instructions that are executed by the processor 309 and/or an ANP model can be obtained, for example, from the drive, via the communication port 339, or via the memory 311.

The above is sometimes described in terms of a single user, for ease of understanding and illustration. However, it is understood that multiple users can be accommodated in various embodiments. For example, multiple users each can input pairwise comparisons.

Furthermore, the devices of interest may include, without being exhaustive, general purpose computers, specially programmed special purpose computers, personal computers, distributed computer systems, calculators, handheld computers, keypads, laptop/notebook computers, mini computers, mainframes, super computers, personal digital assistants, communication devices, any of which can be referred to as a "computer", as well as networked combinations of the same, and the like, although other examples are possible as will be appreciated by one of skill in the art, any of which can be referred to as a "computer-implemented system."

One or more embodiments may rely on the integration of various components including, as appropriate and/or if desired, hardware and software servers, database engines, and/or other content providers. One or more embodiments may be connected over a network, for example the Internet, an intranet, a wide area network (WAN), a local area network (LAN), or even on a single computer system. Moreover, portions can be distributed over one or more computers, and some functions may be distributed to other hardware, in accordance with one or more embodiments.

Any presently available or future developed computer software language and/or hardware components can be employed in various embodiments. For example, at least some of the functionality discussed above could be implemented using C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

Figure 6:
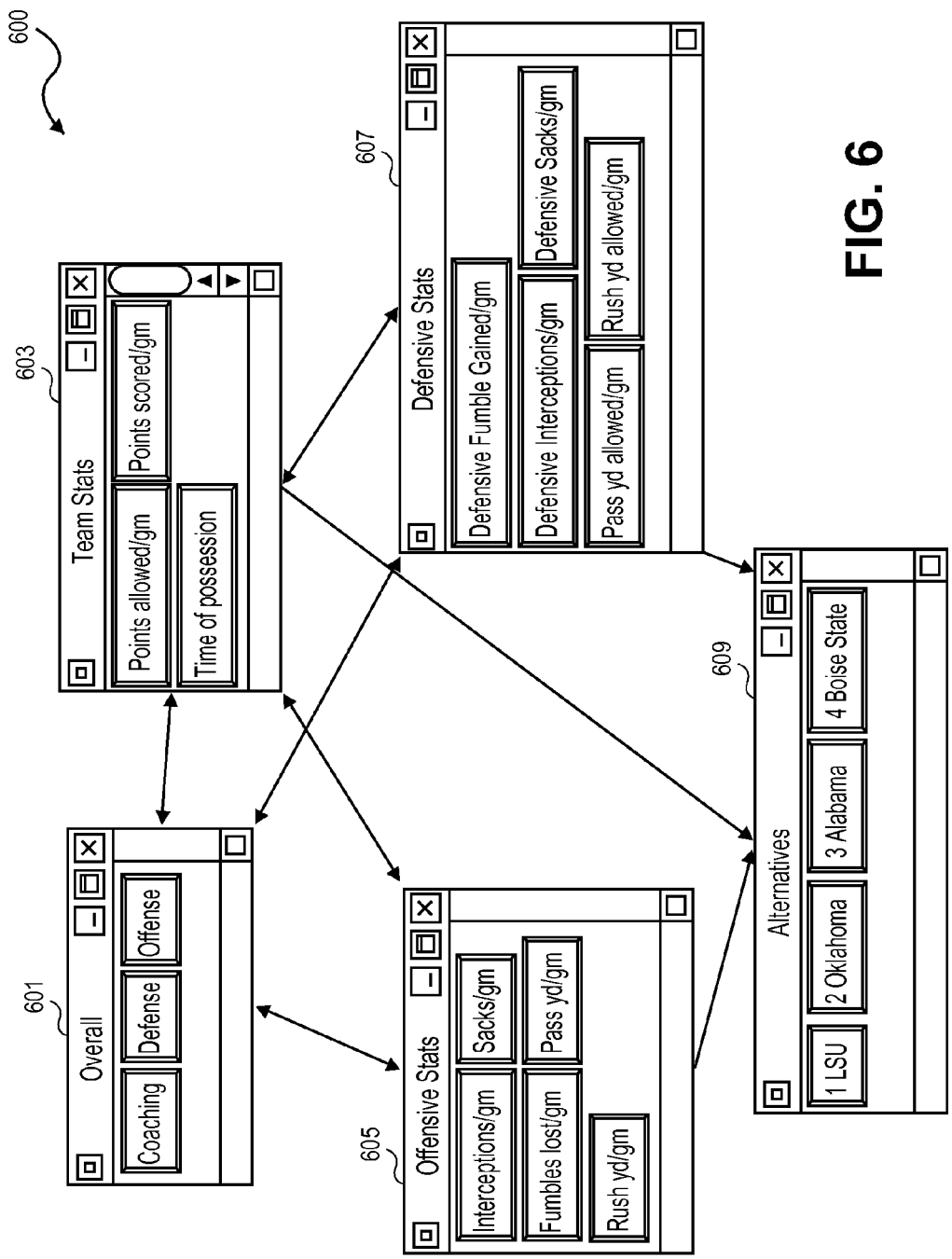
FIG. 6 is an example model for illustrating influence analysis.

Referring now made to FIG. 6, an example model for illustrating influence analysis will be discussed and described. This model is designed to evaluate the top four NCAA football teams as of the ranking on Sep. 22, 2011. The model is not intended to be exhaustive, rather its purpose is to illustrate the usefulness of rank influence. FIG. 6 reproduces an image of the ANP model 600 on a user interface as seen in Super Decisions. In the model there is an Alternatives cluster 609 for the teams we are ranking, as well as the following criteria clusters 601, 603, 605, 607:

Overall: This cluster 601 contains the large influences on a team's ranking, Offense, Defense, and Coaching. Teams are not compared with respect to these criteria. The values for these criteria come from the statistically oriented criteria they connect to.

Offensive Stats: The criteria for basic offensive statistics are placed in this cluster 605, and teams are scored with respect to these based upon those statistics.

Defensive Stats: The criteria for basic defensive statistics are placed in this cluster 607, and teams are scored with respect to these.

Team Stats: The team wide statistics are placed in this cluster 603 and the teams are scored with respect to these.

After all of the pairwise, ratings, and direct data is inputted into this model we have the following synthesized scores for the teams (numbers are quoted in their normalized form, that is, all the scores add up to 1.0), shown in Table 1.

TABLE 1

| Team | Score | Rank |
|---|---|---|
| LSU | 0.247 | 3 |
| Oklahoma | 0.286 | 1 |
| Alabama | 0.271 | 2 |
| Ball State | 0.195 | 4 |

The question is which of the criteria is most influential to the ranking of the teams. The rank influence analysis total tells us that information, and the following Table 2 describes the rank influence of the most influential nodes, in descending order.

TABLE 2

| Criteria | Parameter | Rank Influence |
|---|---|---|
| Defensive Sacks/gm: upper | 0.530395 | 0.937969 |
| Interceptions/gm: upper | 0.542684 | 0.912891 |
| Defensive Fumble Gained/gm: upper | 0.547229 | 0.903613 |
| Pass yd/gm: upper | 0.589865 | 0.816602 |
| Sacks/gm: upper | 0.596947 | 0.802148 |
| Pass yd allowed/gm: upper | 0.603694 | 0.788379 |
| Points scored/gm: upper | 0.609102 | 0.777344 |
| Time of possession: upper | 0.622299 | 0.75041 |
| Defensive Interceptions/gm: upper | 0.6372 | 0.72 |

The first column is the criteria being analyzed (the :upper means we are looking at rank influence moving the priority of the criteria upwards). The second column is the parameter value that caused the first change in the rankings, and the third column is the rank influence score. From these calculations, for this model we see that the defensive sacks per game is the most influential to changing the rankings. Next most influential is interceptions per game (that is the offense turning the ball over through an interception). In addition, rank influence shows that the following criteria have no effect of the rankings:

Fumbles lost/gm
Coaching
Defense
Points allowed

A user interface to manipulate these values can be conveniently provided, as, e.g., a spreadsheet, for example with criteria as the rows, a column for criteria names and a column for combined influence; and/or as a display of bars and columns: a column for, e.g., influence, marginal influence, rank influence and perspective. The bars can be dragged out as is known to instruct the system to re-distribute weight. A user interface can include, e.g., a drop-down menu indicating metric type, influence level, and/or upper-lower, which is to be selected. An embodiment can provide a predetermined healthy value for a standard model. These and other known techniques can be used to provide a user interface to interact with a user so as to (optionally) select one or more metrics to use to determine total influence, isolate the selected metrics, and to redistribute weight of the criteria.

A user using such a user interface can perform this analysis after the data has been input into the model. A user wants to know which are the most important factors in the decision. The total influence determines which criteria in the model has the most influence on the alternatives, e.g., on budgets, etc. In the influence on the whole decision, many different things have importance. Interacting with the user interface to, e.g., drag out the importance of rank influence determines the order of importance. Marginal analysis can be manipulated to determine the most sensitive areas of the model, that is where uncertainty in nodes could lead to some changes in the models.

In another embodiment, the user interface is simplified, so as to provide a predetermined subset of metric calculations, influence level and/or upper-lower.

Every criteria in a model has one of these metric calculations. One score can be developed for each node.

The system also can provide an ability to modify the importance of various factors, thus can determine, "which node is the most sensitive?", "which criteria most affects the ranking?", etc.

Using the football model above, all of the data is already populated into the ANP model. The user wants to know which team will be best. The question is, which criteria is most sensitive to changing the ranking since all I care about is how the teams score relative to each other., i.e., what will change the ranking. The rank change scores will be the most important, and will tell the user which criteria will have the most effect on the ranking. Percent change will be more interesting if the change has to do with numbers instead of rank, e.g., for budget. Perspective analysis is useful in limited situations, e.g., how two teams match up defensively.

In performing this analysis, one or more of rank change, raw change, and/or percent change can be dropped to zero and hence ignored or deactivated. There is no need to calculate the metric if it is deactivated.

One (or more) of the metrics can be isolated and analyzed alone, that is without reference to the other metrics. Reference is again made to FIG. 5. For example, rank change can be calculated on its own, as previously described. If the user is interested in, e.g., percent change, those criteria can be isolated and the metric can be performed on those criteria alone, for the data-populated ANP model.

It should be noted that the particular selection and breakdown of metrics discussed herein is by way of example and is not intended to be limiting. Other metrics can be made available now or in the future which can be included in determining the total influence, such that the total influence analysis encompasses not only percent change, rank change, perspective metrics, etc. but also other metrics now or heretofore known.

Furthermore, one of skill in the art will understand that different calculations are conventionally available to determine "percent change", "rank change", "raw change", some of which are discussed above for convenience of illustrating the analysis.

Sensitivity analysis for analytic hierarchy process (AHP) trees is boring, because there is no feedback. Things that occur lower in the tree are just split off and replicated; the top most level has the most influence and hence would have the highest score if the system discussed herein is applied thereto. In the ANP model, however, an embodiment can indicate that any of the criteria is most influential, and so can provide more insight into what is going on with the decision modeled in the ANP. This procedure and/or system provides precise metrics about which is most influential.

Figure 7:
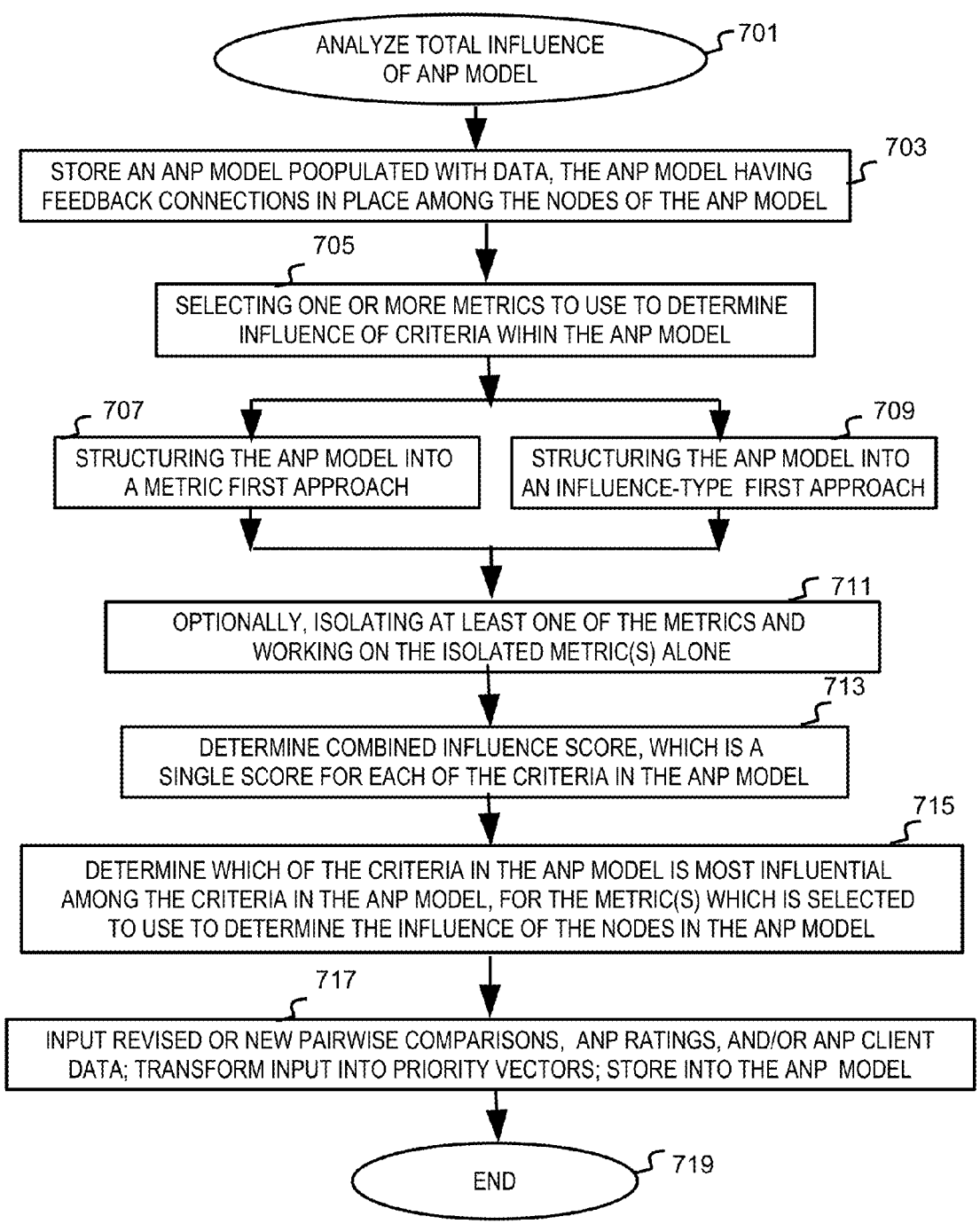
FIG. 7 is a flow chart illustrating a procedure to analyze ANP total influence.

Referring now to FIG. 7, a flow chart illustrating a procedure 701 to analyze total influence of an ANP model will be discussed and described. The procedure can advantageously be implemented on, for example, a processor of a controller, described in connection with FIG. 3 or other apparatus appropriately arranged. Much of the details relating to the procedure 701 have been discussed elsewhere and will not be repeated with regard to the flow chart.

According to the procedure 701, an ANP model is stored 703 which is populated with data, and the ANP model has feedback connections in place among the nodes of the ANP model. Known techniques can be used to provide the ANP decision model populated with data.

The procedure 701 can interact with a user to select 705 one or more metrics to be used in order to determine the influence of criteria within the ANP model. This is optional. Alternatively, the total influence can be performed using all metrics available to the system, or using a predetermined subset of metrics available to the system. For example, the procedure 701 can interact with the user to select at least one metric to be used (for example, one or more of rank change, percent change and/or raw change) to determine influence. That is, a user can decide which metric to use, e.g., by presenting a tree that represents the different way that a total influence can be determined.

The procedure 701 can structure 707 the ANP model into a metric first approach, and/or structure 709 the ANP model into an influence-type first approach, both of which have been discussed above. One of these structures can be selected by the user as discussed above, or alternatively, can be predetermined to be used by the system.

Optionally, the procedure 701 can isolate 711 the one or more selected metrics and work on the isolated metric alone, as discussed further herein. Some of the metrics can be isolated and worked on alone, without working on the other metrics. This can make the calculation faster. Speed of calculation can be an issue, depending on how large the model is. Marginal and perspective metrics are more computer-expensive than other metrics. Isolating the metrics can avoid swapping in/out for calculations.

Then, the procedure 701 can determine 713 a combined influence score, which is a single score for each of the criteria in the ANP. If metrics were selected, only the selected metrics are used to determine the combined influence score. Optionally, the combined influence score can be output for display to the user.

The procedure 701 can determine 715 which of the criteria in the ANP model is the most influential among the criteria in the ANP model, for the metric(s) which was selected to use to determine the influence of the nodes in the ANP model. This can determine which criteria among the criteria in the ANP decision model is the most influential for the selected metric, that is, which of the criteria has the highest influence score. Optionally, an indication of the most influential criteria can be output for display to the user. What a combined influence looks like: it is a single score for each criteria in the decision model. The procedure 701 can provide a function to sort the scores to allow a user to quickly see which is most influential. Note that the overarching criteria can provide the ability to do sensitivity at any level. Optionally, the procedure 701 can use the overarching criteria in the calculation of the combined influence score.

Also, the procedure 701 can interact with one or more users to input 717 revised or new pairwise comparisons, ANP ratings, and/or ANP client data; to transform the input into priority vectors; and to store the priority vectors into the ANP model. This can be done in accordance with known techniques for modifying data in an ANP, such as by interacting with a user. The user interface side of inputting pairwise comparisons, ratings, or client data can be performed according to known techniques. For example, the process 701 can query the user to input, "with respect to opportunities, which is more important: social or political?" to input values of a pairwise comparison of the social and political opportunities nodes. Also, the process 701 can transform the input values into priority vectors in accordance with known techniques. Further, the process 701 can store the new or modified input values and the priority vectors into the ANP model. In an embodiment, this is used for populating 703 the ANP model with data.

Part II: Row Sensitivity Analysis

Sensitivity analysis in ANP has several difficulties. The goal of sensitivity analysis is to discover how changes in the numerical information in an ANP model affect the scores for the model's alternatives. The numerical data involved could be information directly supplied to the model, such as pairwise data. On the other hand we could also want to analyze sensitivity to calculated data, such as local priorities, or global priorities. These methods do indeed show us certain levels of sensitivity. However, for the vast majority of single level ANP models, they either report useless information (tweaking global priorities is only useful in multi-level models at best), or no sensitivity (a single pairwise comparison has no effect in a well connected ANP model, likewise a single local priority has no effect in a well connected ANP model). These do little better for multi-level models.

The problem is how to perform acceptable AHP tree-type sensitivity measurements in the ANP network setting. We want to be able to have an analysis that will come up with a result which is similar to AHP tree sensitivity but in an ANP context. We want to be able to analyze the ANP network to see how influential the nodes are or how sensitive our results are to the nodes. There are pre-existing methods and systems for performing sensitivity analysis in an ANP. These ideas, however, are still lacking.

The systems and methods herein concern a new type of sensitivity analysis that gives rise to useful sensitivity in ANP modes, even single level ANP models, where other methods have failed. We will use the terminology "row sensitivity" for this new kind of analysis. We will show that, if we accept certain axioms about preserving ANP structure, row sensitivity as outlined here, is a kind of calculation we can perform. It appears that any other analysis will disrupt the basic structure of the model, rendering the results less meaningful. We feel obliged to note that, although we speak throughout here of single level ANP models, row sensitivity is equally useful in multiple level ANP models. In fact, it serves, in many respects, as a superior replacement to global priorities sensitivity analysis, in that the former can preserve the overall structure of the model in a way that the latter cannot.

1.1 Sensitivity in AHP Trees

By way of introduction, let us review the basic idea and result of standard sensitivity analysis in the case of AHP trees. Although the AHP tree case does not show us the way to proceed, it does show us the kind of information we would like to glean from sensitivity.

In typical AHP tree sensitivity, we take the local weights for the collection of criteria under a common parent, and drag up or down a particular criteria's weight. Since we are dealing with a tree, a criteria's local weight and global weight are essentially the same (a simple rescaling is the only change that happens to go from local to global). By changing said local weight (or weights) we get new local priorities for the criteria in question, and re-synthesize to get new scores for our alternatives. By dragging a single criteria's priority towards one or towards zero, we get an idea of the influence that criteria has on our alternatives.

Notice, in the process of doing AHP tree sensitivity we may only choose the criteria we wish to analyze, and we are then able to see the impact of that criteria on the alternatives. We would like to be able to do a similar analysis in the ANP case.

Consider, for example, that conventional AHP tree sensitivity can be applied to ANP, which is what is done in SuperDecisions. This is sometimes referred to as local priority sensitivity. However, there are additional connections in an ANP. You can talk about how important a node is with respect to another node. This works well for AHP trees because every node only has one parent, so that the connection is to the parent. In ANP, in contrast, there can be multiple connections (or parents) to one given node (a "fixed" node). In ANP, you can inquire how important a node is "with respect to" another node, since the connections in ANP are not automatically parent-child direction connections. Furthermore, the mathematics shows that no one node is "important" in an ANP network since one little change in one connection gets overwhelmed by all of the other data, due to all of the many connections.

In another conventional idea, discussed further below, the priority of a node (in the ANP) is changed after the limit matrix is calculated. That is, the node it is looked at after the fact. However, all of the ANP structure is ignored.

The technique referred to as global sensitivity tells you how important a node is, however, it is after all of the ANP limit matrix calculations have happened, so it essentially discards a lot of ANP information. It does not accurately tell how sensitive things are.

Sensitivity analysis, as it is conventionally used, is a very qualitative field. A user does not know what the quantitative difference is after making the change to a node. In practice, a user does a sensitivity analysis with the bar chart (as enabled by Decision Lens) to see how important the nodes are, such as by dragging a node all the way out to see that it has no influence.

1.2 Prior Existing ANP Sensitivity Ideas

We have already briefly mentioned most of the prior existing ANP sensitivity ideas. However we would like to collect them together here, and explain why we consider them to be insufficient analogues of AH P tree sensitivity.

Pairwise Comparison Sensitivity.

In this known analysis, a particular entry in a pairwise comparison matrix (and its reciprocal on the other side of the matrix) is changed, new local priorities are calculated, and the alternatives are re-synthesized accordingly. In order to do this a "with respect to" node is chosen, and two other nodes are chosen. Simply by virtue of all of these choices, this is not a sufficient analogue of AHP tree sensitivity. In addition, nothing useful is found in such analysis, since one pairwise comparison essentially never has an impact (except in a few degenerate cases).

Local Priority Sensitivity.

This known sensitivity technique amounts to changing a single entry in the unsealed supermatrix, recalculating the limit matrix, and re-synthesizing to arrive at alternative scores. In order to do this analysis we choose a "with respect to" node (the column of the supermatrix) as well as the row (the node whose priority we are changing). This method has two shortcomings. First we are not analyzing the sensitivity of a single node but rather of the node with respect to another node. Secondly, in nearly all cases, there is simply no sensitivity to witness (much as in the case of pairwise comparison sensitivity).

Global Priority Sensitivity.

In this known analysis, we tweak the global priority of a node (that is, after the limit matrix calculation has already occurred). This analysis proceeds by calculating the limit matrix, deriving global priorities from that limit matrix, then tweaking a node's global priority (and rescaling the others), and then re-synthesizing. This is problematic in several ways. First, if the model is a single level all calculations are done at the limit matrix level, and we are tweaking after that point so nothing useful has occurred. Second, even if the model is multiple level, by tweaking the global priority of a node after the limit matrix calculation our sensitivity analysis lies outside of much of the ANP theory, and thus feels somewhat foreign. It does have the advantage of showing the sensitivity of the model to a particular node, but at the cost of only working for multiple level models, and working outside of the context of the majority of ANP theory.

1.3 Proposed Solution

The present system is different, for reasons including that it can assign a value measuring how influential a node is. Consequently, one can identify the most influential node (or nodes). This metric might drive a user to reevaluate, e.g., their priorities (or pairwise comparisons) for that most influential node since priorities for that node makes a big difference to the ANP; or to spend more time evaluating the priorities of the more influential nodes. Alternatively, it might turn out that a small portion of nodes are most influential, and those nodes might be more heavily evaluated.

Consider that the ANP network models a decision, such as, a football team, a budget, a decision to buy a car, or other decisions which are usually complex and take into account various factors. The user can find out where in the analysis to focus their time by measuring sensitivity of different factors. For example, when the ANP network models a football team decision, the system and process helps the user decide whether to spend more time evaluating priorities with respect to the quarterback or the kicker? With a car, a user can determine whether to spend more time analyzing safety or price? As a post analysis step, a user can determine that, for example, of 30 nodes, only three are influential to the decision. By knowing that, the user can determine that, e.g., tolerance to risk affects the decision more than any other factor. In the past, one problem with conventional ANP is that where the numbers are coming from is a hidden process; this process and system can allow greater transparency to see where things are influencing the decision.

The problem we have is to get an ANP analogue of AHP tree sensitivity that yields similar results. The proposed solution can be summarized as taking the global priorities approach but moving it before the limit matrix calculation. Or, if one prefers, it can be summarized as simultaneously performing local sensitivity analysis on every column.

We want to obtain tree-sensitivity kinds of results from AHP into the ANP model context, with the same kind of usefulness. Further in accordance with exemplary embodiments, there is provided a system and processing in an ANP structure to get the same sorts of results.

Improved row sensitivity can be provided in an ANP network. The basic idea is to change every entry in the scaled supermatrix (and then rescale the rest).

The difficulty we face is determining how much to change each entry in the given row of the supermatrix by. In order to keep the analogy with AHP tree sensitivity, we would like to have a single parameter p that we vary between 0 and 1 (corresponding to the local weight in AHP tree sensitivity). By changing that single parameter we would be changing all of the entries in the given row of the scaled supermatrix (again we could do the same in the unsealed supermatrix, the difference in results is that one tells us how sensitive we are to the node globally as opposed to how sensitive we are to the node when viewed as a part of its parent cluster).

The question becomes, for each value of the parameter p, what should we change the entries in the given row of the scaled supermatrix to? There are many choices possible, however we will see that up to continuous change of the parameter there is only one choice which will preserve the "ANP structure" of the model. (This fuzzy terminology will be made precise in the coming pages. The basic idea of preserving "ANP structure" is that we do not change the node connections, and we leave ratios of local priorities as unchanged as possible.)

2 Supermatrix Row Perturbations which Preserve ANP Structure

The idea behind row sensitivity is to perturb (that is, change by a predetermined amount) each entry in a given row of the scaled supermatrix. In order to stay stochastic, when we perturb a single entry in the supermatrix we correspondingly change the rest of the entries in that column, so that the column still adds up to one. However, the "main change" in a column is to the entry in the given row, and the changes to the rest of the column could be seen as consequences of that original entry that is changed. Since we will be changing each entry in a row, we will be changing the rest of the entries so that the columns still add to one (by simply rescaling the rest of the entries in that matrix). In order to precisely describe what preserving ANP structure means, we use a bit of notation.

2.1 Notation and Definitions

We will use W for the weighted supermatrix, $W_{i,j}$ for the entry in the $i^{th}$ row $j^{th}$ column of the weighted supermatrix. We have already mentioned that we want to use a single parameter p between 0 and 1 to describe the perturbation of our supermatrix. Let us define precisely what we mean now.

Part II Definition 1 (Entry perturbation). Let W be the weighted supermatrix of an ANP model. We say W' is a perturbation of W in row i column j if:

W' is stochastic of the same dimensions as W

The columns of W' agree with the columns of W except for possibly the $j^{th}$ column.

The ratios of the entries in the $j^{th}$ column of W' are the same as those of W except possibly the ratios involving the $i^{th}$ row.

Note 1. The above definition essentially says we have changed the entry in row i column j, and rescaled the remainder of the column so that the column still adds to one.

Part II Definition 2 (Matrix space). Let $M_{r,k}(X)$ be the space of matrices with r rows, k columns, and entries in the space X.

Part II Definition 3 (Row perturbation). Fix an ANP model (a single level of it) and let W be its weighted supermatrix (whose dimensions are n×n). A family of perturbations of W in the $r^{th}$ row is a continuous function f: $[0, 1] \rightarrow M_{n,n}([0, 1])$ with the following properties.

1. f(p) is a stochastic matrix.
2. For some $0 < p_0 < 1$ we have $f(p_0) = W$. This $p_0$ is called the fixed point of the family.
3. f(p) is the result of a sequence of perturbations of W in row r column j as j ranges from 1 to n.

When the family of perturbations is clear, we will write W(p) for f(p), abusing notation in order to gain readability.

Part II Definition 4 (Trivial Column). Fix an ANP model (a single level of it) and let W be its weighted supermatrix (whose dimensions are n×n). Also fix a row 1≤r≤n to consider a family of row perturbations on. A column j of W is called a trivial column for row perturbations on row r (or simply a trivial column) if either the column is zero, or the column has all zero entries except the $r^{th}$ entry is 1. A column is call non-trivial if it is not trivial.

2.2 Basic Properties Desired

There are two basic properties we would like a family of perturbations of the $r^{th}$ row of the weighted supermatrix to have. They deal with the end points of the family as well as the general flow of the family. We will describe the properties as well as the reason for wanting those properties now.

Let's consider W(0). In considering the AHP tree analogy, the parameter p corresponds to the local weight of our node/criteria. So W(0) can reflect what happens when the $r^{th}$ node is completely unimportant. In other words it can set all of the local weights for the $r^{th}$ criteria to zero, i.e. make the $r^{th}$ row of the supermatrix zero. The only question is what we can do with columns that have the $r^{th}$ row's entry as a 1 (and thus the rest in that column are zero).

Trivial columns are unchanged for $0 \le p \le 1$ by construction. If trivial columns were to change at p=0 we would lose continuity at p=0. Thus, in order to preserve continuity we will keep trivial columns unchanged even when p=0. Next let's consider W(1). Again considering the AHP tree analogy, the parameter p being set to one places all importance on the node/criteria in question, and zeros out the rest. So the matrix W(1) can have the $r^{th}$ row with 1's in any column that had non-zero entries in W (the columns that had the $r^{th}$ row with a zero means there was no connection there, so we should not change those values), and the rest remain zero.

Lastly in the AHP tree case, as the parameter increases the local priority (and hence global priority) increases. Because of the nature of feedback within an ANP model we cannot guarantee this global priority behavior. However we would like to have, as p increases the local priorities for the $r^{th}$ criteria to increase (i.e. the values in that row of the weighted supermatrix).

In other words the coordinate functions for the $r^{th}$ row of the family of matrices W(p) are increasing functions.

2.3 Maintaining Proportionality

We reach a consideration about how a family of perturbations of the weighted supermatrix in a given row should behave. There are, of course, many ways we could perturb the values in a given row, based on the information of a single parameter (we could, for instance set all of the entries in that row to that parameter value). However not many of these choices would preserve the overall ANP structure, and this is what we consider now.

The idea is to maintain proportionality of elements in the supermatrix throughout our family as much as possible. We cannot keep all of the proportions identical since that would mean the matrix would never change (since the matrix needs to remain stochastic). In fact motivation comes from looking at the row we are perturbing and our axioms that W(0) can zero out that row and W(1) can place all importance on that row.

If we want to mimic AHP sensitivity, W(0) zeros out that row. By continuity this means that as $p \to 0$ W(p) should go to W(0). Thus, however we change that row we can make sure that as $p \to 0$ that row goes to zero. If we force ourselves to maintain proportionality in that row no matter what value p has (at least for p close to zero) we can achieve the desired result. For instance think of p as a scaling factor to multiply the row by. Then as $p \to 0$ that row does go to zero, and maintains proportionality. So it seems we can hope to have proportionality maintained in the row in question for small values of p.

However, considering W(1) shows this is not possible for values of p close to 1. For, if we maintain proportionality in that row, that row cannot go to 1 (in fact the best it could do is have one entry go to one, and the rest would maintain their proportionality to that one). Since it is not possible to maintain proportionality in that row and have that row go to one, we can look elsewhere for a position to maintain proportionality in. If we force the other rows to maintain their proportionality when p is close to 1, it turns out to maintain the proportionality of the distance from 1 of the entries in our row (which is a useful proportionality to maintain).

Thus the proportionality we expect to maintain depends on the values of our parameter p. Although no formal proof has been yet given that these proportionalities are possible we hope to have shown at least why we cannot have proportionality in the row in question as p goes to 1.

2.4 Formal Definition

We will now collect the various ideas presented above into a single definition for the kind of object we wish to study and use to extend the concept of AHP tree sensitivity to the ANP world.

Part II Definition 5 (Family of row perturbations preserving ANP structure). Fix an ANP model (a single level of it) and let W be its weighted supermatrix (whose dimensions are n×n). A family of perturbations of W in the $r^{th}$ row f: $[0, 1] \to M_{n,n}([0, 1])$ is defined as preserving the ANP structure if the following 1-5 are true:

1. Trivial columns (if present) remain unchanged throughout the family. In other words if the $j^{th}$ column of W is trivial then the $j^{th}$ column of f(p) equals the $j^{th}$ column of W for all $0 \le p \le 1$.

2. If $W_{r,i}$ is zero then the $i^{th}$ column of f(p)=W(p) equals the $i^{th}$ column of W for all p (that is, if there is no connection from i to r we will not create one ever in the family).

3. If $W_{r,i}$ is non-zero and the $i^{th}$ column of W is non-trivial, then $W(p)_{r,i}$ is not zero except for p=0 (that is the connection from i to r is not broken except when p=0 and all influence is removed from node r).

4. If $p_0$ is the parameter for which $W(p_0)=W$ then for $p<p_0 W(p)$'s $r^{th}$ has the same proportionality as W's $r^{th}$ row. That is, for $p<p_0$ we have $W_{r,i}$ $$\frac{W_{r,i}}{W_{r,j}} = \frac{W(p)_{r,i}}{W(p)_{r,j}}$$

where these fractions are defined.

5. For $p>p_0$ we have for all i, i'≠r:

$$\frac{W_{i,j}}{W_{i',j'}} = \frac{W(p)_{i,j}}{W(p)_{i',j'}}$$

where these fractions are defined. That is, maintain proportionality of all of the rows except for the $r^{th}$ row.

6. We say that the family is increasing if $W(p)_{r,i}$ is an increasing function if $W_{r,i}$ is not zero, and is the constant function zero if $W_{r,i}=0$.

With this we have a definition of a family of row perturbations that preserve ANP structure, and good reasons to accept this as useful definition. However we do not yet know if such families exist.

2.5 Existence

In fact such families do exist, as we shall now prove. First we define our proposed family, and then prove it preserves the ANP structure.

Part II Definition 6. Fix an ANP model (a single level of it) and let W be its weighted supermatrix (whose dimensions are n×n), and fix r an integer between 1 and n. Pick $0<p_0<1$, and define $F_{W,r,p_0}:[0; 1] \to M_{n,n}([0, 1])$ in the following fashion. Firstly leave trivial columns unchanged throughout the family. Next, if $0 \le p \le p_0$ define $F_{W,r,p_0}(p)$ by scaling the $r^{th}$ row by $$\frac{p}{p_0},$$

and renormalizing the columns. Since we have changed the entry in the $r^{th}$ row and do not want to change the entry in the $r^{th}$ row again by renormalizing, we instead scale the rest of the entries in that column to renormalize the columns. If $p_0 \leq p \leq 1$ define $F_{W,r,p_0}(p)$ by leaving alone columns of W for which $W_{r,j}=0$ and scaling all entries in the other columns, except for the entry in the $r^{th}$ row, by $$\frac{1-p}{1-p_0}$$

and change the $r^{th}$ entry to keep the matrix stochastic.

Note 2. There is a subtlety, in that we have defined the above function in two ways for $p=p_0$. However using either formula we get the result of W when we plug in $p=p_0$ so that the above function is well defined.

Note 3. The above function is a piecewise defined function whose pieces are linear, and they agree at the intersection of the two regions of definition. Thus the above function is continuous.

Theorem 1. Fix an ANP model (a single level of it) and let W be its weighted supermatrix (whose dimensions are n×n), fix r an integer between 1 and n, and pick $0 < p_0 < 1$. Then $F_{W,r,p_0}(p)$ is a family of row perturbations preserving the ANP structure.

Proof. It is clear that $F_{W,r,p_0}(p)$ satisfies the three conditions for being a family of row perturbations, thus we can proceed to demonstrating that it preserves the ANP structure. However the preservation of ANP structure simply follows from the definitions. In addition it is clear that $F_{W,r,p_0}(p)$ is increasing as well.

2.6 Uniqueness

Thus we have a family of row perturbations which preserves the ANP structure, which is useful. However, what is surprising is that this family is essentially the only family preserving the ANP structure, up to change of parameter. Let us make this precise.

Theorem 2 (Uniqueness). Fix an ANP model (a single level of it) and let W be its weighted supermatrix (whose dimensions are n×n), fix r an integer between 1 and n, and pick $0 < p_0 < 1$. Let f(p) be a family of row perturbations preserving the ANP structure with $p_0$ as the fixed point. Then there exists a continuous map h: $[0, 1] \to [0, 1]$ so that $$f = F_{W,r,p_0} \circ h$$

Proof. We will define h(p) piecewise, first for $0 \leq p \leq p_0$ and then $p_0 \leq p \leq 1$. Let $0 \leq p < p_0$. Then f(p) preserves ratios in the $r^{th}$ row, i.e. the $r^{th}$ row is a scalar multiple of the $r^{th}$ row of W, let j be a column for which $W_{r,j} \neq 0$. We can calculate that scalar as $$\frac{f(p)_{r,j}}{W_{r,j}}$$

and thus we define $$h(p) = p_0 \cdot \frac{f(p)_{r,j}}{W_{r,j}}.$$

Since f is continuous its (r, j) entry function is continuous and thus h is continuous. Notice that $h(p_0)=p_0$, and that we can determine $F_{W,r,p_0} \circ h(p)_{r,j}$ using the following sequence of equalities.

$$F_{W,r,p_0} \circ h(p)_{r,j} = F_{W,r,p_0}(h(p))_{r,j}$$
$$= F_{W,r,p_0}\left(p_0 \cdot \frac{f(p)_{r,j}}{W_{r,j}}\right)$$
$$= W_{r,j} \cdot \left(p_0 \cdot \frac{f(p)_{r,j}}{W_{r,j}}\right) \cdot \frac{1}{p_0}$$
$$= f(p)_{r,j}$$

Since f and $F_{W,r,p_0}$ preserve the ANP structure and agree in the (r, j) entry, they agree in all entries. Thus for $0 \leq p \leq p_0$ $$f(p) = F_{W,r,p_0} \circ h(p)$$

Next for $p_0 \leq p \leq 1$ we note that f(p) preserves the ratios of the rows other than r, since f preserves the ANP structure. Let $W_{i,j}$ be a non-zero entry with $i \neq r$. Since f preserves the ratios of rows other than the $r^{th}$ row, we have a simple scalar multiplication of those rows. We can calculate that scalar as $$\frac{f(p)_{i,j}}{W_{i,j}}$$

and we define h(p) for $p_0 \leq p \leq 1$ as $$h(p) = 1 - \frac{f(p)_{i,j}}{W_{i,j}}(1 - p_0).$$

Notice that h(p) as defined above is continuous since f's entries are continuous and that $h(p_0)=p_0$ (thus both definitions agree at their overlap of $p_0$, so there is no ambiguity in our definition). Furthermore we can see the following equalities.

$$F_{W,r,p_0} \circ h(p)_{i,j} = F_{W,r,p_0}(h(p))_{i,j}$$
$$= \frac{1 - h(p)}{1 - p_0} W_{i,j}$$
$$= \frac{1 - \left(1 - \frac{f(p)_{i,j}}{W_{i,j}}(1 - p_0)\right)}{1 - p_0} W_{i,j}$$
$$= \frac{\frac{f(p)_{i,j}}{W_{i,j}}(1 - p_0)}{1 - p_0} W_{i,j}$$
$$= f(p)_{i,j}$$

Since f and $F_{W,r,p_0}$ preserve the ANP structure and agree in the (i, j) entry, they agree in all entries. Thus for $p_0 \leq p \leq 1$ $$f(p) = F_{W,r,p_0} \circ h(p)$$

Thus we have demonstrated h: [0, 1]→[0, 1] which is continuous (since the piecewise parts are continuous and they agree on the overlap) which satisfies $$f(p) = F_{W,r,p_0} \circ h(p)$$

for all $0 \leq p \leq 1$.

Remark 1. The previous theorem states that there is only one way to do row sensitivity in way that preserves the ANP structure (up to change of parameter).

3 Example Calculations

So that we may see how these results play out, let us consider a few examples calculated by hand.

3.1 Two Node Model

This model contains just two nodes in a single cluster, fully connected. The weighted supermatrix (which is really just the unweighted supermatrix in this case) is $$W = \begin{bmatrix} .2 & \frac{2}{3} \\ .8 & \frac{1}{3} \end{bmatrix}$$

With this supermatrix we get the normalized priority vector for the alternatives (which we denote as A)

$$A = \begin{bmatrix} 0.\overline{45} \\ 0.\overline{54} \end{bmatrix}$$

We will do row sensitivity on the second row, using parameter values of 0.1 and 0.9 (which corresponds to pushing down the priority of the second row for p=0.1 and pushing it up for p=0.9). For simplicity we will use $p_0$=0.5.

As a matter of notation we will use $A_p$ to denote the new synthesized normalized values of the alternatives when we do row sensitivity with value p, and $L_p$ for the limit matrix when the parameter is p.

p=0.1: Let us calculate $F_{W,2,0.5}(0.1)$ first (and then we will calculate the limit matrix). Using our formula we will scale row 2 by 0.1/0.5=0.2. Thus row two of our new matrix will be 0.4 and 0.2/3. Normalizing our columns we get the first row is 0.6 and 2.8/3. Thus $$F_{W,2,.5}(0.1) = \begin{bmatrix} .6 & \frac{2.8}{3} \\ .4 & \frac{.2}{3} \end{bmatrix}.$$

The limit matrix is therefore:

$$L_{0.1} = \begin{bmatrix} .7 & .7 \\ .3 & .3 \end{bmatrix}$$

which gives the new synthesized priorities of $$A_{0.1} = \begin{bmatrix} .7 \\ .3 \end{bmatrix}$$

which has substantially reduced the score of the second alternative from the original values. This is what we would expect by analogy with AHP tree sensitivity. We have decreased the importance of the second alternative prior to calculating the limit matrix, and thus its overall priority has decreased after calculating the limit matrix.

p=0.9: Again let us calculate $F_{W,2,0.5}(0.9)$ first and then proceed to the limit matrix. Using the definition we will scale the rows other than 2 (i.e. row one) by 1−0.9/1−0.5=0.2. Thus the first row becomes 0.04 and 0.4/3. Renormalizing the columns yields the second row as 0.96 and 2.6/3. Thus $$F_{W,2,0.5}(0.9) = \begin{bmatrix} .04 & .4/3 \\ .96 & 2.6/3 \end{bmatrix}$$

The limit matrix is therefore:

$$L_{0.9} = \begin{bmatrix} .121951 & .121951 \\ .878049 & .878049 \end{bmatrix}$$

which gives the new synthesized priorities of:

$$A_{0.9} = \begin{bmatrix} .121951 \\ .878049 \end{bmatrix}$$

which has substantially increased the score of the second alternative from the original values. Again this result is as we would expect.

3.2 Four Node Model

This is a model with two clusters each of which have two nodes (thus four nodes altogether). There is a single criteria cluster, and the alternatives clusters. In the criteria cluster there are criteria A and B. In the alternatives cluster are two nodes, alt1 and alt2. Everything in the model is fully connected and the weighted supermatrix, and alternative scores are as follows (the order of the nodes being A, B, alt1, and finally alt2).

$$W = \begin{bmatrix} 0.375 & 0.20 & 0.175 & 0.10 \\ 0.125 & 0.30 & 0.325 & 0.40 \\ 0.400 & 0.05 & 0.275 & 0.15 \\ 0.100 & 0.45 & 0.225 & 0.35 \end{bmatrix}$$

$$A = \begin{bmatrix} 0.388144 \\ 0.611856 \end{bmatrix}$$

As before we will set p=0.1 first, then p=0.9, and we will work with criteria B sensitivity (i.e. row 2) and $p_0$=0.5.

p=0.1: First we calculate the new matrix. For p=0.1 we scale row 2 by 0.1/0.5=0.2, and then renormalize. We get $$F_{W,2,0.5}(0.1) = \begin{bmatrix} .417857 & .268571 & .242407 & .153333 \\ 0.025 & 0.06 & 0.065 & 0.08 \\ .445714 & .067143 & .380926 & .536667 \\ .111429 & .604286 & .311667 & .349993 \end{bmatrix}$$

The limit matrix result is:

$$L_{0.1} = \begin{bmatrix} .2572 & .2572 & .2572 & .2572 \\ .0598 & .0598 & .0598 & .0598 \\ .3248 & .3248 & .3248 & .3248 \\ .3583 & .3583 & .3583 & .3583 \end{bmatrix}$$

This yields the following synthesized priorities for alt1 and alt2.

$$A_{0.1} = \begin{bmatrix} .4758 \\ .5242 \end{bmatrix}$$

p=0.9: Let us calculate the new matrix. Using our formula we will multiply rows 1, 3, and 4 by 1−0.9/1.0.5=0.2, and then change row 2 to normalize the columns. This gives us $$F_{W,2,0.5}(0.9) = \begin{bmatrix} .075 & .040 & .035 & .020 \\ .825 & .860 & .875 & .880 \\ .080 & .010 & .055 & .030 \\ .020 & .090 & .045 & .070 \end{bmatrix}$$

the limit matrix is thus $$L_{0.9} = \begin{bmatrix} .039761 & .039761 & .039761 & .039761 \\ .863877 & .863877 & .863877 & .863877 \\ .015210 & .015210 & .015210 & .015210 \\ .085178 & .085178 & .085178 & .085178 \end{bmatrix}$$

and finally the synthesizer priorities are $$A_{0.9} = \begin{bmatrix} .1515 \\ .8485 \end{bmatrix}$$

4 Alternate Definition of $F_{W,r,p_0}(p)$

The definition given previously for the family of row perturbations $F_{W,r,p_0}(p)$ is useful conceptually; however, there is another useful way of defining that family (a different way to write the formula) that only talks about changing the $r^{th}$ row and rescaling the rest of each column. We describe that formula in terms of the theorem below (stating that the new formulation is the same as our original formulation).

Theorem 3. Fix an ANP model (a single level of it) and let W be its weighted supermatrix (whose dimensions are n×n), and fix r an integer between 1 and n. Pick $0<p_0<1$. We can define $F_{W,r,p_0}: [0, 1] \to M_{n,n}([0, 1])$ in the following alternate fashion. First leave trivial columns unchanged throughout the family. Next, for all $0 \le p \le 1$ we define $F_{W,r,p_0}(p)$ by changing the $r^{th}$ row and then rescaling the remaining entries in the columns so that the columns continue to add to one. For $0 \le p \le p_0$ we change the $r^{th}$ by scaling it by $$\frac{p}{p_0}.$$

For $p_0 \le p \le 1$ we change the entries in the $r^{th}$ row by the following formula $$F_{W,r,p_0}(p)_{r,j} = 1 - \alpha(1 - W_{r,j})$$

where $$\alpha = \frac{1-p}{1-p_0}.$$

Note 4. The above formulation implies that, for $p_0 \le p \le 1$ we scale the distance from 1 of the entries in the $r^{th}$ row by $$\alpha = \frac{1-p}{1-p_0}.$$

Proof. Our new definition agrees with the original definition for $0 \le p \le p_0$, thus we can proceed to the other case. Thus let $p_0 \le p \le 1$. We have the formula $$F_{W,r,p_0}(p)_{r,j} = 1 - \alpha(1 - W_{r,j}).$$

Fix a non-trivial column j, we can show that $$F_{W,r,p_0}(p)_{i,j} = \frac{1-p}{1-p_0} W_{i,j} = \alpha W_{i,j}$$

for all i≠r to prove our definitions coincide.

Let $\beta_j$ be the scaling factor we scale the entries of the $j^{th}$ column by (except for the $r^{th}$ row). Then $F_{W,r,p_0}(p)_{i,j} = \beta W_{i,j}$. Since the $j^{th}$ column of $F_{W,r,p_0}(p)$ adds to one, we get the following sequence of equalities.

$$1 = \sum_{i=0}^{n} F_{W,r,p_0}(p)_{i,j}$$

$$= F_{W,r,p_0}(p)r, j + \sum_{i \ne r} F_{W,r,p_0}(p)_{i,j}$$

$$= 1 - \alpha(1 - W_{r,j}) + \sum_{i \ne r} \beta_j W_{i,j}$$

$$= 1 - \alpha(1 - W_{r,j}) + \beta_j \sum_{i \ne r} W_{i,j}$$

$$= 1 - \alpha(1 - W_{r,j}) + \beta_j(1 - W_{r,j})$$

The last equality coming from the factor that the columns of W add to one. We can continue in the following fashion.

$$1 = 1 - \alpha(1 - W_{r,j}) + \beta_j(1 - W_{r,j})$$

$$\alpha(1 - W_{r,j}) = \beta_j(1 - W_{r,j})$$

$$\alpha = \beta_j$$

Thus we are rescaling the entries of the $j^{th}$ column (except the entry in the $r^{th}$ row) by α, which completes the proof.

In review, there are two different definitions of the above approaches, Part II, Section 2.5 and Part II, Section 4, which is an alternate. Part II, Section 4 can be easier to code as software, but it is equivalent to the definition of Part II, Section 2.5.

A difference between the definitions of Part II, Section 2.5 and Part II, Section 4 is in how the $r^{th}$ row is changed. For $0 \le p \le p_0$, is about perturbing downward (scaling by $p/p_0$). Perturbing downward is identical in both definitions.

In Part II Definition 6, for perturbing downward ($0 \leq p \leq p_0$) the given row is rescaled; for perturbing upward ($p_0 \leq p \leq 1$), everything except the given row is rescaled by a particular factor. Mathematically, this is straightforward. Calculationally, it is difficult.

From a calculational perspective, it is easier work with one row. In Part II, Section 4, perturbing downwardly is the same as Part II, Section 2.5 (rescale the given row by p/p0). For perturbing upwards, we rescale the given $r^{th}$ row by the given formula in Part II, Section 4, Theorem 3. That is, whether we perturb upward or downward, we change the $r^{th}$ row, and then we rescaled the remaining rows. If perturbing downward, rescale by $p/p_0$. If perturbing upward, change the entries by the given formula in Part II, Section 4, Theorem 3 (which is rescaling to keep the distances from 1 the same). Part II, Section 2.5 performs the upward perturbation differently, as discussed above.

The reason the upward and downward perturbation approaches are different is due to end point behavior. As a node is perturbed upward, the priorities approach 1 (which adds importance on that node). As the priorities for a node are perturbed downward to approach zero, less importance is placed on that node. The same formula will not provide behavior for upward and downward. As approaching 0, the node gets less important and priorities approach 0. As importance approaches 1, all other nodes get more inconsequential.

Figure 8:
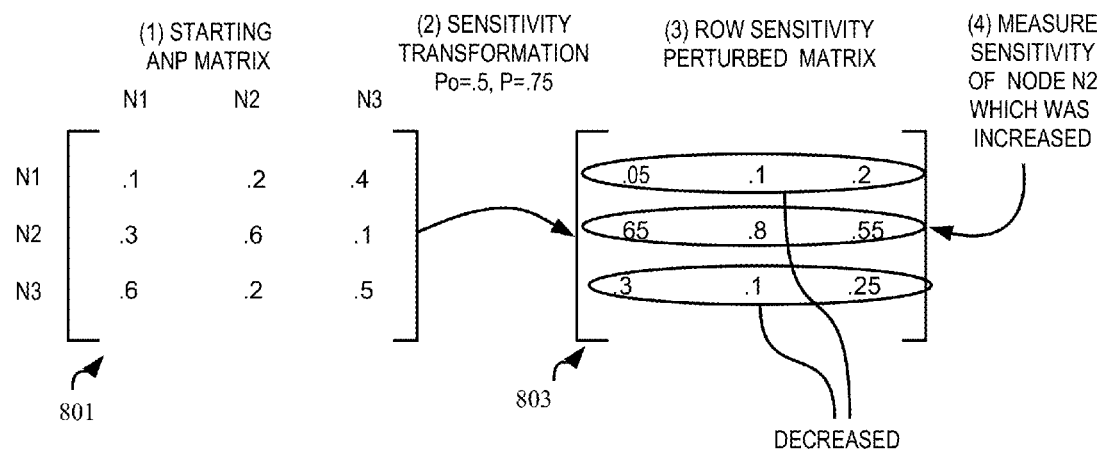
FIG. 8 is a diagram illustrating a measurement of row sensitivity of a node in an ANP weighted supermatrix.

The approach of Part II, Sections 2.5 and 4 will now be discussed in a more general sense. Referring now to FIG. 8, a diagram illustrating a measurement of row sensitivity of a node in an ANP weighted supermatrix will be discussed and described. At (1) is a starting ANP weighted supermatrix 801, which has been prepared in accordance with conventional techniques resulting in the illustrated entries for each local priority. That is the value of N1 with respect to N1 is 0.1, N2 with respect to N1 is 0.3, N3 with respect to N1 is 0.6, N1 with respect to N2 is 0.2, N2 with respect to N2 is 0.6, N3 with respect to N2 is 0.2, N1 with respect to N3 is 0.4, N2 with respect to N3 is. 1, and N3 with respect to N3 is 0.5.

At (2), the sensitivity of a node is transformed. That is, a node (sometimes referred to as a "fixed node") is selected and the priorities of the selected node are perturbed. In the illustration, the selected node, N2, corresponds to the middle row and the priorities are perturbed upward. In this example, the predetermined fixed point Po and parameter value P selected for use in the sensitivity transformation are 0.5 and 0.75, respectively.

At (3) is an ANP weighted supermatrix 803 which has sensitivity of a row corresponding to the selected node perturbed upwardly. To arrive at the row sensitivity perturbed ANP weighted supermatrix 803, the proportionality of the starting ANP weighted supermatrix 801 has been maintained despite perturbing the selected node N2, and the proportionality is substantially present in the row sensitivity perturbed ANP supermatrix 803, with the exception of the selected node which was perturbed. As summarized in this illustration, the values in the middle row (corresponding to the selected node which is perturbed) of the supermatrix are made larger, whereas the values in the other rows are made smaller.

Since $p_0$ is 0.5 and p is 0.75, p is moving half way to 1. Proportionally, then, the value at N2, N2 should move halfway to 1. The value at N2, N2 is 0.6, which is 0.4 from 1. By adding 0.2 to 0.6 (i.e., 0.8), then N2, N2 will be perturbed halfway to 1. The generation of the row sensitivity perturbed matrix continues as detailed above.

At (4) the sensitivity of the node which was perturbed is measured (also referred to as "assessed"). The assessment can include determining the sensitivity of the selected node before and after perturbation. Sensitivity is defined to be the new synthesized alternatives priority. Sensitivity is a value x, $0 \leq x \leq 1$. By perturbing one or more selected nodes according to a predetermined amount, the sensitivity of the selected node with respect to the ANP model can be quantified.

Figure 9:
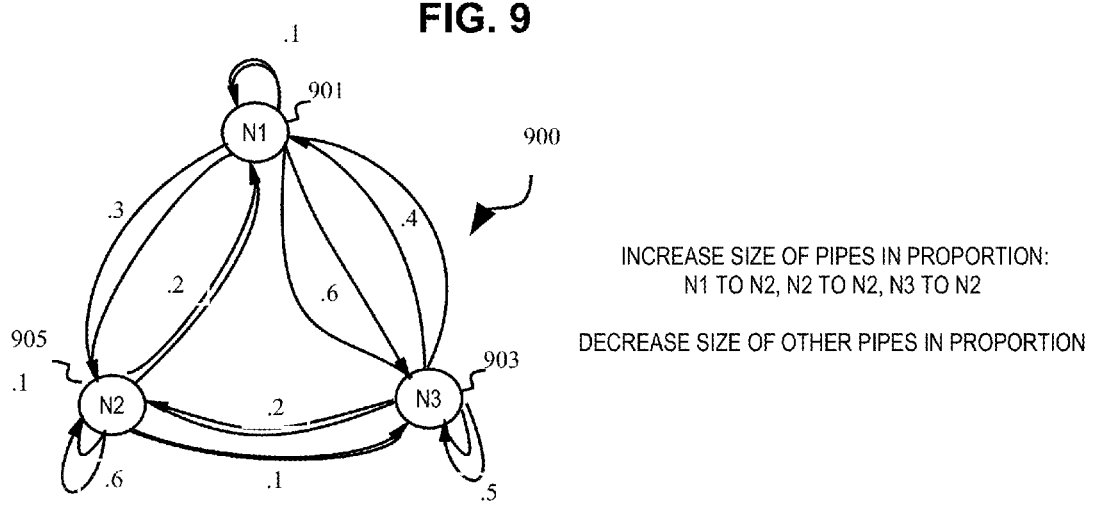
FIG. 9 is an explanatory diagram for a further explanation of FIG. 8.

Referring now to FIG. 9, an explanatory diagram for a further explanation of FIG. 8 will be discussed and described. FIG. 9 is a visualization of the relation of the three nodes N1, N2, and N3 901, 905, 903. The directional "pipes" from one node to another which reflect the importance. As in FIG. 8, here the sensitivity of node N2 is being measured and hence the size of pipes that end in node N2 will be increased, i.e., pipes from N1 to N2. N2 to N2, and N3 to N2. The sizes of the other pipes are decreased, in proportion to the increase.

The same proportionality in the ANP weighted supermatrix can be maintained while preserving the ANP structure. The proportionality is maintained throughout the change of priorities of the node in the ANP weighted supermatrix to be less important and/or more important, as well as throughout the assessment of the sensitivity of the node which was changed relative to the ANP model.

To preserve the ANP structure, connections are not created or destroyed. That is, an entry in the matrix is not changed to or from zero, except when p=0, since a non-zero value represents a connection whereas a zero value indicates that there is no connection.

Preserving proportionality is a more difficult consideration. So, the question is, if I am making changes to this row, what is the most proportionality I can keep? Hence, maintaining proportionality is the more difficult and/or subtle problem for figuring out how this should behave.

No connections in the ANP network are created or destroyed by doing this present process. If a priority is zero, then there is no connection to another node. If that is ever changed from zero to something, then a connection has been created by the system, which is bad because the user did not create the connection. The change from zero changes the ANP structure because it creates a connection that was not there originally. Likewise, taking a non-zero value (which is a connection) and changing it to zero deletes a connection which was there. An embodiment of the present process does not create or destroy connection.

Now consider how to preserve as much of proportionality as possible, that is, preserving the ratios of the numbers involved in the ANP model as possible. If, in the original ANP model, e.g., node A is twice as good as node B, that proportionality is maintained as much as possible. It cannot be kept exactly, because that means nothing can be changed. However, by doing row sensitivity, you will break a few proportionalities. There is no choice. But, the other proportionalities you want to keep.

That is, to keep proportionality while changing a node to test that node, you are attempting to maintain proportionality for the other non-changed nodes, as well as that row as much as possible. Proportionality involves a node and a with-respect-to, and you want to preserve those proportionalities as much as possible. Part II, Section 2.3 (above) further discusses maintaining proportionality.

To measure sensitivity, a row will be changed. There is one way to change that row to keep as much proportionality throughout the ANP network as possible. Preserving ANP proportionality is discussed for example in Part II, Section 2.4, and Part II Definition 5.

While maintaining proportionality, trivial columns are not changed. This is discussed above, for example, in Part II, Section 2.4, point 1, and "trivial columns" are defined in Part II Definition 4. That is, something that is not from, stays that way; or something that is only connected to the fixed node, stays that way.

While maintaining proportionality, connections are not created, as discussed in, e.g., Part II, Section 2.4, point 2. Also, as discussed in Part II, Section 2.4, point 3, connections are not destroyed. To summarize points 2 and 3, in order to preserve ANP structure, connections are not created or destroyed.

Preservation of proportionality is further discussed in Part II, Section 2.4, points 4 and 5. There are two cases discussed. There is the case of perturbing downward, and the case of perturbing upward. Case 4 ("perturbing downward") is decreasing the influence/importance of a node to look at its sensitivity. Case 5 is increasing the importance of a node to look at its sensitivity. Both cases are going to tell you what kind of proportionality is to be maintained.

The concept of row sensitivity opens up many avenues of analysis not previously available in ANP theory. For instance, there is influence analysis, i.e. which node is most influential to the decision the ANP model is making. Another example would be perspective analysis, which tells how important the alternatives would be if a single node was the only one in the model with weight (however we do not forget the rest of the model in this calculation). Yet another example is marginal analysis, that is, what are the rates of influence of each of the nodes (a derivative calculation). A final example applying row sensitivity would be search for highest rank influence (that is, which node causes rank change first).

Part III: ANP Influence Analysis

ANP Influence Analysis

A fundamental question for ANP models is which nodes are the most or least influential to the decision the model represents. ANP row sensitivity opens up many avenues of attack on this problem. In the following Part, we present here one such attack, which involves using the row sensitivity calculation combined with different "metrics" (these distance measures are not metrics in the topological sense, rather they loosely calculate distances). Hence, a new terminology is used to refer to these things, namely, "metriques."

1 Introduction

After an ANP model is created and yields synthesized values for the alternatives we would like to understand how the structure and numerics of the model affect the results of the model. In traditional AHP tree models we can use sensitivity to increase or decrease the importance of a given node, and see how the alternatives change. With the advent of ANP row sensitivity we can perform a similar analysis on ANP models. However, this only yields a weak qualitative analysis of the situation (that is we can only roughly tell that this node appears to move alternatives more or less than the others). A more desirable analysis would be a single non-negative numerical value that describes the quantity of influence for each node.

1.1 Concept of Influence Analysis

The fundamental concept behind ANP influence analysis outlined here is that we wish to combine ANP row sensitivity (the ANP analogue of tree sensitivity) with distance measures describing how far alternative values move in the process of sensitivity. There are two subtleties to handle in doing this analysis. The first is how to use ANP row sensitivity to move the alternatives, and the second is how we will measure distances traveled. We shall deal with the latter first, and the former in the following section.

1.2 Distance Measures and Metriques

There is a whole branch of mathematics devoted to studying distance measures in spaces (metric spaces). Unfortunately, the kind of distance measures we will use sometimes fall outside of this theory (for instance percent change distance). As a result we need to be a bit careful in our terminology from the outset. We cannot call these things "metrics" since those objects have a precise mathematical definition to which we do not wish to limit ourselves. Instead we will use the terminology of a metrique to describe the distance measures we will be using.

Part III Definition 1 (Metrique). Let X be a space, $d: X \times X \rightarrow R$ a continuous function is a metrique iff for all $x, y \in X$.
1. $d(x, y) \geq 0$
2. $d(x, x) = 0$ Note 1. For those with some knowledge of metrics notice there is neither triangle inequality, nor symmetry, nor even an assertion that $d(x, y) = 0$ iff $x = y$. This is a very weak cousin of traditional metrics.

1.3 Review of ANP Row Sensitivity

The following is a brief review of the concepts involved in ANP Row Sensitivity. The purpose of ANP row sensitivity is to change all of the numerical information for a given node in a way that is consistent with the ANP structure, and recalculate the alternative values (much as tree sensitivity works). We do this by having a single parameter p that is between zero and one, which represents the importance of the given node. There is a parameter value $p_0$ (called the fixed point) which represents returning the node values to the original weights. For parameter values larger than $p_0$ the importance of the node goes up, and for parameter values less than $p_0$ the importance of the node goes down. Once the parameter is set, this updates values in the weighted supermatrix (although it can also be done with the unsealed supermatrix, working by clusters instead) and re-synthesizes. There is essentially one way to do this calculation and preserve the ANP structure of the model. In the notation of that paper, let W be the weighted supermatrix of a single level of our model, ANP row sensitivity constructs a family of row perturbations of W. A family of row perturbations of W is a mapping $f: [0,1] \rightarrow M_{n,n}([0,1])$ that gives a weighted supermatrix $f(p)$ for each parameter value $p \in [0,1]$. This mapping must preserve the ANP structure of our original supermatrix. The only real choice is what to make our fixed point $p_0$. Once we have chosen that, the standard formula for the family of row perturbations of row r of W preserving the ANP structure is labeled $F_{W,r,p_0}: [0,1] \rightarrow M_{n,n}([0,1])$ and is defined in the following way.

1. Leave trivial columns unchanged. A trivial column is either a zero column, or a column with all zeroes except one entry that is one.

2. If $0 \leq p \leq p_0$ define $F_{W,r,p_0}(p)$ by scaling the $r^{th}$ row by $p/p_0$ and scaling the other entries in the columns so as to keep the matrix stochastic.

3. If $p_0 \leq p \leq 1$ define $F_{W,r,p_0}(p)$ by leaving alone columns of W for which $W_{r,j} = 0$ and scaling all entries in the other columns, except for the entry in the $r^{th}$ row, by $$\frac{1-p}{1-p_0}$$

(and change the entry in that $r^{th}$ row so as to keep the matrix stochastic).

2 Influence Analysis

The idea behind influence analysis (as mentioned before) is to use ANP row sensitivity on a given node, and then create a score based on how much the alternative scores change. There are many ways we can use ANP row sensitivity to attempt to understand influence, several of which will be outlined in subsequent papers. (It turns out that many of the ways one might try to use ANP row sensitivity for influence analysis really give other kinds of information than influence.) For now we focus on a particular method and explain why we are using that method.

Let us fix a node that we wish to analyze, let p be our parameter for ANP row sensitivity, and $p_0$ be the fixed point for the family as defined in ANP row sensitivity. There are two possible directions of influence, namely increasing p above $p_0$ and decreasing p below $p_0$. Thus any influence analysis must check both increasing and decreasing values of p. There are several natural possibilities for changing the parameter p which we outline below.

Infinitesimal. We can do a small change in p above $p_0$ and below $p_0$ and look at the rate of change based on that. In the limit this is a derivative calculation, which we call "marginal influence" analysis. Although useful, this only tells how much influence a node has nearby the current values (it may have large marginal influence, but incredibly small influence after moving 0.001 units of p, for instance). This is a standard problem of using a rate of change to measure something about the original quantity. Namely one only knows the instantaneous rate of change at a point, and that rate of change may change dramatically nearby (thus the quantity may not change much even if the rate of change is large, if the rate of change drops to zero quickly).

Component. We can calculate the limit as p goes to 1.0. This does tell us a form of influence. However, if we consider what that calculation means, it means we are taking nearly all of the priority from other nodes and giving them to our node. This essentially is telling us what the synthesis looks like from the perspective of the given node, and not directly telling us the influence of that node.

Our influence analysis. We could fix a parameter value larger than $p_0$, denoted $p_+$ and fix a parameter value smaller than $p_0$, denoted $p_-$. We can then move the parameter p to those two values and consider how far the alternatives have moved. In that way we can compare the distance the alternatives are moved depending on which node we use. We will use the lower/upper bound method to determine influence, in part because the infinitesimal and component methods outlined above do not show influence, but other useful information. By moving the parameter p to the same lower and upper values for each node (which corresponds to changing the importance of each node by the same amount) we can see which node affects the synthesized values for the alternatives most. In order to compare which node influences the alternative scores most we need a metrique to describe how far the alternatives have traveled from their initial values.

2.1 Metriques Used

There are several metriques which are natural to use to compare one set of alternative scores to another set. The following are some standard metriques we used in analyzing the examples given at the end (not all of these are reported in the examples, only the ones we have found most useful for the given calculation). However, it is by no means to be considered all inclusive. All of the metriques below are on the space $R^n$. Let $$x=(x_1,x_3,\ldots,x_n)\ y=(y_1,y_2,\ldots,y_n)$$

be two vectors in $R^n$ (we will use these to write the formulas for each of the following):

Taxi cab: This is the standard taxi cab metric. The taxi cab distance between x and y is given by $$\text{taxi cab distance}=|x_1-y_1|+|x_2-y_2|+\ldots+|x_n-y_n|$$

Percent change: This is the sum of percent changes in the components of x and y. Since we are allowing components of x to be zero, we need to be careful in defining percent change there. This case will happen very infrequently in actual ANP sensitivity. Since it is impossible to define percent change from a 0 starting value, we define it to be 0. The formula is given by $$\text{percent change distance} = \sum_{i=1}^{n} \begin{cases} \left|\frac{x_i - y_i}{x_i}\right| & \text{if } x_i \neq 0 \\ 0 & \text{if } x_i = 0 \end{cases}$$

Maximum percent change: This is similar to the previous metrique. The only difference being we pick the maximum percent change component instead of summing the components.

Rank change: This is a simple formulation of how much the ranking of vector x and y differ. The ranking of x simply is the information of which component of x is largest, second largest etc, and is stored in an integer vector $r^x \epsilon Z^n$. Where $r^x_i$ is the ranking of the $i^{th}$ component of x. (For instance if x=(0.3, 0.1, 0.2, 0.7) then $r^x$=(2, 4, 3, 1) because the largest component of x is the fourth, thus $r^x_4$=1. The second largest component of x is the first component, thus $r^x_1$=2.) The ranking change metrique just takes the taxi cab distance between $r^x$ and $r^y$ (that is the difference of the rankings of each vector).

2.2 Combinations of Metriques

Each of the metriques mentioned above measures distances slightly differently. A small overall change can cause many rank changes (and likewise a large overall change can leave rankings unchanged). Similarly a 100% change of the value 0.01 only changes it to 0.02 which is a small overall change (even though it is a large percent change). Thus there is no clear choice about which metrique to use in all circumstances.

We can remedy this by making the choice on a per model basis. To give us flexibility we could take a weighted average of the different metriques. We could have a metrique that weighs rank changes highly, and percent changes next highest, and finally gives a small amount of weight to taxi cab changes. We can picture this as having a tree sensitivity view where the nodes are the different metriques available with scores next to them (these scores would always add to one). We could weight one metrique higher by dragging the bar next to that metrique out longer (and thereby shortening the remaining metrique's bars).

2.3 Lower and Upper Parameter Value

The lower parameter value $p_-$ and upper value $p_+$ must be fixed for any particular influence analysis (although clearly we are free to choose different lower and upper values to compare with at a later point). That is, we must use the same values for $p_-$ and $p_+$ for each node in the model when doing influence analysis. However, after that influence analysis is completed we may choose to use different values, and compare the results. Such a varied approach gives us useful information. There are several issues which can be addressed by varying these values.

By choosing values of $p_-$ and $p_+$ close to, and equidistant from $p_0$ we can see how much influence the nodes have for smaller changes.

By choosing values of $p_-$ and $p_+$ far from, and equidistant from $p_0$ we can see how much influence the nodes have for large changes.

We can also break the equidistant rules mentioned above. Although keeping the upper and lower value equidistant from the starting value may appear to be a good approach, it has one significant drawback. Namely lower parameter values have far less influence by their nature. That is, moving p to one places all priority on the given node and takes away every other nodes priority (a huge change). However, moving p towards zero moves priority away from the given node and proportionately redistributes that priority to the rest of the nodes (a much smaller change). We can remedy this inequality by pushing $p_-$ further away from $p_0$ than $p_+$ is.

3 Examples

Throughout the examples we use the family of row perturbations defined in ANP row sensitivity. The following examples are calculated with $p_-=0.1$ and $p_+=0.9$ unless otherwise marked. These are large values for the upper and lower bounds. However they do reveal both interesting and useful changes. Perhaps most surprisingly they reveal many nodes with little to no influence whatsoever.

3.1 4node2.mod

This model has two clusters, "A1 criteria" and "Alternatives". There are two criteria "A" and "B", and two alternatives "1" and "2". All nodes are connected to each other, and the weighted supermatrix is as follows (the ordering of nodes in the supermatrix is "A", "B", "1", "2").

$$W = \begin{bmatrix} 0.3750 & 0.2000 & 0.0500 & 0.3333 \\ 0.1250 & 0.3000 & 0.4500 & 0.1667 \\ 0.3333 & 0.0500 & 0.2750 & 0.1500 \\ 0.1667 & 0.4500 & 0.2250 & 0.3500 \end{bmatrix}$$

Keeping with the notation of ANP row sensitivity setting the parameter to 0.1 in row 1 we get the following new scaled supermatrix.

$$F_{W,1,0.5}(0.1) = \begin{bmatrix} 0.0750 & 0.0400 & 0.0100 & 0.0667 \\ 0.1850 & 0.3600 & 0.4690 & 0.2333 \\ 0.4933 & 0.0600 & 0.2866 & 0.2100 \\ 0.2467 & 0.5400 & 0.2345 & 0.4900 \end{bmatrix}$$

The limit matrix is:

$$L = \begin{bmatrix} 0.047829 & 0.047829 & 0.047829 & 0.047829 \\ 0.315993 & 0.315993 & 0.315993 & 0.315993 \\ 0.190763 & 0.190763 & 0.190763 & 0.190763 \\ 0.445415 & 0.445415 & 0.445415 & 0.445415 \end{bmatrix}$$

which gives us the following synthesized alternative scores shown in Part III, Table 1.

TABLE 1

Part III.

| Alternative | Normal | Ideal | Raw |
|---|---|---|---|
| 1 | 0.299858 | 0.428281 | 0.190763 |
| 2 | 0.700142 | 1.000000 | 0.445415 |

The following Part III, Table 2 is a collection of results setting upper and lower parameter values for each node and the corresponding changes in output as actually computed by a software implementation.

TABLE 2

Part III.

| | Param | Max % chg | Rank chg | Alt 1 | Alt 2 |
|---|---|---|---|---|---|
| Original | 0.5 | 0.0000 | 0 | 0.39 | 0.61 |
| A: high | 0.9 | 0.5376 | 2 | 0.63 | 0.37 |
| B: high | 0.9 | 0.7324 | 0 | 0.15 | 0.85 |
| 1: high | 0.9 | 0.9414 | 2 | 0.94 | 0.06 |
| 2: high | 0.9 | 0.9425 | 0 | 0.04 | 0.96 |
| A: low | 0.1 | 0.3415 | 0 | 0.3 | 0.7 |
| B: low | 0.1 | 0.4238 | 0 | 0.48 | 0.52 |
| 1: tow | 0.1 | 0.8206 | 0 | 0.1 | 0.9 |
| 2: low | 0.1 | 0.7550 | 2 | 0.8 | 0.2 |

Since the alternatives are also nodes we can view the influence of the alternatives on the decision. In rare instances this may be useful, however, most of the time this is a fairly useless calculation. So to analyze this, we really need only consider the criteria "A" and "B". Part III, Table 3 of values for them alone is:

TABLE 3

Part III.

| | Param | Max % chg | Rank chg | Alt 1 | Alt 2 |
|---|---|---|---|---|---|
| Original | 0.5 | 0.0000 | 0 | 0.39 | 0.61 |
| A: high | 0.9 | 0.5376 | 2 | 0.63 | 0.37 |
| B: high | 0.9 | 0.7324 | 0 | 0.15 | 0.85 |
| A: low | 0.1 | 0.3415 | 0 | 0.3 | 0.7 |
| B: low | 0.1 | 0.4238 | 0 | 0.48 | 0.52 |

Looking at this table we already see something interesting. By maximum percentage change node "B" appears to be the most influential. However node "A" is the one that gives rise to a rank change (changing upwards the influence of node "A"). Thus if we are scoring rank changes higher than movement of alternative scores, node "A" would be considered the most influential. If we are scoring movement of alternatives scores higher node "B" would be the most influential. If we allow weighting of these various metrics we can arrive at a blending of these results that would most match the preferences one has on the importance of the various metriques.

3.2 BigBurger.mod

The following is the table of influence analysis as generated by our software implementation, for the model BigBurger.mod that is included in the Super Decisions sample models directory. The results in Part III, Table 4 have been sorted on the maximum percent change column.

TABLE 4

Part III.

| | Param | Max % chg | Taxi Cab | McD | BK | Wen |
|---|---|---|---|---|---|---|
| Original Values | 0.5 | 0.00% | 0 | 0.63 | 0.23 | 0.13 |
| 1 Subs | 0.9 | 231.91% | 0.87 | 0.41 | 0.31 | 0.28 |
| 5 Drive Thru | 0.9 | 52.75% | 0.28 | 0.77 | 0.13 | 0.1 |
| 1 White Collar | 0.9 | 51.76% | 0.2 | 0.73 | 0.2 | 0.07 |
| 3 Students | 0.9 | 48.65% | 0.17 | 0.71 | 0.21 | 0.08 |
| 2 Blue Collar | 0.9 | 48.64% | 0.17 | 0.71 | 0.21 | 0.08 |
| 2 Recycling | 0.9 | 45.77% | 0.22 | 0.73 | 0.18 | 0.08 |
| 4 Families | 0.9 | 45.20% | 0.12 | 0.69 | 0.23 | 0.08 |
| 3 Parking | 0.9 | 39.45% | 0.17 | 0.71 | 0.2 | 0.09 |

There are a few things to note here. First a rank change column was not included because none of these caused any rank changes. Second, only the top few scoring nodes were included in this list. Third, the node "1 Subs" is clearly the most influential by a large margin. Even though "1 Subs" does not cause a rank change, it does make a huge change in the numerics of the result.

Using value of $p_-=0.1$ and $p_+=0.9$ are rather large changes. If we wish to view smaller changes we can use 0.3 and 0.7 respectively. Using those values, sorting and showing the top few results we get the following Part III. Table 5.

TABLE 5

Part III.

|  | Param | Max % chg | McD | BK | Wen |
| --- | --- | --- | --- | --- | --- |
| Original Values | 0.5 | 0.00% | 0.63 | 0.23 | 0.13 |
| 1 Subs | 0.7 | 80.62% | 0.53 | 0.26 | 0.2 |
| 5 Drive Thru | 0.7 | 27.95% | 0.7 | 0.19 | 0.12 |
| 1 White Collar | 0.7 | 25.92% | 0.68 | 0.22 | 0.11 |
| 3 Students | 0.7 | 23.13% | 0.67 | 0.22 | 0.11 |
| 2 Blue Collar | 0.7 | 23.08% | 0.67 | 0.22 | 0.11 |
| 2 Recycling | 0.7 | 23.05% | 0.68 | 0.21 | 0.11 |
| 4 Families | 0.7 | 22.72% | 0.66 | 0.23 | 0.11 |
| 3 Parking | 0.7 | 21.88% | 0.68 | 0.21 | 0.11 |

Since we are making smaller changes in the parameter, the resulting maximum percentage change is smaller. However, we still get the same ordering of the top few scoring nodes.

Figure 10:
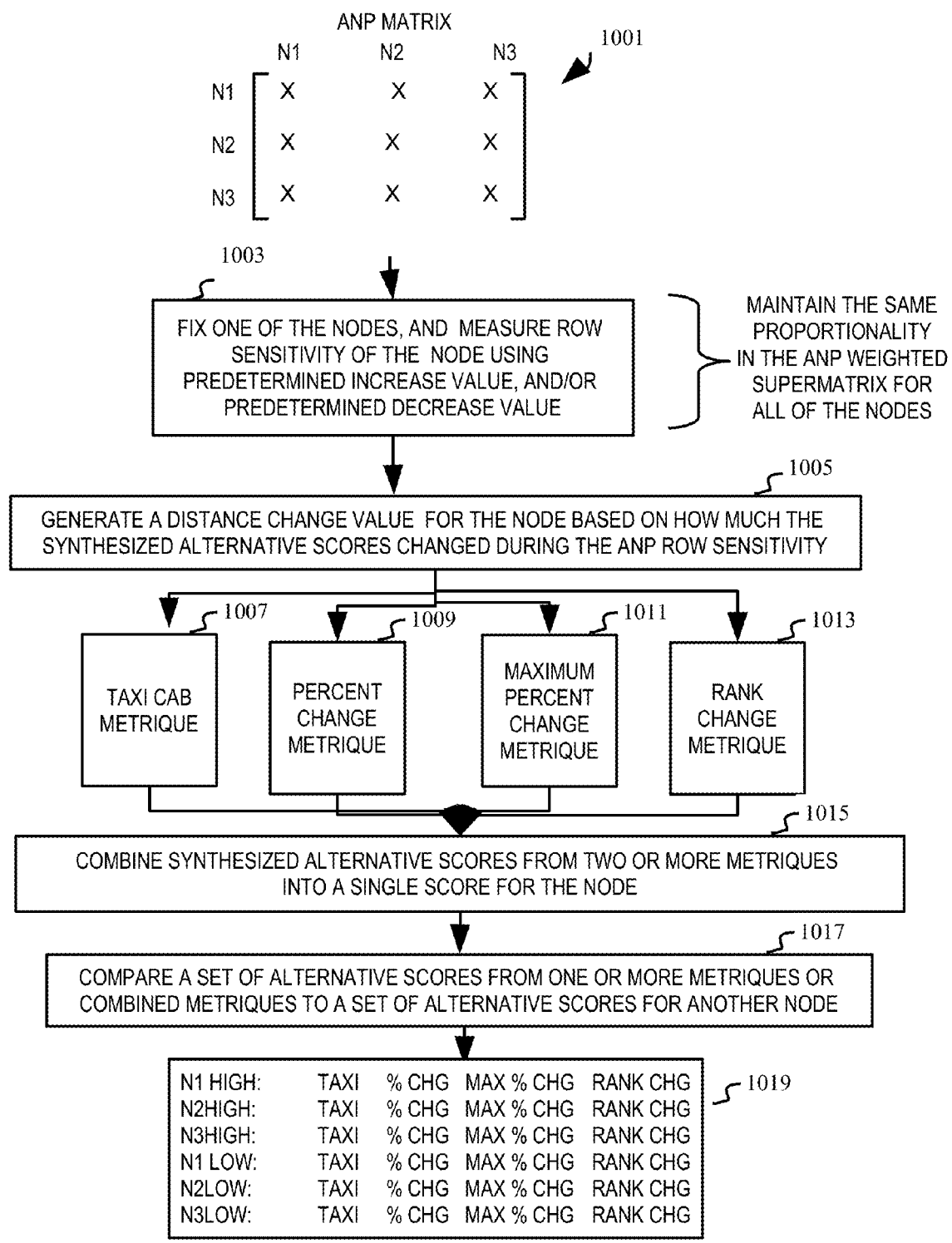
FIG. 10 is a data flow diagram illustrating a measurement of change distance of nodes in an ANP weighted supermatrix.

Referring now to FIG. 10, a data flow diagram illustrating a measurement of change distance of nodes in an ANP weighted supermatrix will be discussed and described. FIG. 10 provides an overview of the various techniques discussed in greater detail in this Part. FIG. 10 illustrates an ANP matrix 1001 generated using known techniques. Values are represented in the illustration by an "x". The ANP model represents factors in a decision. In this example, there are three nodes N1, N2, N3, representative of two or more nodes in an ANP model. How to set up the ANP weighted supermatrix 1001 so that it represents a decision and the factors involved are well known and the reader is assumed to be familiar with these basic principals in initially setting up a supermatrix.

After the ANP supermatrix 1001 has been generated, one of the nodes is fixed 1003, and row sensitivity of the node is measured using (i) a predetermined increase value, and/or (ii) a predetermined decrease value. For the entire duration that the node is fixed and the row sensitivity is measured, the same proportionality in the ANP weighted supermatrix is maintained, for all of the nodes. As a part of performing row sensitivity, synthesized alternative scores are changed.

Then, a distance change value is generated 1005 for the node on which row sensitivity was performed, based on how much the synthesized alternative scores traveled during the ANP row sensitivity. One or more metrique calculations are provided, in order to compare the way that different nodes influence alternatives scores.

In this example, four metrique calculations are provided, and the distance change value for the node(s) can be run through one or more of the metrique calculations. In this example, the metrique calculations are a taxi cab metrique 1007, a percent change metrique calculation 1009, a maximum percent change metrique 1011, and a rank change metrique 1013. The taxi cab metrique 1007 measures how far the alternatives score has been moved, that is, the distance, e.g., a change from 0.01 to 0.02 is 0.01. The percent change metrique calculation 1009 measures how much change there was from the starting value, e.g., a change from 0.01 to 0.02 is a 100% change. The maximum percent change metrique 1011 looks at the largest percent change in an alternative's scores. The rank change metrique 1013 formulates how much the rankings were changed by the row sensitivity, e.g., when the largest component changed to become the fourth largest.

To provide a single score per node which reflects the distance change value and scores, the set of alternative scores from two or more metriques are combined 1015 into a single score for the node. For example, the scores can be averaged, and the average can be weighted. The weighting can be selected depending on what is more significant. For example, if it is most significant when rankings are changed, the rank change metrique can be weighted more heavily in the average than other metriques. Techniques for combining scores and preparing averages are known. The combination step 1015 can be skipped if not desired, for example, if there is only one metrique calculation or if separate values for each of the individual metriques are desired.

Then, it may be desirable to compare 1017 a set of the alternative scores developed from the above-illustrated metriques calculations 1007, 1009, 1011, 1013 (or the combined metriques) to a set of alternative scores for another node. Conveniently, the alternative scores for the other node(s) can be tabulated, such as in illustrated table 1019 of results.

In table 1019 of results, the nodes are listed as well as the row sensitivity increase (e.g., N1HIGH, N2HIGH, N3HIGH) or decrease (e.g., N1LOW, N2LOW, N3LOW). The designations "TAXI", "% CHG", "MAX % CHG", and "RANK CHG" are illustrated as representative of the calculated result values (illustrated for example in Part III, Tables 2, 3, 4 or 5).

Part IV: ANP Marginal Influence Analysis

Discerning the influence that nodes in an ANP model have on the ANP model's alternatives' scores and rankings can be an important analytic tool. That is, we wish to understand which parts of the ANP model have the most impact (or control) on our decision. To address these and other problems, we present a marginal influence analysis based on ANP row sensitivity which provides a measurement of "near term" behavior.

1 Introduction

ANP influence analysis, as described in Part II, allows us to analyze the influence a node has on the alternative scores. To do this, we can move up the importance of each node a fixed amount and analyze how the alternative scores change (likewise for moving the importance downward). This analysis provides information about medium to long range changes in node importance affecting the alternative scores, not small changes. It is easiest to see this difficulty with a velocity analogy. If we measure that we have traveled 60 miles in the last hour that gives our average velocity at 60 mph. However that does not mean we are going 60 mph right now (we could have gone 80 mph for the first 45 minutes, and then been stuck in a traffic jam the last 15 minutes and be stopped now). If we are interested in our velocity right this minute, the average velocity over the last hour is a poor approximation. ANP influence analysis is analogous to measuring average velocity whereas ANP marginal influence is like measuring velocity this instant. ANP marginal analysis tells us how much affect nodes have on the alternative scores for small changes in the node's importance.

There is a subtlety in this measurement. Because of the nature of ANP row sensitivity our functions may not be differentiable at the point we are interested in (this will be true no matter how we parameterize the system, as long as we follow the definition of ANP row sensitivity (defined in Part II") we loose differentiability). However, we can look at the left and right derivatives (which exist), and these give us lower and upper marginal influence information.

1.1 ANP Row Sensitivity Review

Before beginning, a review of ANP row sensitivity is suggested.

1.2 Concept of Marginal Influence

The idea behind marginal influence of a particular node is to change its importance in the model slightly (using ANP row sensitivity), calculate the new alternative scores, and then calculate the change in the scores over the amount the node's importance was changed by. Thus, if the marginal influence of node 1 to alt 1 is 1.5 that means a 1 percent change in node 1's importance induces a 1.5 percent change alt 1's score.

Loosely, marginal influence can be thought of as the derivative of the alternative scores with respect to the importance of the given node. Thus marginal influence can tell us the impact of a node on the alternative scores. In particular, it can tell us how much small changes in information about the importance of the node affect the alternative scores. Or, we can think of it as telling us how much small numerical errors related to the given node affect the alternative scores, thus telling us where we need to really focus on being absolutely sure of our numerical inputs.

2 Marginal Influence

In this section we define the formula for marginal influence, as well as a method for selectively approximating it on modern computer hardware.

2.1 Notation and Definitions

Definition 1 (Ranking). Let A be an ANP model with a alternatives ordered. We can use the following notation for standard calculated values of the model.

$s_{A,i}$=synthesized score for alternative i $r_{A,i}$=ranking of alternative i where 1=best, 2=second best, etc.

Definition 2 (Family of ANP models induced by row perturbations). Let A be an ANP model, W be the weighted supermatrix of a single level of the ANP model A (of dimensions n×n) and let W(p) be a family of row perturbations of row $1 \le r \le n$ of W. We can think of this as inducing a family of ANP models, which we denote by A(p). For the synthesized score of alternative i in the ANP model A(p) we write either $s_{A(p),i}$ or if the original model and family is understood from context we write instead $s_i(p)$.

If we wish to emphasize that we have a family of row perturbations of row r we write instead $s_{r,i}(p)$

2.2 Marginal Influence Definition

Marginal influence is essentially the derivative of the $s_i(p)$ at the fixed point $p_0$. There is a problem with this though. The derivative of $s_i(p)$ does not exist at $p_0$. However the left and right derivatives do exist. The reason for this is that $p_0$ is where we change our rules of which ANP ratios we preserve. Thus we have an upper and lower marginal influence.

Definition 3 (Marginal influence). Let A be an ANP model, W be the weighted supermatrix of a single level of it (of dimensions n×n) and let W(p) be a family of row perturbations of row $1 \le r \le n$ of W. We can think of this as inducing a family of ANP models, which we denote by A(p). Let A have a alternatives and let $1 \le i \le a$. We define the upper marginal influence of node r on alternative i to be $$s'^{+}_{r,i} = \lim_{h \to 0+} \frac{s_{r,i}(p_0 + h) - s_{r,i}(p_0)}{h}.$$

Similarly the lower marginal influence of node r on alternative i is $$s'^{-}_{r,i} = \lim_{h \to 0-} \frac{s_{r,i}(p_0 + h) - s_{r,i}(p_0)}{h}.$$

The total upper marginal influence vector $s'^{+}_r$ has a components, the $i^{th}$ component of which is $s'^{+}_{r,i}$. Similarly the total lower marginal influence vector is $s'^{-}_r$. Lastly the total upper (respectively lower) marginal influence is the length of the vector $s'^{+}_r$ (respectively $s'^{-}_r$) using the standard Euclidean metric and is denoted by $\|s'^{+}_r\|$ (respectively $\|s'^{-}_r\|$).

Note 1. The above definitions are taking a right (or left) derivative of $s_{r,i}(p)$ and evaluating it at $p=p_0$.

2.3 How to Compute Effectively

Due to the complicated nature of limit matrix calculations, if we take the h in the definitions of marginal influence too close to zero, round off errors can complicate the calculation. Thus the standard method of calculating limits (plugging in values closer and closer to the limit value) may not always yield the correct results. In addition, the process of plugging in values closer and closer to the limit value leads to many synthesis calculations, which can be time consumptive for large models. For these reasons any approach to calculating marginal influence needs to have more than the standard technique for limits at its disposal.

An alternate method of computing a limit is simply to fix a number close to the limit value to plug in, and take the result as the limit value. Clearly this result may not be a good approximation (nonetheless if we choose a value sufficiently close to the limit value we can expect a reasonable approximation).

However, we have to balance that against round off error considerations. It is also advisable to calculate for at least one other value of h, to compare how much difference there is between our first value, and the new value (which gives us some idea of the quality of our approximation). In our case we have the limit as the parameter goes to 0. If we pick a value of h (close to zero) to plugin, plugging the value of h/2 to compare with is a reasonable sanity check.

3 Examples

In the following examples, software was used to generate the table of values describing the marginal influence of the nodes. In each case, wherever parameters are needed for the software they are described.

3.1 4node2.mod

This model is a simple representative model with two clusters (a criteria cluster and alternatives cluster) each of which contain two nodes (two criteria "A" and "B" and two alternatives "1" and "2"). All nodes are connected to one another with pairwise comparison data inputted.

A few notes about the data in this table, Part IV Table 1. The first row (labeled "Original") tells the scores of the alternatives in the model originally. The rest of the rows tell marginal influence information. The first column tells the node whose marginal influence we are calculating (with :upper meaning the upper marginal influence of that node, and likewise for : lower). The "Total" column means the total marginal influence. The column marked "d/dp Alt 1" is the marginal influence on the alternative "1". Likewise for the column "d/dp Alt 2". The "Param" column is the parameter value used for the second point in approximating the derivative (the other point used is always p=0.5). The final column is the error in approximating the derivative. This is found by comparing the approximations for smaller values of h.

TABLE 1

Part IV

| Node | Total | $d/dp$ Alt 1 | $d/dp$ Alt 2 | Param | Calc Err |
|---|---|---|---|---|---|
| Original | 0.000 | 0.39 | 0.61 | 0.500000 | 0.00000 |
| A: upper | 1.031 | 0.73 | −0.73 | 0.500500 | 0.00019 |
| B: upper | 0.966 | −0.68 | 0.68 | 0.500500 | 0.00005 |
| 1: upper | 3.470 | 2.45 | −2.45 | 0.500125 | 0.00075 |
| 2: upper | 2.347 | −1.66 | 1.66 | 0.500125 | 0.00057 |
| A: lower | 0.307 | 0.22 | −0.22 | 0.499750 | 0.00002 |
| B: lower | 0.287 | −0.2 | 0.2 | 0.499750 | 0.00001 |
| 1: lower | 0.817 | 0.58 | −0.58 | 0.499750 | 0.00008 |
| 2: lower | 0.949 | −0.67 | 0.67 | 0.499750 | 0.00018 |

It is interesting to compare these results to the maximum percent change scores for the alternatives which can be calculated for this model. In the case of maximum percent change scores, the best scoring non-alternative in the model was "B", meaning that "B" gives rise to the largest change when the parameter value is pushed upwards to p=0.9. However, looking at the marginal information, it turns out the "A" is the non-alternative with the most marginal influence. This means that "A" has a lot of influence initially, however as p pushes outward to larger values "B" begins to catch up.

3.2 BigBurger.mod

The initial values for the standard BigBurger model are found in the conventional sample models of SuperDecisions. The first row in Part IV Table 2 is the original synthesized values. The rest of the rows are the marginal influence for the given node (with upper or lower denoted after the node name). The "Total" column is the total marginal influence. The rest of the columns are the marginal influence on the alternatives "1 MacDonald's", "2 Burger King", and "3 Wendy's" respectively. For all of the rows shown, the parameter value was p=0.5005 and the errors are comparable to the previous example (they have been omitted in the interest of space). Finally notice that we only include the top few scorers and we have ordered them based on total marginal influence.

TABLE 2

Part IV

| Node | Total | $d/dp$ MacDon | $d/dp$ BK | $d/dp$ Wendy |
|---|---|---|---|---|
| Original | 0.0000 | 0.63 | 0.23 | 0.13 |
| 1 Subs: upper | 0.5795 | −0.46 | 0.14 | 0.32 |
| 5 Drive Thru: upper | 0.3991 | 0.32 | −0.23 | −0.09 |
| 2 Recycling: upper | 0.2601 | 0.21 | −0.1 | −0.11 |
| 1 White Collar: upper | 0.2543 | 0.21 | −0.07 | −0.13 |
| 3 Parking: upper | 0.2473 | 0.21 | −0.09 | −0.11 |
| 1 Personnel: upper | 0.2780 | 0.19 | −0.09 | −0.1 |
| 2 Food Hygiene: upper | 0.2176 | 0.18 | −0.08 | −0.09 |
| 2 Seating: upper | 0.2108 | 0.17 | −0.07 | −0.1 |
| 3 Waste Disposal: upper | 0.2060 | 0.17 | −0.07 | −0.1 |
| 1 Nutrition: upper | 0.1946 | 0.16 | −0.05 | −0.11 |
| 3 Students: upper | 0.1940 | 0.15 | −0.04 | −0.11 |
| 2 Blue Collar: upper | 0.1915 | 0.15 | −0.03 | −0.11 |
| 4 Families: upper | 0.1814 | 0.13 | −0.01 | −0.12 |
| 3 Location: upper | 0.1733 | 0.14 | −0.04 | −0.09 |
| 1 Price: upper | 0.1629 | 0.13 | −0.02 | −0.1 |
| 4 Over Packaging: upper | 0.1553 | 0.12 | −0.04 | −0.08 |
| 2 Product: upper | 0.1531 | 0.12 | −0.03 | −0.09 |

TABLE 2-continued

Part IV

| Node | Total | $d/dp$ MacDon | $d/dp$ BK | $d/dp$ Wendy |
|---|---|---|---|---|
| 2 Chicken: upper | 0.1523 | 0.12 | −0.07 | −0.05 |
| 4 Deals: upper | 0.1329 | 0.1 | −0.02 | −0.08 |
| 5 Chinese: upper | 0.1086 | 0.08 | −0.02 | −0.07 |
| 3 Pizza: upper | 0.1056 | 0.08 | −0.02 | −0.06 |
| 3 Site Hygiene: upper | 0.0813 | 0.07 | −0.02 | −0.04 |
| 7 Diners: upper | 0.0670 | 0 | 0.05 | −0.05 |

It is interesting to note that the ordering according to marginal influence differs after the top two scorers, compared with the influence score calculated as percent change for this model.

3.3 DiLeo&Tucker Beer Market Share

This is a model taken from the Saaty's class on ANP. The model is designed to predict market share of various beer manufacturers. The data in Part IV Table 3 is similarly formatted to the previous examples.

Part IV Table 3:

TABLE 3

Part IV

| Node | $d/dp$ Total | $d/dp$ Busch | $d/dp$ Coors | $d/dp$ Other | $d/dp$ Miller |
|---|---|---|---|---|---|
| Original | 0.000 | 0.43 | 0.16 | 0.2 | 0.2 |
| Quality: upper | 1.385 | −0.96 | 0.28 | 0.93 | −0.25 |
| Ad Spending: upper | 0.833 | 0.66 | −0.17 | −0.48 | 0 |
| Customers: upper | 0.818 | −0.57 | 0.15 | 0.55 | −0.14 |
| Availability: upper | 0.564 | −0.05 | 0.05 | −0.39 | 0.4 |
| Price: upper | 0.557 | −0.46 | 0.13 | 0.28 | 0.04 |
| Ad Spending: lower | 0.486 | 0.4 | −0.1 | −0.26 | −0.04 |
| Freq of Ads: upper | 0.214 | 0.16 | −0.04 | −0.13 | 0.02 |
| Creat. Of Ads: upper | 0.191 | 0.13 | −0.04 | −0.13 | 0.04 |
| Brand Recog: upper | 0.164 | 0.11 | −0.03 | −0.11 | 0.03 |
| Customers: lower | 0.144 | −0.1 | 0.03 | 0.1 | −0.03 |
| Style: upper | 0.136 | −0.09 | −0.03 | 0.1 | 0.01 |
| Appeal: upper | 0.134 | −0.09 | 0 | 0.1 | −0.01 |
| Quality: lower | 0.132 | −0.09 | 0.03 | 0.09 | −0.02 |

It is useful to compare these marginal influence results to the results calculating how rank is influenced. The top scorer remains the same, however there is a bit of shuffling of the nodes after that point.

Figure 11A:
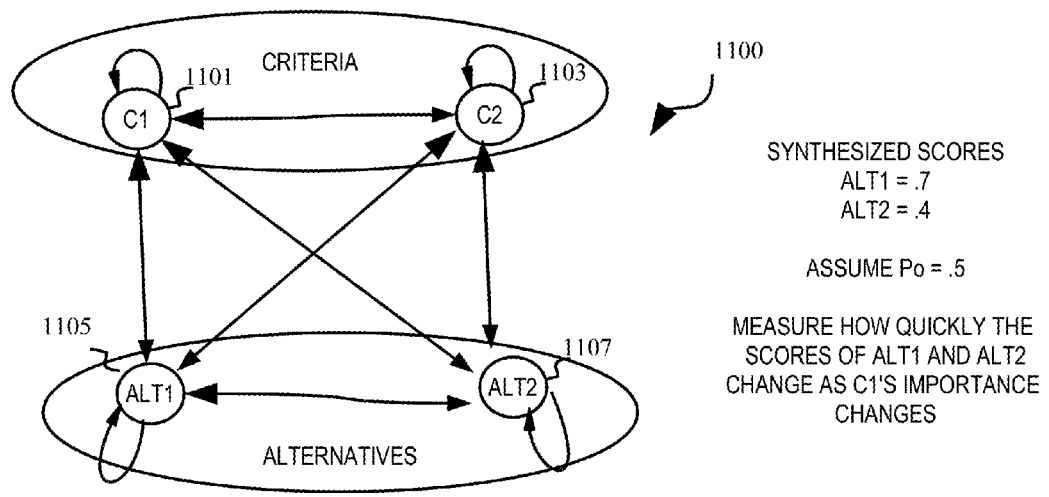
FIG. 11A is a diagram illustrating a network used with a measurement of marginal influence of a node in an ANP weighted supermatrix.

Referring now to FIG. 11A, a diagram illustrating a network used with a measurement of marginal influence of a node in an ANP weighted supermatrix. Also, reference will be made to FIG. 11B, a block diagram used for explaining FIG. 11A. In FIG. 11A, there are illustrated criteria C1 and C2 1101, 1103, and alternatives ALT1 and ALT2 1105, 1107, both in an ANP network 1100.

A goal in the illustrated example is to measure how quickly the scores of ALT1 and ALT 2 1105, 1107 changes as the importance of node C1 1101 changes. Assume that the initial synthesized scores in this example are ALT1=0.7 and ALT2=0.4, which are values which were calculated from input to the decision model 1100, according to known techniques.

To measure how fast the scores change, we use ANP row sensitivity on the row for criteria C1 and move values of p close and close to $p_0$, calculating (for each value of p) the change in alternative score (from the start value) over the change in p (from $p_0$). To be slightly more specific, move p closer to $p_0$ from above to calculate upper marginal influence, and move p closer to $p_0$ from below for lower marginal influence.

Figure 11B:
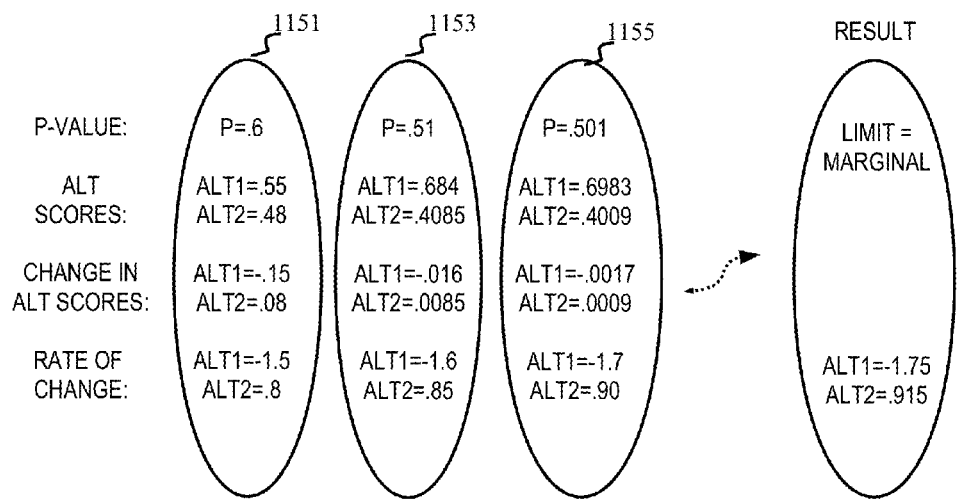
FIG. 11B is a block diagram used for explaining FIG. 11A.

For simplicity in this example assume that $p_0=0.5$. As shown in FIG. 11B, as the value of p approaches $p_0$, the following are calculated: synthesized alternative scores for ALT1 and ALT2 using ANP row sensitivity on C1, the changes in the alternative scores for ALT1 and ALT2, and the rate of change in alternative scores for ALT1 and ALT2. The result of the marginal influence measurement for C1 is that ALT1 is measured with a rate of change of −1.75, and ALT2 is measured with a rate of change of 0.915. The marginal influence is an instantaneous rate of change. We calculate an average rate of change over shorter and shorter intervals, as shown in FIG. 1B. (The difference of the P-value from 0.5 is 0.1, 0.01, 0.001, hence, shorter and shorter intervals as the P-value approaches 0.5). In each of these three instances here, we compare the currently calculated rate of change to the previously calculated rate of change. We see how far away that is from the previous set of values. We compare the current rate of change to the previous rate of change, for ALT1 it is 0.1 (−1.5 to −1.6) for group 151 to 153, 0.1 (−1.6 to −1.7) for group 153 to 155, etc. Eventually the differences between the average rates of change are sufficiently small so that the average rate of change is sufficiently close to the limit, i.e., within a pre-determined error amount limit (e.g., 0.0005), so as to be the instantaneous rate of change.

We should mention that the limit can also be taken from the lower approach, in this illustrated example, e.g., P-values of p=0.4, 0.49, 0.499, etc. That would arrive at the lower marginal influence. The lower limit will be different from the upper limit, because the proportionality of the ANP model is maintained.

Part V: ANP Perspective Analysis

Given a node in an AHP tree, it is straightforward to see how the alternatives synthesize relative to that node, since there is no feedback. However, in ANP theory, discovering how alternatives synthesize relative to a single node is a difficult task. The straightforward method of simply synthesizing relative to that node gives the same answer for all nodes (and thus no particularly interesting perspective of a given node). Using ANP row sensitivity as developed in Part II, we develop a method of ANP Perspective analysis which simulates the AHP situation.

1 Perspective Analysis

In AHP theory it is a simple application of the standard calculation to see how the alternatives of a model synthesize relative to a given node in the model. Unfortunately, if we carry this idea forward to ANP theory, every node gives the same perspective (in most models).

This is because the limit matrix calculation results in a matrix with identical columns (again in most models). Thus, if we are to gain a useful perspective of how the alternatives synthesize with respect to a given node, something else must be done. We can use ANP Row Sensitivity to do this.

The idea is to push the overall importance of the given node towards one in the ANP model (using ANP row sensitivity), and then synthesize the alternatives, which finds where the alternatives converge to as the weight of the given node approaches one.

As the importance approaches one we get closer to the perspective of the given node. This calculation idea can work in the AHP case as well, giving the same values one would expect from the standard method of perspective analysis utilized in the AHP case.

1.1 ANP Row Sensitivity Review

Before starting, a review of the concepts of ANP Row Sensitivity is suggested. The following are definitions referenced in this Part.

1.2 Definition

Definition 1 (Ranking). Let A be an ANP model with a alternatives ordered.

We use the following notation for standard calculated values of the model.

$s_{A,i}$=synthesized score for alternative i $r_{A,i}$=ranking of alternative i where 1=best, 2=second best, etc.

Definition 2 (Family of ANP models induced by row perturbations). Let A be an ANP model, W be the weighted supermatrix of a single level of it (of dimensions n×n) and let W(p) be a family of row perturbations of row 1≤r≤n of W. We can think of this as inducing a family of ANP models, which we denote by A(p). For the synthesized score of alternative i in the ANP model A(p) we write either $s_{A(p),i}$ or if the original model and family is understood from context we write instead $s_i(p)$.

If we wish to emphasize that we have a family of row perturbations of row r we write instead $s_{r,i}(p)$.

Definition 3 (ANP Perspective Analysis). Let A be an ANP model, W be the weighted supermatrix of a single level of it (of dimensions n×n), let W(p) be a family of row perturbations of row 1≤r≤n of W, and A(p) be the induced family of ANP models. Finally let the model have a alternatives. We define the synthesized value of alternative i from the perspective of node r to be $$p_{r,i} = \lim_{p \to 1} s_{r,i}(p).$$

The total synthesized vector we denote by $p_r=(p_{r,1}, \ldots, p_{r,a})$.

Note 1. Although this definition appears to depend on the family W(p) at first sight, it does not. By virtue of the definition of a family of row perturbations, all such perturbations will give rise to the same limiting value.

1.3 Calculating

Calculating these perspective values amounts to a standard limit calculation, with one caveat. If we let the value get too close to 1 for some models two problems occur.

1. The convergence of the limit matrix takes longer and longer the closer to one we get. Thus we need to balance calculation complexity against accuracy.

2. Round off errors can complicate the calculations.

Therefore, we cannot blindly plug in values arbitrarily close to one, expecting to reach a limit calculation every time, at least using the standard precision mathematics available in languages like C and Java (doubles). However, we can alleviate the problem of round off error by using a conventionally available library like libgmp, which allows for arbitrary precision arithmetic. The cost of such a library is two-fold.

First we can write our calculations to utilize arbitrary-precision arithmetic, for example, libgmp, and secondly arbitrary precision arithmetic comes at a fairly high calculation cost (causing the limit matrix calculation time to grow). However, if we are willing to put up with long calculation times we can find the limit simply by plugging in numbers closer and closer to one using arbitrary precision numbers. If we are not willing to accept long computation times (in the BigBurger model on a workstation it takes less than a minute) we can plug in a number as close to one as we wish, and accept that as the limit. However, when using this method, we also pick a number closer to one, and compare the two results, reporting back the distance between these results (so that we have some sense of the error involved in merely picking a single number to approximate a limit). What number one picks to plug in is highly dependent upon the model in question. If we pick a number too close to one, while using the standard double data type, round off errors can result in an incorrect calculation, as well as making it more time consumptive. If we pick a number too far from one, we have error introduced by that as well. Thus using this particular method to approximate the limit is more art than science, and should be thought of as a last resort for a model taking too long to accomplish the standard limit algorithm.

2 Perspective Analysis Examples

The following examples were calculated using software implementing the limit calculation (versus the brute force method of plugging in a single value). There are various parameters involved in this limit. They are the following.

StartH: This value tells us what the initial value we plug in to the limit calculation. The initial value is 1—StartH. That is StartH is how far away from 1 we start the limit process.

MaxError: This specifies the maximum distance between consecutive values in the limiting process we allow before we consider the limit arrived at (i.e. that we have converged to the limiting value).

MaxSteps: This is the maximum number of values we will plug in to the limit calculation before we give up. If convergence does not occur within this number of steps a convergence error is returned.

Metric: There are many ways to calculate the distance between consecutive results (the results are the synthesized values of the alternatives, thus a vector).

Also note, between each step, we half the distance from 1 the value we plugin is. Thus if StartH=0.02, the values of p we plug in for the limit are the following.

0.98, 0.99, 0.995, 0.9975; . . . .

(each time we are halving the distance from 1).

2.1 4Node2.mod

This is a model with two clusters (a criteria cluster and alternatives cluster) each of which contain two nodes (two criteria "A" and "B" and two alternatives "1" and "2"). All nodes are connected to one another with pairwise comparison data inputted.

The inputs in this example used for the algorithm are the following.

StartH=0.001
MaxSteps=50
MaxError=1e-5
Metric=0 that is, the standard Euclidean metric.

TABLE 1

Part V

| Node | Param | Distance | Normal 1 | Normal 2 | Error |
|---|---|---|---|---|---|
| Original Values | 0.5000000 | 0.0000 | 0.39 | 0.61 | 0.000000 |
| A | 0.9999840 | 9.6101 | 0.67 | 0.33 | 0.000008 |
| B | 0.9999840 | .5393 | 0.1 | 0.9 | 0.000010 |
| 1 | 0.9999840 | 1.0593 | 1 | 0 | 0.000010 |
| 2 | 0.9999840 | 0.6504 | 0 | 1 | 0.000007 |

The rows in Part V Table 1 represent the ANP Perspective of each node in the model (except the first row which is the original synthesis results). The first column is the node name, the second is the parameter value at which convergence occurred, the third is the distance the newly synthesized results were from the initial values (in the first row), the fourth and fifth columns are the synthesized values for alternative "1" and "2" respectively, and the last column is the error we found during convergence.

Notice that from the perspective of node "1" (which is also an alternative) alternative "1" scores perfectly. This makes sense, since we are pushing up the priority of node "1" towards 1.0. Likewise for node "2"'s perspective, alternative "2" scores perfectly. These are rather boring results, but the rows for "A" and "B" yield something more interesting. From node "A"'s perspective, alternative "1" gets a score of 0.67 and alternative "2" gets a score of 0.33 (Interestingly enough, this is the local priorities of "1" and "2" with respect to node "A". This happens in some cases (in the BigBurger model which follows many of nodes have this property, but not all).) For node "B" the same thing occurs—its perspective yields the local weights of alternatives "1" and "2".

2.2 BigBurger.mod

The initial values are from the standard example model included with SuperDecisions.

The results of perspective measurement are as follows in Part V Table 2.

TABLE 2

Part 7

| Node | Dist | McD | BK | Wendy's | Local Diff |
|---|---|---|---|---|---|
| Original Values | 0 | 0.634 | 0.233 | 0.133 | |
| 1 Subs | 1.01 | 0.333 | 0.333 | 0.333 | 0 |
| 5 Drive Thru | 0.26 | 0.807 | 0.107 | 0.087 | 0.37 |
| 2 Recycling | 0.19 | 0.766 | 0.165 | 0.069 | 0.01 |
| 1 White Collar | 0.18 | 0.756 | 0.188 | 0.056 | 0 |
| 3 Students | 0.16 | 0.735 | 0.207 | 0.058 | 0 |
| 2 Blue Collar | 0.16 | 0.735 | 0.207 | 0.058 | 0 |
| 1 Personnel | 0.15 | 0.733 | 0.188 | 0.079 | 0.02 |
| 2 Food Hygiene | 0.15 | 0.731 | 0.188 | 0.081 | 0 |
| 3 Waste Disposal | 0.15 | 0.729 | 0.189 | 0.081 | 0 |
| 1 Nutrition | 0.13 | 0.717 | 0.205 | 0.078 | 0 |
| 4 Families | 0.12 | 0.699 | 0.237 | 0.064 | 0 |
| 3 Location | 0.11 | 0.705 | 0.211 | 0.084 | 0 |
| 2 Product | 0.11 | 0.705 | 0.211 | 0.084 | 0 |
| 3 Parking | 0.11 | 0.705 | 0.208 | 0.087 | 1 |
| 2 Chicken | 0.11 | 0.701 | 0.193 | 0.106 | 0 |
| 1 Price | 0.11 | 0.699 | 0.220 | 0.081 | 0.02 |
| 2 Seating | 0.11 | 0.700 | 0.212 | 0.088 | 1 |
| 4 Over Packaging | 0.1 | 0.697 | 0.213 | 0.091 | 0.01 |
| 4 Deals | 0.09 | 0.692 | 0.216 | 0.092 | 0 |
| 3 Site Hygiene | 0.07 | 0.675 | 0.217 | 0.108 | 0.02 |
| 3 Pizza | 0.07 | 0.673 | 0.226 | 0.101 | 0 |
| 5 Chinese | 0.07 | 0.673 | 0.226 | 0.101 | 0 |
| 7 Diners | 0.07 | 0.619 | 0.265 | 0.115 | 0.01 |
| 1 Speed of Service | 0.02 | 0.626 | 0.238 | 0.136 | 0 |
| 6 Steak | 0.02 | 0.626 | 0.238 | 0.136 | 0 |
| 4 Mexican | 0.02 | 0.626 | 0.238 | 0.136 | 0 |
| 4 Delivery | 0.02 | 0.625 | 0.237 | 0.137 | 1 |
| 1 Short Term | 0.01 | 0.630 | 0.235 | 0.134 | 0.06 |
| 2 Medium Term | 0 | 0.634 | 0.234 | 0.133 | 0.12 |

We have skipped the parameter column, as well as error column in this example (they do not tell anything interesting). However we have added a "Local Diff" column. This is the distance the ANP perspective for the given node was from its local weights for the alternatives. We notice that all but a few nodes have their ANP Perspective the same as their local weights. However "5 Drive Thru" and "2 Medium Term" both give something different for their perspective.

2.3 DiLeo

This is a model pulled from the Saaty's class on ANP modeling. It attempts to find the market share of various beer producers. The data reported in Part V Table 3 below is sorted by maximum percent difference.

TABLE 3

| | | | Part V | | | | |
|---|---|---|---|---|---|---|---|
| Node | % Diff | Dist | Busch | Coors | Other | Miller | Local Diff |
| Original | 0 | 0 | 0.43 | 0.16 | 0.2 | 0.2 | |
| Customers | 1.16 | 0.77 | 0.2 | 0.22 | 0.43 | 0.15 | 0.2 |
| Price | 1.16 | 0.74 | 0.24 | 0.22 | 0.31 | 0.23 | 0.51 |
| Quality | 1.16 | 0.96 | 0.13 | 0.25 | 0.5 | 0.13 | 0 |
| Avail. | 1.14 | 0.64 | 0.38 | 0.19 | 0.05 | 0.38 | 0 |
| Ad Spend | 0.1 | 0.46 | 0.64 | 0.11 | 0.06 | 0.2 | 0 |
| Appeal | 0.6 | 0.3 | 0.37 | 0.17 | 0.27 | 0.19 | 0.62 |
| Freq Ads | 0.41 | 0.22 | 0.51 | 0.14 | 0.14 | 0.21 | 0.28 |
| Style | 0.39 | 0.19 | 0.39 | 0.15 | 0.25 | 0.21 | 0.41 |
| Creat. Ads | 0.39 | 0.2 | 0.49 | 0.14 | 0.14 | 0.22 | 0.62 |
| Brand Rec. | 0.35 | 0.18 | 0.49 | 0.15 | 0.15 | 0.22 | 0.31 |
| Ad Location | 0 | 0 | 0.43 | 0.16 | 0.2 | 0.2 | 0.27 |
| Promotion | 0 | 0 | 0.43 | 0.16 | 0.2 | 0.2 | 0.62 |
| Taste | 0 | 0 | 0.43 | 0.16 | 0.2 | 0.2 | 0.94 |

Notice that only three of these nodes have a local diff of zero (meaning that the ANP Perspective analysis for that node simply gave the local weights). If we consider the rankings of the nodes obtained from marginal influence and from rank influence we find that there is much similarity to this ordering, although there are a few differences.

3 Perspective Matrix

In a similar vein to ANP Perspective analysis, we can construct a Perspective matrix, giving the perspective information for all nodes in the network. However for the Perspective matrix, we do not simply look at the synthesized alternative scores, but the scores of all of the nodes from the perspective of the given node (including the score of the node itself, relative to itself which is tricky, as we will see).

3.1 Definition of Perspective Matrix

Definition 4 (Perspective Column). Let A be an ANP model, W be the weighted supermatrix of a single level of it (of dimensions n×n), let $W_r(p)$ be a family of row perturbations of row $1 \leq r \leq n$ of W. Let $L_{W_r}(p)$ be the limit matrix of $W_r(p)$. We define $\overline{L_{W_r}}(p)$ to be $L_{W_r}(p)$ with the diagonal replaced with zeros and the columns renormalized. Then we define $$\overline{L_{W_r}} = \lim_{p \to 1} \overline{L_{W_r}}(p)$$

Next we define the $r^{th}$ perspective column $$P_{W,r}$$

to be the $r^{th}$ column of $\overline{L_{W_r}}$. Lastly we define the self-adjusted $r^{th}$ perspective column (denote by $\overline{P_{W,r}}$) by the following steps.

1. Renormalize $P_{W,r}$ to sum to $1-W_{r,r}$.
2. Next replace the $r^{th}$ entry by $W_{r,r}$.

Definition 5 (Perspective Matrix). Let A be an ANP model, W be the weighted supermatrix of a single level of it (of dimensions n×n), let $W_r(p)$ be families of row perturbations of W for each row between 1 and n. The perspective matrix of W is denoted by $P_W$ and its $i^{th}$ column is $P_{W,i}$. Likewise the self-adjusted perspective matrix of W is denoted by $\overline{P_W}$ and its $i^{th}$ column is $\overline{P_{W,i}}$.

3.2 Discussion of Relation to Hierarchies

In hierarchies it can be a straightforward exercise to define a perspective matrix (and perspective analysis of the alternatives) without resorting to the complexities of ANP perspective analysis discussed herein. We simply synthesize from the given node in the tree and have our answer. The question is, how does this idea of hierarchy perspective analysis relate to ANP perspective analysis? The answer is the results of the ANP perspective matrix, when applied to AHP trees, agrees with AHP perspective matrix calculations using AHP only techniques. However, the ANP perspective results apply to a much larger domain.

3.3 Perspective Matrix Examples

The following are some standard models that we have applied Perspective Matrix Analysis to. For each one we describe the results and anything of interest in the calculations themselves.

3.3.1 4Node2.mod

This model has two clusters, "A1 criteria" and "Alternatives". There are two criteria "A" and "B", and two alternatives "1" and "2". All nodes are connected to each other, and the weighted supermatrix is as follows (the ordering of nodes in the supermatrix is "A", "B", "1", "2").

$$W = \begin{bmatrix} 0.3750 & 0.2000 & 0.0500 & 0.3333 \\ 0.1250 & 0.3000 & 0.4500 & 0.1667 \\ 0.3333 & 0.0500 & 0.2750 & 0.1500 \\ 0.1667 & 0.4500 & 0.2250 & 0.3500 \end{bmatrix}$$

The resulting perspective analysis table follows, in Part V Table 4.

TABLE 4

| | | Part V | | |
|---|---|---|---|---|
| | A | B | 1 | 2 |
| A | 0.00000 | 0.28752 | 0.06896 | 0.51281 |
| B | 0.20000 | 0.00000 | 0.62069 | 0.25641 |
| 1 | 0.53333 | 0.07142 | 0.00000 | 0.23078 |
| 2 | 0.26667 | 0.64286 | 0.31035 | 0.00000 |

Likewise, if we normalize by cluster, as in Part V Table 5, we see something interesting.

TABLE 5

Part V

|   | A | B | 1 | 2 |
|---|---|---|---|---|
| A | 0 | 1 | 0.1 | 0.67 |
| B | 1 | 0 | 0.9 | 0.33 |
| 1 | 0.67 | 0.1 | 0 | 1 |
| 2 | 0.33 | 0.9 | 1 | 0 |

Notice that for each column the priorities of the nodes in the other cluster are the same as the local priorities. This happens for some columns in many models. However, it certainly is not the rule (rather the exception).

3.3.2 BigBurger

This is the standard BigBurger model that ships in the sample models of SuperDecisions. There are 32 nodes in this model, and thus too many to effectively show the entirety of the perspective matrix. Instead we show a few of the most interesting columns from this matrix and describe what they are telling us. There are several ways to decide what makes interesting columns. For instance we could see how far away the perspective matrix is from the weighted supermatrix (how far the perspective is away from the original weights). On the other hand we could see how far the perspective matrix is from the limit matrix (how far the perspective is from the global perspective).

First, in Part V Table 6, let us look at the columns of the perspective matrix that differ most from the weighted supermatrix.

TABLE 6

Part V

|   | Sh Term | Med Term | Seating | Parking | Drive Thru |
|---|---|---|---|---|---|
| 1 McDonalds | 0.133 | 0.134 | 0.083 | 0.028 | 0.187 |
| 2 Burger King | 0.050 | 0.049 | 0.025 | 0.008 | 0.025 |
| 3 Wendy's | 0.027 | 0.028 | 0.010 | 0.003 | 0.020 |
| 1 White Collar | 0.041 | 0.041 | 0.028 | 0.011 | 0.069 |
| 2 Blue Collar | 0.030 | 0.030 | 0.039 | 0.008 | 0.044 |
| 3 Students | 0.030 | 0.030 | 0.045 | 0.004 | 0.046 |
| 4 Families | 0.064 | 0.064 | 0.025 | 0.018 | 0.074 |
| 1 Price | 0.044 | 0.044 | 0.017 | 0.027 | 0.039 |
| 2 Product | 0.063 | 0.064 | 0.089 | 0.143 | 0.042 |
| 3 Location | 0.038 | 0.038 | 0.294 | 0.399 | 0.113 |
| 4 Deals | 0.031 | 0.031 | 0.000 | 0.000 | 0.003 |
| 1 Nutrition | 0.040 | 0.040 | 0.009 | 0.015 | 0.020 |
| 2 Recycling | 0.012 | 0.012 | 0.000 | 0.000 | 0.005 |
| 3 Waste Disp | 0.008 | 0.008 | 0.000 | 0.000 | 0.002 |
| 4 Over Pkg | 0.009 | 0.009 | 0.000 | 0.000 | 0.003 |
| 1 Personnel | 0.061 | 0.061 | 0.007 | 0.011 | 0.026 |
| 2 Food Hyg | 0.049 | 0.049 | 0.011 | 0.017 | 0.020 |
| 3 Site Hyg | 0.033 | 0.033 | 0.003 | 0.004 | 0.011 |
| 1 Spd of Ser | 0.028 | 0.028 | 0.034 | 0.011 | 0.032 |
| 2 Seating | 0.015 | 0.015 | 0.000 | 0.000 | 0.021 |
| 3 Parking | 0.012 | 0.012 | 0.075 | 0.000 | 0.019 |
| 4 Delivery | 0.012 | 0.012 | 0.066 | 0.133 | 0.017 |
| 5 Drive Thru | 0.011 | 0.011 | 0.059 | 0.133 | 0.000 |
| 1 Subs | 0.024 | 0.024 | 0.008 | 0.003 | 0.027 |
| 2 Chicken | 0.024 | 0.024 | 0.008 | 0.004 | 0.024 |
| 3 Pizza | 0.031 | 0.031 | 0.011 | 0.004 | 0.032 |
| 4 Mexican | 0.018 | 0.018 | 0.007 | 0.003 | 0.023 |
| 5 Chinese | 0.021 | 0.021 | 0.013 | 0.005 | 0.020 |
| 6 Steak | 0.021 | 0.021 | 0.019 | 0.005 | 0.020 |
| 7 Diners | 0.018 | 0.018 | 0.016 | 0.001 | 0.019 |
| 1 Short Term | 0.000 | 0.000 | 0.000 | 0.000 | 0.000 |
| 2 Med Term | 0.000 | 0.000 | 0.000 | 0.000 | 0.000 |

There are a few interesting things to note about these columns in Part V Table 6. The first two columns essentially are the limit priorities (meaning that they have no difference with the limit matrix). The other three all come from the cluster "6 Traits". Next let us consider the perspective matrix columns with the largest difference with the global perspective, shown in Part V Table 7. They are the following.

TABLE 7

Part V

|   | Parking | Delivery | Seating | Location | Food Hyg |
|---|---|---|---|---|---|
| 1 McDonalds | 0.028 | 0.028 | 0.083 | 0.210 | 0.199 |
| 2 Burger King | 0.008 | 0.010 | 0.025 | 0.063 | 0.051 |
| 3 Wendy's | 0.003 | 0.006 | 0.010 | 0.025 | 0.022 |
| 1 White Collar | 0.011 | 0.097 | 0.028 | 0.061 | 0.051 |
| 2 Blue Collar | 0.008 | 0.094 | 0.039 | 0.112 | 0.017 |
| 3 Students | 0.004 | 0.094 | 0.045 | 0.138 | 0.017 |
| 4 Families | 0.018 | 0.103 | 0.025 | 0.043 | 0.106 |
| 1 Price | 0.027 | 0.062 | 0.017 | 0.000 | 0.000 |
| 2 Product | 0.143 | 0.041 | 0.089 | 0.000 | 0.172 |
| 3 Location | 0.399 | 0.174 | 0.294 | 0.000 | 0.000 |
| 4 Deals | 0.000 | 0.060 | 0.000 | 0.000 | 0.000 |
| 1 Nutrition | 0.015 | 0.014 | 0.009 | 0.000 | 0.000 |
| 2 Recycling | 0.000 | 0.001 | 0.000 | 0.000 | 0.000 |
| 3 Waste Disp | 0.000 | 0.000 | 0.000 | 0.000 | 0.000 |
| 4 Over Pkg | 0.000 | 0.001 | 0.000 | 0.000 | 0.000 |
| 1 Personnel | 0.011 | 0.008 | 0.007 | 0.000 | 0.241 |
| 2 Food Hyg | 0.017 | 0.008 | 0.011 | 0.000 | 0.000 |
| 3 Site Hyg | 0.004 | 0.003 | 0.003 | 0.000 | 0.000 |
| 1 Spd of Ser | 0.011 | 0.029 | 0.034 | 0.000 | 0.000 |
| 2 Seating | 0.000 | 0.034 | 0.000 | 0.000 | 0.000 |
| 3 Parking | 0.000 | 0.073 | 0.075 | 0.034 | 0.000 |
| 4 Delivery | 0.133 | 0.000 | 0.066 | 0.077 | 0.000 |
| 5 Drive Thru | 0.133 | 0.024 | 0.059 | 0.029 | 0.000 |
| 1 Subs | 0.003 | 0.004 | 0.008 | 0.020 | 0.035 |
| 2 Chicken | 0.004 | 0.004 | 0.008 | 0.015 | 0.018 |
| 3 Pizza | 0.004 | 0.006 | 0.011 | 0.027 | 0.040 |
| 4 Mexican | 0.003 | 0.004 | 0.007 | 0.014 | 0.007 |
| 5 Chinese | 0.005 | 0.004 | 0.013 | 0.033 | 0.006 |
| 6 Steak | 0.005 | 0.005 | 0.019 | 0.050 | 0.006 |
| 7 Diners | 0.001 | 0.004 | 0.016 | 0.050 | 0.010 |
| 1 Short Term | 0.000 | 0.002 | 0.000 | 0.000 | 0.000 |
| 2 Med Term | 0.000 | 0.002 | 0.000 | 0.000 | 0.000 |

Notice again that the cluster "6 Traits" has nodes showing up.

Figure 12A:
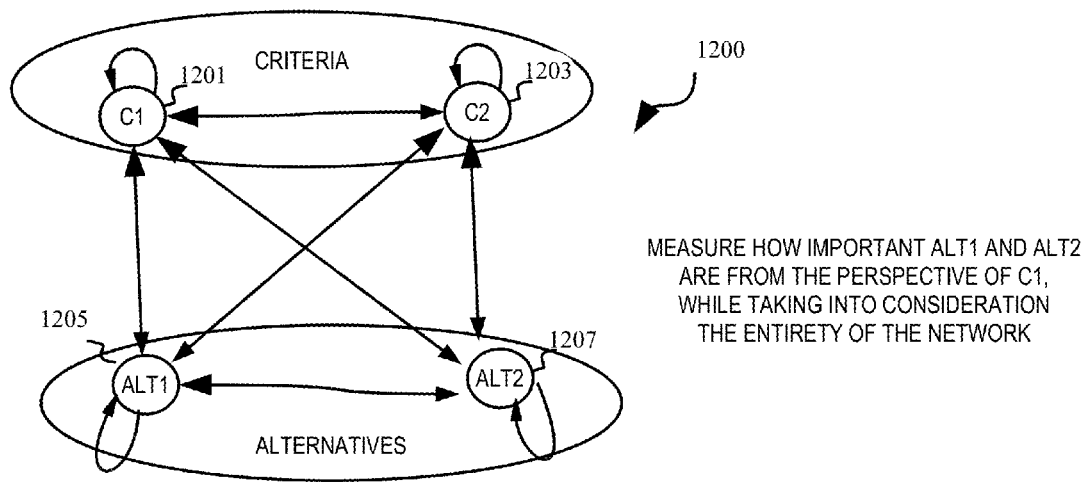
FIG. 12A is a network diagram illustrating a measurement of a perspective of a node in an ANP weighted supermatrix.

Referring now to FIG. 12A, a network diagram illustrating a measurement of a perspective of a node in an ANP weighted supermatrix will be discussed and described. Also, reference will be made to FIG. 12B, a block diagram used for explaining FIG. 12A. In FIG. 12A, there are illustrated criteria C1 and C2 1201, 1203, and alternatives ALT1 and ALT2 1205, 1207, both in an ANP network 1200.

A goal in the illustrated example is to measure how important ALT1 and ALT 2 1205, 1207 are from the perspective of node C1 1201, while taking into consideration the entirety of the ANP network. Assume that the initial synthesized scores in this example are ALT1=0.85 and ALT2=0.33, which are values which were calculated from input to the decision model 1200, according to known techniques.

To measure how important ALT1 and ALT2 1205, 1207 are from the perspective of C1, we use ANP row sensitivity on the row for criteria C1 and move values of p closer and closer to one, and see what limiting values the synthesized scores for the alternatives approach.

Figure 12B:
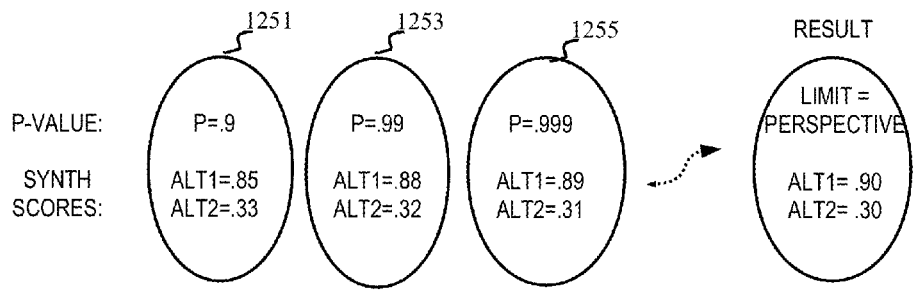
FIG. 12B is a block diagram used for explaining FIG. 12A.

As shown in FIG. 12B, as the value of p approaches one, the synthesized alternative scores for ALT1 and ALT2 using ANP row sensitivity on C1 are calculated. The result of the perspective measurement for C1 is that, as p approaches 1, ALT1 is measured at 0.90, and ALT2 is measured at 0.30. This means that, from the perspective of node C1 (i.e., from the perspective of criteria C1), alternative ALT1 measures three times as important as alternative ALT2, and ALT1 scores 90% from perfect, within the ANP network 1200.

Part VI: ANP Rank Influence Analysis

1. Introduction

Given an ANP model, it is natural to wonder how sensitive the scores of the alternatives are to numerical changes in the model. Although, changes in the scores of the alternatives are often less important than changes in the rankings. (That is a numerical change in the model that changes all of the scores a lot, but leaves the rankings the same is, in some sense, far less interesting than a numerical change which drops the number one alternative to the number four position.)

Rather than speaking about broad "numerical changes" influencing alternative rankings we can consider the effects a particular node has on the rankings (how a node can impact the rankings of alternatives will be explained shortly, for now think of it like tree sensitivity). We could look at the effects each node has on the rankings of the alternatives, and then score the nodes based on this information (a higher score for a node means it impacts the rankings of the alternatives more). With information like this, we can rank the nodes in the model from most influential to the rankings of the alternatives to least influential. We present a method to accomplish this goal using ANP row sensitivity (defined in part III) as the basis of the calculations.

1.1 The concept

The basic idea utilized herein is the following.

Concept (ANP Rank Influence). For each node we consider how much we would have to change the importance of that node to induce a change in the rankings of the alternatives. Nodes that require a small change of importance to create a rank change score higher than nodes that require a large change (if we need only barely change the importance of a node to get a change in the rankings of the alternatives that node is very influential to the rankings).

There are a few subtleties involved in implementing this concept; however, the above concept is the driving force behind the calculations we do. Implementing this concept requires a few steps.

1. We need to be able to change the importance of a node in a way that is compatible with the ANP structure of the model. We use ANP row sensitivity to accomplish this (see Part II for a full explanation of row sensitivity, in addition we provide a brief review in the following section).

2. We need to consider changing the importance of a node upward as well as downward.

3. We need a method for scoring a node's importance based upon how far its importance had to move to produce a rank change of the alternatives. There is a subtlety involved with reconciling the impact of moving a node's importance upward versus downward as moving downward simply has less of a numerical impact than moving upward.

1.2 Review ANP Row Sensitivity

The following is a brief summary of the concepts involved in Part II. The purpose of ANP row sensitivity is to change all of the numerical information for a given node in a way that is consistent with the ANP structure, and recalculate the alternative values (much as tree sensitivity works). We do this by having a single parameter $p$ that is between zero and one, which represents the importance of the given node. There is a parameter value $p_0$ (called the fixed point) which represents returning the node values to the original weights. For parameter values larger than $p_0$ the importance of the node goes up, and for parameter values less than $p_0$ the importance of the node goes down. Once the parameter is set, this updates values in the weighted supermatrix (although it can also be done with the unsealed supermatrix, working by clusters instead) and resynthesizes.

2 ANP Rank Influence

We shall begin the discussion of ANP rank influence by first restating the algorithm in a more technical fashion (and then proceed to the official technical definition). Fix an ANP model (a single level of it) let W be its weighted supermatrix (of dimensions n×n) and $1 \leq r \leq n$ be a row of W. Let W(p) be a family of row perturbations for row r of W with $p_0$ as the fixed point (see Part II) (for instance, W(p) could be $F_{W,r,p_0}(p)$) that is defined in Part II). The algorithm comprises searching for the first $p^+$ above $p_0$ where a rank change occurs and $p^-$ below $p_0$ where rank change happens. Using $p^+$ and $p^-$ we construct a number that tells us the upper and lower rank influence of row r in W.

2.1 Technical Definition

In order to state things precisely we need a few definitions.

Definition 1 (Ranking). Let A be an ANP model with a alternatives ordered. We use the following notation for standard calculated values of the model.

$s_{A,i}$=synthesized score for alternative i $r_{A,i}$=ranking of alternative i where 1=best, 2=second best, etc.

Definition 2 (Family of ANP models induced by row perturbations). Let A be an ANP model, W be the weighted supermatrix of a single level of it (of dimensions n×n) and let W(p) be a family of row perturbations of row $1 \leq r \leq n$ of W. We can think of this as inducing a family of ANP models, which we denote by A(p).

Definition 3 (Upper and lower rank change parameter). Let A be an ANP model, W be the weighted supermatrix of a single level of it (of dimensions n×n) and let W(p) be a family of row perturbations of row $1 \leq r \leq n$ of W. Let A(p) be the induced family of ANP models. We define the upper rank change parameter $p^+_{A, W, r}$ and lower rank change parameter $p^-_{A, W, r}$ by the following formulas.

$$p^+_{A, W, r} = \inf\{p \geq p_0 | A(p) \text{ has a different ranking than } A\}$$

$$p^-_{A, W, r} = \sup\{p \leq p_0 | A(p) \text{ has a different ranking than } A\}$$

When the context is clear we abbreviate the upper and lower rank change parameters as $p^+$ and $p^-$. If we only wish to emphasize the row which we are analyzing we write $p^+_r$ and $p^-_r$ for $p^+_{A, W, r}$ and $p^-_{A, W, r}$, respectively.

Note 1. By continuity considerations the above inf and sup are simply maxi-mumiminimums if there is no ties in the scores of the alternatives of A. However when there are ties continuity alone does not suffice to reduce the infand sup to maximum/minimum.

2.2 Rank Influence Score

Using the information of $p^+_r$ and $p^-_r$ we can construct an upper and lower rank influence score that tells us how quickly rank changes occur in row r. The larger this score the more rank influence row r has.

Definition 4 (Rank Influence Score). Let A be an ANP model, W be the weighted supermatrix of a single level of it (of dimensions n×n) and let W(p) be a family of row perturbations of row $1 \leq r \leq n$ of W. Let A(p) be the induced family of ANP models. We define the following rank influence scores. The upper rank influence score $rki^+_{A,W,r}$ (or simply $rki^+$ when no confusion would arise) is defined by $$rki^+_{A,W,r} = \frac{1 - p^+_{A,W,r}}{1 - p_o}.$$

Likewise the lower rank influence score $rki^-_{A,W,r}$ is defined by $$rki^-_{A,W,r} = \frac{p^-_{A,W,r}}{p_o}.$$

Note 2. Both $rki^+$ and $rki^-$ are between zero and one. If no switch happens on the upper side we have $rki^+=0$ (respectively for $rki^-$). Likewise if $p^+=p_0$ then $rki^+=1$ (likewise for $rki^-$). Lastly notice that $rki^+$ is a decreasing function of $p^+$ and $rki^-$ is an increasing function of $p^-$. This means that if no rank change happens no matter how much we change p in the upward direction, we get $p^+=0$ (likewise for the downward direction). The closer the upper (or lower) rank change parameter is to $p_0$, the closer the score is to 1 as well.

There is a natural problem with the above definition. Namely for any row we would like to have a single rank influence score, not an upper and lower influence score. We could simply take the larger of these two scores. However, there is a problem with that approach which we outline and address in the following section.

2.3 Adjusted Lower Rank Influence Score

There is an inherent difficulty (or unfairness) in directly comparing lower and upper rank scores to obtain a total rank influence score. The problem is that by its nature changing the parameter p upwards has a much larger influence on the supermatrix than changing downwards (below $p_0$). In the extreme (with p near 1) the supermatrix has nearly 1's in the $r^{th}$ row with nearly zeros in all other rows. However in the extreme downwards, the $r^{th}$ row is made nearly zero, while all other rows get bumped up a bit.

To address this problem we need to adjust the lower rank influence score upwards in some fashion. There are many ways to do this of course. We must be careful though. The upper rank influence score is between 0 and 1, and we would like to keep the adjusted lower rank influence score in this range as well. A natural way to do this is by taking an appropriate root of the (raw) lower rank influence score to arrive at an adjusted rank influence score, which is what we propose here.

Definition 5 (Root adjusted lower rank influence score). Let $rki^-$ be the lower rank influence score. We define the $m^{th}$ root adjusted lower rank influence score to be $$rki^{-,m} = \sqrt[m]{rki^-}.$$

Note 3. From trial and error on various models, the best values for m appear to be either 2 or 3. That is, using either the square root or cube root appears to make lower and upper rank influences comparable (for most models). It would be nice to find a common root to use for all models to adjust the lower rank influence score by. The most likely candidate based upon the previous remarks would be the $e^{th}$ root. More work would need to be done to verify this though.

2.4 Algorithms Finding Upper and Lower Rank Change Parameter

Determining the rank influence score (scores) requires us to find the upper and lower rank change parameter value. Thus we must search for the smallest parameter value which causes a rank change. (We should mention here that if we start with some alternatives in a tie, it is very possible that you would need to take an inf or sup instead of maximum or minimum. In those cases the lower or upper rank change parameter may in fact be $p_0$. This is not a problem with the theory as advanced here. However it should be noted as a degenerate (or at least a strange) case.) There are several algorithms available for such a search, of which we discuss a few below.

2.4.1 Bisection Method Approach

The bisection method is a standard method for finding roots of a function (or in general elements of a set that satisfy a certain criteria). The method consists of dividing the set you are searching in half (if it is a finite set this is easy, in our case we have intervals we are searching, and it is easy to divide the set in our case as well), then choosing one half to restrict our search to. Then we continue the process of dividing. Techniques are known for performing bisection methods.

In our case to find the lower rank change parameter (the same idea applies to the upper rank change parameter) we start with the interval $[0, p_0]$ through which we will search for our lower rank change parameter. We start with the alternatives scored as normal with the parameter value of $p_0$. The algorithm consists of several steps. The guiding idea is to restrict to intervals we know rank change occurs within.

1. In order to start the algorithm we need to know that our starting interval has a rank change occur within it. The test is straightforward, we check to see if a rank change happens at parameter value 0 (the other end of our interval). If that does not cause rank change, we have two choices. Either we can give up (assuming that if no rank change has happened at the end, there was probably no rank change in between). Or we can use another algorithm to search for some parameter value which causes rank change (such as the brute force method listed below) and return to the bisection algorithm with the parameter value causing rank change as our new end point for the search interval.

2. Once we have established that our starting interval's end points have different rankings, we choose the midpoint. If the midpoint does not cause a rank change (from the starting rankings), we choose the lower half of the interval to search within. If the midpoint does cause a rank change we choose the upper half of the interval to narrow our search to.

3. Repeat the previous step until we narrow the interval down to the desired size. Every step reduces the size by a factor of two. So after n steps, we know a rank change occurs somewhere within an interval of size $p_0/2^n$, with the upper end point of that interval not causing a rank change and the lower end causing one.

There is, of course, a problem with this. Our lower rank change parameter is the supremum of the set of parameter values causing rank change. We may not have found the largest interval to search within with this algorithm. However, the computational needs of this algorithm are very small to get to a large accuracy.

2.4.2 Brute Force Search Approach

As we did for the bisection method, we will describe this approach for the lower rank change parameter (the algorithm is nearly identical for finding the upper rank change parameter). The idea is very simple. We start by defining a step $\Delta p$ that we use throughout the search. We then start at $p_0$ and decrease by $\Delta p$ and see if a rank change has occurred. If there is not a rank change we decrease by $\Delta p$ again, and continue until we find a rank change.

This method has a much better chance of finding a value close to the actual lower rank change value (assuming $\Delta p$ is sufficiently small). However, if the lower rank change parameter is much smaller than $p_0$ we would need to search for quite a while to find it. Also we have a fixed accuracy for the calculation in the brute force approach (namely $\Delta p$) whereas the bisection method gets more accurate each step.

2.4.3 Hybrid Approach

A hybrid approach marries the best of both of the bisection and brute force methods. As mentioned in the bisection method discussion we can use the brute force method to find the initial end point of our search interval if 0 is not a rank change point.

However we could use the brute force algorithm to find the initial end point even assuming 0 is a rank change parameter value. Additionally we can find a new starting point for the other side of the interval. The brute force algorithm will find a parameter value p' that causes a rank change, and also we know that p'+Δp does not cause a rank change. So we have limited our search region to the interval [p', p'+Δp]. By doing this we have a better chance of finding the largest rank change parameter value.

We can tweak the computational time needed by making Δp larger (and then allowing the bisection method to hone in and reduce the inaccuracy). This growing of Δp does come at a cost, namely the possibility of missing a larger value for rank change (and thus giving us an incorrect value for the lower rank change parameter). The possibility of this happening is particularly low since it would require a "wiggling" behavior of the alternative scores versus the parameter value on a small scale (this has not been seen in any working model, though certainly must be considered as a possibility).

3 Examples

We present test results obtained from a new system (based on Super Decisions) performing the rank change algorithm. For all of the data presented the new system based on Super Decisions used the hybrid algorithm for finding the upper and lower rank change parameter. Please note that the new system based on Super Decisions, at the time of writing this paper, does not join lower and upper rank influence scores into a single score. Instead results are returned about both upper and lower rank influence.

3.1 4Node2.mod

This model is the model as used in the examples of Part III. It is a model with two clusters (a criteria cluster and alternatives cluster) each of which contain two nodes (two criteria "A" and "B" and two alternatives "1" and "2"). All nodes are connected to one another with pairwise comparison data inputted.

For this model both the hybrid and the bisection approach arrived at the same results. Results for the rank influence of the alternatives are included because the results for the alternatives have something useful to show us. Note that the results in Part VI Table 1 have been organized from highest to lowest score.

TABLE 1

Part VI

| Node | Param | Score | Raw Score | Alt 1 Score | Alt 2 Score |
| --- | --- | --- | --- | --- | --- |
| Original Values | 0.5000 | 0.0000 | 0.0000 | 0.3941 | 0.6059 |
| 1: upper | 0.5469 | 0.9043 | 0.9043 | 0.5004 | 0.4996 |
| 2: lower | 0.3594 | 0.8958 | 0.7188 | 0.5002 | 0.4998 |
| A: upper | 0.6560 | 0.6816 | 0.6816 | 0.5002 | 0.4998 |
| B: lower | 0.0171 | 0.3245 | 0.0342 | 0.5001 | 0.4999 |
| B: upper | 0.9900 | 0.0000 | 0.0000 | 0.1045 | 0.8955 |
| 2: upper | 0.9900 | 0.0000 | 0.0000 | 0.0031 | 0.9969 |
| A: lower | 0.0000 | 0.0000 | 0.0000 | 0.2738 | 0.7262 |
| 1: lower | 0.0000 | 0.0000 | 0.0000 | 0.0000 | 1.0000 |

Before we discuss what this information means, we should understand the columns of the above data. Each row represents information about lower/upper rank change for a given node.

Node

The node whose rank change information we are exploring. The :lower means we are looking at lower rank change information for that node, and :upper means we are looking at upper rank change information for that node.

Param

The actual parameter value we found to be the lowest/highest (depending if we are doing upper or lower rank change analysis respectively) causing rank change.

Score

This is the upper rank influence score if we are doing upper rank influence analysis. It uses the root adjusted lower rank influence score if we are doing lower rank influence analysis, using the cube root.

Raw Score

This is simply the rank influence score (i.e. we do not do any adjustments of the lower rank influence score for this column).

Alt 1 Score

The normalized score of alternative "1" when the parameter value has been changed to the value given in the param column.

Alt 2 Score

The normalized score of alternative "2" when the parameter value has been changed to the value given in the param column.

With this information in hand we can make a few observations.

(1) The top two rank influencers are the alternatives (which makes sense). However it is only "1:upper" and "2:lower" that have influence (that is "1:lower" and "2:upper" have no rank influence. This makes sense as originally alternative "1" scored 0.3941 and alternative "2" scored 0.6059. That is alternative "2" ranked best and "1" ranked second. Increasing the importance of "1" of course makes a difference to the rankings (whereas decreasing the importance of "1" has no effect on the rankings). Likewise, in reverse, for "2".

(2) The ranking of most influential to least remains the same whether we use the adjusted lower rank influence score, or the simple lower rank influence score. This is not often the case as we will see shortly.

(3) Criteria "A" is the most influential non-alternative (although it is only in the upper direction that it is the most influential). From Part III the influence analysis shows that "B" is actually the most influential (in terms of raw numerical change). We now can see that, although "B" changes the alternative scores the most numerically, it does not effect the ranking at all in the process. It is criteria "A" that is the most rank influential.

3.2 BigBurger.mod

This model is included simply to show that rank influence will not always tell us useful information. The only nodes in the BigBurger model that have rank influence are the alternatives. That is, no non-alternative nodes cause a rank change.

3.3 DiLeo&Tucker Beer Market Share

This is a model taken from the Saaty's class on ANP. The model is designed to predict market share of various beer manufacturers. Since we have previously described the columns of the data, we simply need to note in Part VI Table 2 that last four columns are the normalized scores of the alternatives at the various parameter values.

TABLE 2

Part VI

| Node | Param | Score | Raw | Busch | Coors | Other | Miller |
|---|---|---|---|---|---|---|---|
| Original Values | 0.500 | 0.000 | 0.000 | 0.434 | 0.1612 | 0.2013 | 0.2032 |
| Quality: high | 0.502 | 0.996 | 0.996 | 0.432 | 0.1617 | 0.2031 | 0.2027 |
| Customers: high | 0.503 | 0.994 | 0.994 | 0.433 | 0.1616 | 0.2029 | 0.2028 |
| Ad Spertd: low | 0.491 | 0.994 | 0.981 | 0.431 | 0.1621 | 0.2037 | 0.2036 |
| Availability: low | 0.476 | 0.984 | 0.952 | 0.435 | 0.1610 | 0.2022 | 0.2022 |
| Price: high | 0.508 | 0.983 | 0.983 | 0.431 | 0.1622 | 0.2036 | 0.2036 |
| Creat Ads: low | 0.448 | 0.964 | 0.896 | 0.433 | 0.1616 | 0.2028 | 0.2028 |
| Appeal: high | 0.518 | 0.963 | 0.963 | 0.433 | 0.1611 | 0.2031 | 0.2031 |
| Brand Rec: low | 0.440 | 0.959 | 0.881 | 0.433 | 0.1615 | 0.2028 | 0.2028 |
| Style: high | 0.521 | 0.957 | 0.957 | 0.433 | 0.1606 | 0.2035 | 0.2035 |
| Freq Ads: low | 0.325 | 0.866 | 0.650 | 0.432 | 0.1617 | 0.2031 | 0.2031 |
| Avaitability: high | 0.595 | 0.807 | 0.807 | 0.428 | 0.1659 | 0.1658 | 0.2400 |
| Appeal: low | 0.202 | 0.739 | 0.403 | 0.434 | 0.1634 | 0.2015 | 0.2014 |

This model is very rank sensitive, and the reason can be seen by looking at the original values. The alternatives "Other" and "Miller" scored very close to each other originally. This is our first instance of rankings according to rank influence differing whether we use the adjusted lower rank influence score, or the raw lower rank score. The above has been sorted using the score (using the cube root adjusted lower rank influence score). If we sorted on raw rank influence we see different orderings in some cases.

It is also interesting to compare these values to the influence calculations described in Part III. In the above Part VI Table 2 we have the top twelve scoring alternatives, below in Part VI Table 3 we have the top twelve scoring alternatives using influence analysis with upper value of 0.9 and lower value of 0.1. The table is sorted by rank change first then distance.

TABLE 3

Part VI

| Node | Param | Dist | Rank Ch | Busch | Coors | Other | Miller |
|---|---|---|---|---|---|---|---|
| Original Values | 0.5 | 0.0000 | 0 | 0.434 | 0.161 | 0.201 | 0.203 |
| Quality: high | 0.9 | 1.1573 | 8 | 0.165 | 0.239 | 0.462 | 0.134 |
| Customers: high | 0.9 | 1.1573 | 6 | 0.242 | 0.213 | 0.388 | 0.156 |
| Price: high | 0.9 | 1.1573 | 4 | 0.270 | 0.210 | 0.293 | 0.227 |
| Ad Spend: low | 0.1 | 1.1573 | 4 | 0.268 | 0.200 | 0.303 | 0.229 |
| Availability: high | 0.9 | 0.8843 | 2 | 0.395 | 0.184 | 0.072 | 0.348 |
| Ad Spend: high | 0.9 | 0.7420 | 2 | 0.614 | 0.113 | 0.073 | 0.200 |
| Appeal: high | 0.9 | 0.4317 | 2 | 0.383 | 0.166 | 0.254 | 0.197 |
| Style: high | 0.9 | 0.3080 | 2 | 0.400 | 0.151 | 0.242 | 0.207 |
| Availability: low | 0.1 | 0.0931 | 2 | 0.439 | 0.158 | 0.216 | 0.186 |
| Creat Ads: low | 0.1 | 0.0835 | 2 | 0.423 | 0.164 | 0.213 | 0.200 |
| Brand rec: low | 0.1 | 0.0724 | 2 | 0.425 | 0.164 | 0.211 | 0.200 |
| Freq Ads: low | 0.1 | 0.0319 | 2 | 0.429 | 0.162 | 0.205 | 0.203 |

It is interesting to note that the first three nodes match up perfectly between influence analysis and rank influence analysis. Many other remain the same.

The first change is that "Price" moves up a bit. The node "Ad Spending" (the upper values of it) does not appear in rank influence, yet does make an appearance in influence (meaning that moving "Ad Spending" upwards does not influence the ranking as much as it affects the raw numbers).

Part VII: Overarching Criteria in AHP and ANP

In some AHP trees (as well as ANP models in general) it happens that criteria exist in multiple locations throughout the model. These criteria, by virtue of the model must be distinct (so that we cannot get away with multiple connections to a single node in an ANP model representation of our tree), yet we wish for these criteria to have the same local priorities throughout the model. Furthermore, we also want to do sensitivity analysis of these criteria throughout the model (not one at a time). The former idea can be accommodated by duplicating the pairwise comparison data across the tree. The latter, sensitivity idea, is impossible without adding something to ANP theory. We use the idea of overarching criteria to make this sensitivity analysis possible, while eliminating the error prone process of duplicating pairwise data.

Terminology and Statement of the Problem

Before we plunge headlong into this process, we need to clarify some vague notions presented in the abstract. It is worth the exercise to start with an example of the phenomenon we wish to address. Consider the following AHP tree for determining the overall strength of an American football team by first breaking up its players into "Small Guys" and "Big Guys". The tree would look like the following.

Small Guys
  Skill Level
  Speed
  Weight
Big Guys
  Skill Level
  Speed
  Weight This is a very simplified model where our alternatives would be football teams and we would rate a team on what Skill Level their Small Guys have, the Speed of their Small Guys and the Weight of their Small Guys (likewise for Big Guys). Notice that we could just as easily have had "Skill Level", "Speed", and "Weight" as our top level nodes. Certainly this is a viable model, however what if we wish to perform sensitivity analysis to see how important "Skill Level", "Speed", and "Weight" are (not those with respect to "Small Guys", but those overall). Unless we restructure our model and move those nodes to the top level, we cannot do this (and if we do move them, we lose the ability to do sensitivity analysis of "Small Guys" versus "Big Guys"). This is the kind of problem we seek to address.

1.1 Definitions

With the previous example illustrating the phenomenon we are trying to address here we are now prepared to define the basic terms.

Definition 1 (Conceptually identical criteria). Let "A" and "B" be two criteria in different levels of a tree (or nodes in different clusters of an ANP network). They are said to be conceptually identical criteria (or conceptually identical nodes) if they both represent the same concept.

Note 1. Thus "Skill Level" under "Small Guys" in our initial example is conceptually identical to "Skill Level" under "Big Guys". Note 2. At times we want conceptually identical criteria (nodes) to have the same local priorities throughout a model. The point of this paper is how to address this issue in a reasonable way while allowing the user to do sensitivity analysis on these criteria.

Definition 2 (Overarching criteria). An overarching criteria (node) is an object which represents a group of conceptually identical criteria (nodes). An overarching criteria exists outside the framework of the AHP/ANP model. Likewise a cluster of overarching criteria is a group of overarching criteria which represent a group of conceptually identical criteria which has representatives all lying at the same level (for clusters of overarching nodes, they are a collection of overarching nodes which have representatives all lying in the same cluster of the network).

Note 3. In our initial example, the overarching criteria are "Skill Level", "Speed", and "Weight" and together these three overarching criteria are a cluster of over-arching criteria.

1.2 What Overarching Criteria Offer

Given the definitions above, we can see overarching criteria being defined and used in the following fashion in a model.

Definition 3 (AHP/ANP model extended with overarching criteria (nodes)). Given an AHP/ANP model we can extend it by adding clusters of overarching criteria (nodes). That is, we define a number of overarching criteria clusters, each of which is filled with overarching criteria for the given AHP/ANP model. We may then prioritize these clusters over overarching criteria and use those priorities to fill in the priorities for the conceptually identical criteria (nodes) throughout the model.

This idea of overarching criteria addresses one problem of conceptually identical criteria, namely the problem of reproducing pairwise data throughout the model. We simply compare the overarching criteria and that data is replicated wherever there are conceptually identical criteria in the model represented by those overarching criteria.

However, we can also use overarching criteria to address the other issue of conceptually identical criteria, that of sensitivity analysis. We can perform sensitivity analysis with respect to a cluster of overarching criteria, as we change the priorities of the overarching criteria, the representative conceptually identical criteria would have their local priorities change just as we want.

2 Implementation Details

As we can see from definition 3 we need to extend our AHP/ANP models by adding clusters of overarching criteria, each of which contains overarching criteria for the model (whose representatives reside at the same level of the tree, or in the same cluster for ANP models). Once we have the clusters, we need to prioritize (i.e. pairwise compare, use direct data, rate, or something similar) the overarching criteria within a given overarching criteria cluster. We then use that data to fill in the local priorities of representative conceptually identical criteria. The difficulty arises of what to do when the overarching criteria do not entirely match up. This can best be illustrated by an example.

2.1 Filling in Data

Consider our original example of the NFL team model. In that model we have a single cluster of overarching criteria, that contains the overarching criteria "Skill Level", "Speed", and "Weight". Let us expand by adding a top level criteria for "Medium Guys". Under "Medium Guys" let us say we have criteria called "Skill Level", "Speed", and "Versatility". Note that we are missing the overarching criteria of "Weight", while we have added the criteria "Versatility". (We may wish to model in this fashion because, by definition, medium guys have a medium weight, so weight is just not that important. However, medium sized guys tend to play at more versatile positions (think Tight Ends or Linebackers), so how well they play at those positions, in particular with versatility in mind, is important.)

There are several ways we can attack this problem. The best way to handle it would be to add another overarching criteria called "Versatility" and then prioritize that along with the other overarching criteria. For instance, if we are pairwise comparing the overarching criteria we would need to add pairwise data for "Versatility" compared to the other overarching criteria. Then we would simply restrict to the relevant overarching vriteria when filling in conceptually identical criteria. Thus for medium guys we would look only at the information for the overarching criteria "Speed", "Skill Level", and "Versatility". We can do that by restricting to the pairwise comparisons for those only, or by taking the resulting priority vector for all four overarching criteria and only use the priorities for the three we are interested in. The former seems to be the most logical to do in general although one may wish to have the flexibility to switch between the two methods.

Thus, the solution we are advocating here, when there is a discrepancy between the conceptually identical criteria at different levels of a model, is to put all of them into the cluster of overarching criteria and then restrict to the ones we need at the various levels.

2.2 Sensitivity Analysis

Sensitivity analysis based upon overarching criteria is straightforward in the case of trees. We simply adjust the weights of the overarching criteria (using standard sensitivity bars for instance) and feed those new weights throughout the tree. Likewise we can do the same for ANP models.

Note 4. For ANP models there are other methods that could be utilized involving ANP row sensitivity.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus comprising:
an analytic network process (ANP) storage memory that stores an ANP weighted supermatrix representing an ANP model populated with data, the ANP model having feedback connections in place among nodes within the ANP model; and
a processor in communication with the ANP storage memory, the processor being configured to facilitate
selecting one or more metrics to use to determine influence of criteria within the ANP model;
determining a combined influence score using the selected one or more metrics, the combined influence score being a single score for each of the criteria throughout the entire ANP weighted supermatrix representing the ANP model that has feedback connections; and
determining, based on the combined influence score for each of the criteria, which of the criteria in the ANP model is most influential among the criteria in the ANP model, for the one or more metric which is selected to use to determine the influence of the nodes in the ANP model.

2. The apparatus of claim 1, wherein the processor is configured to isolate at least one of the metrics and to work on the isolated metrics alone.

3. The apparatus of claim 1, wherein the metrics are one or more of rank change, percent change, and raw change.

4. The apparatus of claim 1, wherein the processor structures the ANP model into a metric first approach, to arrive at the combined influence score based on individual influence scores for the nodes of the ANP model.

5. The apparatus of claim 1, wherein the processor structures the ANP model into an influence-type first approach, to arrive at the combined influence score based on individual influence scores for the nodes in the ANP model.

6. The apparatus of claim 1, wherein the processor is configured to use overarching criteria in a calculation for providing a combined influence score.

7. The apparatus of claim 1, further comprising
an input unit configured to input, from an input device, pairwise comparisons, ANP ratings, or ANP client data, which are stored into the ANP model, the pairwise comparisons representing a judgment of priority between ANP alternatives in the pair, the ANP ratings representing a rating of a choice, and the ANP client data representing real world values.

8. A method, comprising:
storing, in an analytic network process (ANP) storage memory, an ANP weighted supermatrix representing an ANP model populated with data, the ANP model having feedback connections in place among nodes within the ANP model; and
in a processor in communication with the ANP storage memory:
selecting one or more metrics to use to determine influence of criteria within the ANP model;
determining a combined influence score using the selected one or more metrics, the combined influence score being a single score for each of the criteria throughout the entire ANP weighted supermatrix representing the ANP model that has feedback connections; and
determining, based on the combined influence score for each of the criteria, which of the criteria in the ANP model is most influential among the criteria in the ANP model, for the one or more metric which is selected to use to determine the influence of the nodes in the ANP model.

9. The method of claim 8, further comprising isolating at least one of the metrics and working on the isolated metrics alone.

10. The method of claim 8, wherein the metrics are one or more of rank change, percent change, and raw change.

11. The method of claim 8, further comprising structuring the ANP model into a metric first approach, to arrive at the combined influence score based on individual influence scores for the nodes of the ANP model.

12. The method of claim 8, further comprising structuring the ANP model into an influence-type first approach, to arrive at the combined influence score based on individual influence scores for the nodes in the ANP model.

13. The method of claim 8, further comprising using overarching criteria in a calculation for providing a combined influence score.

14. The method of claim 8, further comprising
inputting, from an input device, pairwise comparisons, ANP ratings, or ANP client data, which are stored into the ANP model, the pairwise comparisons representing a judgment of priority between ANP alternatives in the pair, the ANP ratings representing a rating of a choice, and the ANP client data representing real world values.

15. A non-transitory computer-readable storage medium encoded with a computer executable instructions, wherein execution of said computer executable instructions by one or more processors causes a computer to perform the steps of:
storing, in an analytic network process (ANP) storage memory, an ANP weighted supermatrix representing an ANP model populated with data, the ANP model having feedback connections in place among nodes within the ANP model; and
selecting one or more metrics to use to determine influence of criteria within the ANP model;
determining a combined influence score using the selected one or more metrics, the combined influence score being a single score for each of the criteria throughout the entire ANP weighted supermatrix representing the ANP model that has feedback connections; and
determining, based on the combined influence score for each of the criteria, which of the criteria in the ANP model is most influential among the criteria in the ANP model, for the one or more metric which is selected to use to determine the influence of the nodes in the ANP model.

16. The non-transitory computer-readable storage medium of claim 15, further comprising isolating at least one of the metrics and working on the isolated metrics alone.

17. The non-transitory computer-readable storage medium of claim 15, wherein the metrics are one or more of rank change, percent change, and raw change.

18. The non-transitory computer-readable storage medium of claim 15, further comprising structuring the ANP model into a metric first approach, to arrive at the combined influence score based on individual influence scores for the nodes of the ANP model.

19. The non-transitory computer-readable storage medium of claim 15, further comprising structuring the ANP model into an influence-type first approach, to arrive at the combined influence score based on individual influence scores for the nodes in the ANP model.

20. The non-transitory computer-readable storage medium of claim 15, further comprising using overarching criteria in a calculation for providing a combined influence score.

21. The non-transitory computer-readable storage medium of claim 15, further comprising
   inputting, from an input device, pairwise comparisons, ANP ratings, or ANP client data, which are stored into the ANP model, the pairwise comparisons representing a judgment of priority between ANP alternatives in the pair, the ANP ratings representing a rating of a choice, and the ANP client data representing real world values.

* * * * *